(12) United States Patent
Shimezawa et al.

(10) Patent No.: US 10,582,481 B2
(45) Date of Patent: Mar. 3, 2020

(54) TERMINAL DEVICE, BASE STATION DEVICE, AND COMMUNICATION METHOD

(71) Applicant: SHARP KABUSHIKI KAISHA, Sakai, Osaka (JP)

(72) Inventors: Kazuyuki Shimezawa, Sakai (JP); Naoki Kusashima, Sakai (JP); Shoichi Suzuki, Sakai (JP); Alvaro Ruiz Delgado, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 22 days.

(21) Appl. No.: 15/573,760

(22) PCT Filed: May 13, 2016

(86) PCT No.: PCT/JP2016/064343
§ 371 (c)(1),
(2) Date: Nov. 13, 2017

(87) PCT Pub. No.: WO2016/186042
PCT Pub. Date: Nov. 24, 2016

(65) Prior Publication Data
US 2018/0132209 A1 May 10, 2018

(30) Foreign Application Priority Data
May 15, 2015 (JP) .................................. 2015-099553

(51) Int. Cl.
*H04W 72/04* (2009.01)
*H04W 16/14* (2009.01)
(Continued)

(52) U.S. Cl.
CPC .......... *H04W 72/042* (2013.01); *H04L 5/001* (2013.01); *H04W 16/14* (2013.01); *H04W 72/04* (2013.01);
(Continued)

(58) Field of Classification Search
CPC ... H04W 72/042; H04W 16/14; H04W 72/04; H04W 72/12; H04W 72/1231;
(Continued)

(56) References Cited

U.S. PATENT DOCUMENTS

2013/0039284 A1   2/2013  Marinier et al.
2014/0112289 A1*  4/2014  Kim ..................... H04W 16/14
                                                           370/329
(Continued)

FOREIGN PATENT DOCUMENTS

WO      2014/069601 A1    5/2014

OTHER PUBLICATIONS

Source: Ericsson, Qualcomm, Huawei, Alcatel-Lucent; Title: Study on Licensed-Assisted Access using LTE; Document for: Approval; Agenda Item: 14.1.1; RP-141664; 3GPP TSG RAN Meeting #65; Edinburgh, Scotland, Sep. 9-12, 2014.
(Continued)

*Primary Examiner* — Paul H Masur
*Assistant Examiner* — Michael K Phillips
(74) *Attorney, Agent, or Firm* — ScienBiziP, P.C.

(57) ABSTRACT

A terminal device (UE) includes a reception unit configured to monitor multiple enhanced physical downlink control channels (EPDCCHs) on a Secondary cell. In a case that the Secondary cell is a licensed assisted access Secondary cell and a higher layer parameter of the Secondary cell indicates that a starting position of downlink transmission is either a Subframe boundary or a slot boundary, the terminal device is configured to monitor both a first set of UE-specific search space candidates in a first EPDCCH and a second set of UE-specific search space candidates in a second EPDCCH, in a subframe. A starting symbol for the first EPDCCH is specified by an index in a first slot in the subframe. A starting symbol for the second EPDCCH is specified by the index in a second slot in the subframe.

8 Claims, 10 Drawing Sheets

(51) Int. Cl.
*H04W 72/12* (2009.01)
*H04L 5/00* (2006.01)
*H04W 72/14* (2009.01)
*H04L 27/00* (2006.01)

(52) U.S. Cl.
CPC ....... *H04W 72/12* (2013.01); *H04W 72/1231* (2013.01); *H04W 72/14* (2013.01); *H04L 5/0053* (2013.01); *H04L 27/0006* (2013.01)

(58) Field of Classification Search
CPC ....... H04W 72/14; H04J 11/00; H04L 5/0001; H04L 27/0006
See application file for complete search history.

(56) References Cited

U.S. PATENT DOCUMENTS

| | | |
|---|---|---|
| 2015/0282134 A1 | 10/2015 | Suzuki et al. |
| 2016/0127098 A1* | 5/2016 | Ng ........................ H04L 5/0048 370/329 |
| 2016/0183302 A1* | 6/2016 | Chen ................. H04W 74/0808 370/329 |
| 2016/0226637 A1* | 8/2016 | Nory ..................... H04L 5/0053 |
| 2016/0286404 A1* | 9/2016 | Rico Alvarino ...... H04L 5/0048 |
| 2016/0286562 A1* | 9/2016 | Cui ..................... H04W 72/082 |
| 2016/0345305 A1 | 11/2016 | Suzuki et al. |
| 2017/0188373 A1* | 6/2017 | He ......................... H04W 4/70 |
| 2017/0289818 A1* | 10/2017 | Ng ........................ H04W 48/12 |
| 2017/0311322 A1* | 10/2017 | Kim ..................... H04W 72/04 |
| 2018/0288751 A1 | 10/2018 | Suzuki et al. |

OTHER PUBLICATIONS

3rd Generation Partnership Project;Technical Specification Group Radio Access Network; Evolved Universal Terrestrial Radio Access (E-UTRA); Physical layer procedures (Release); 3GPP TS 36.213 V12.4.0(Dec. 2014); France.

* cited by examiner

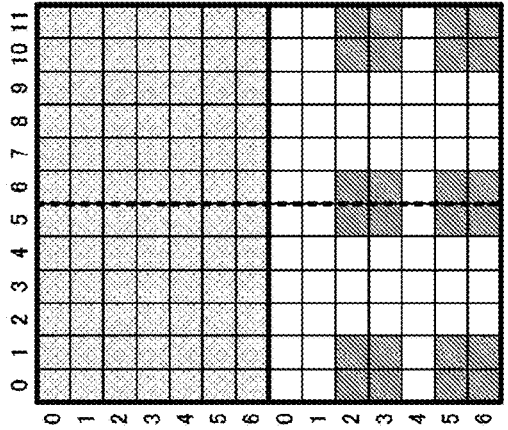
FIG. 9C
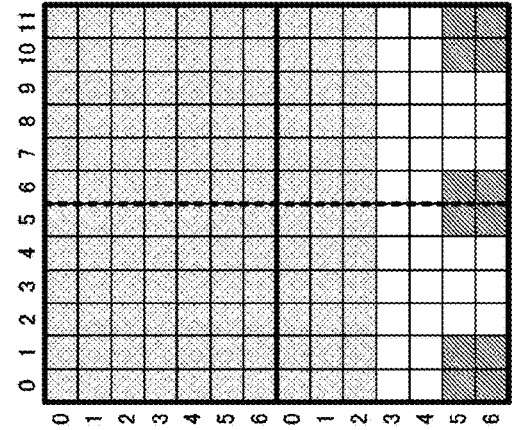
FIG. 9E
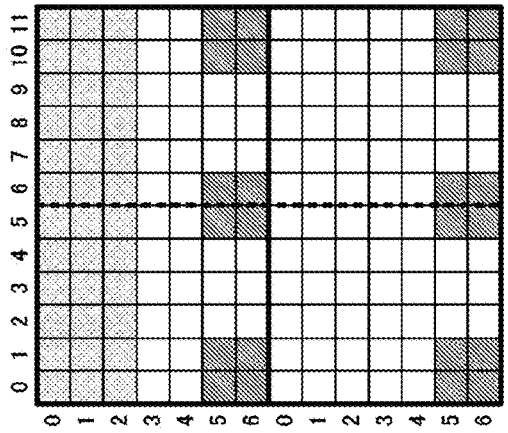
FIG. 9B
FIG. 9D
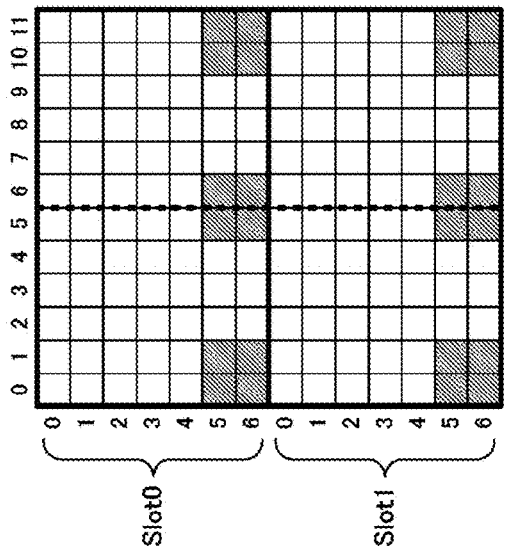
FIG. 9A
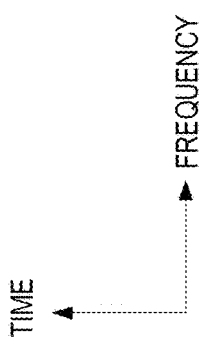

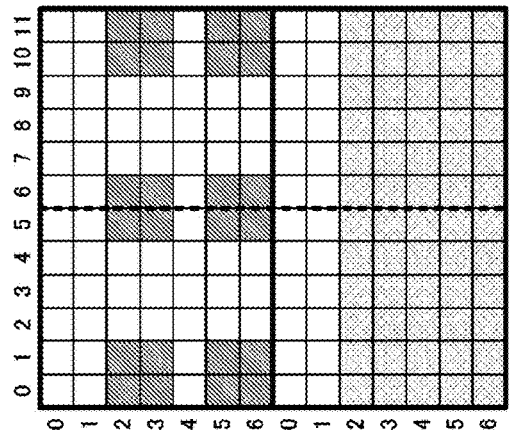
FIG. 10C
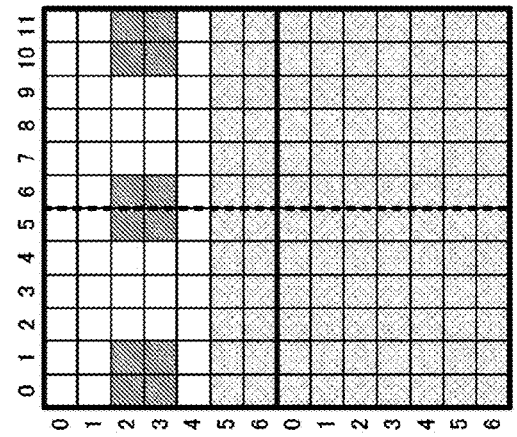
FIG. 10E
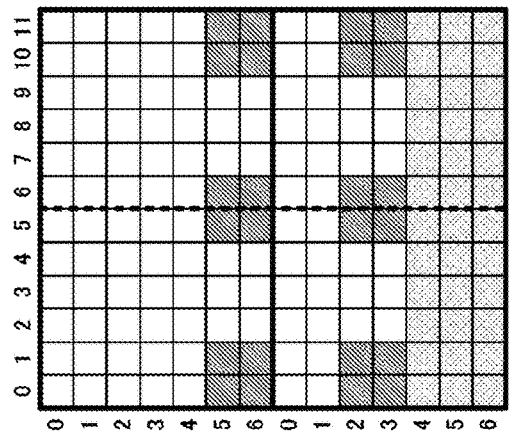
FIG. 10B
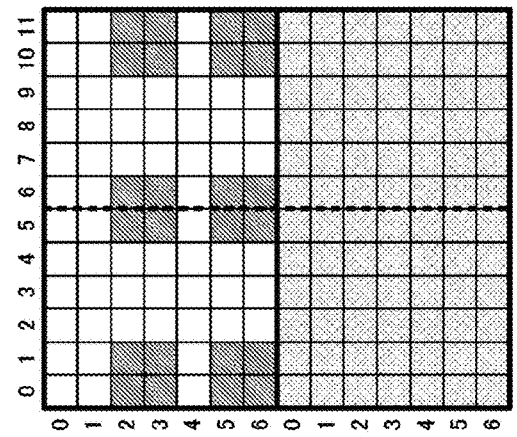
FIG. 10D
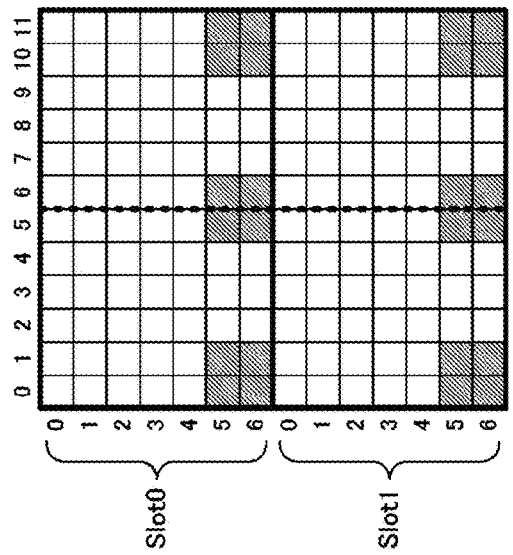
FIG. 10A
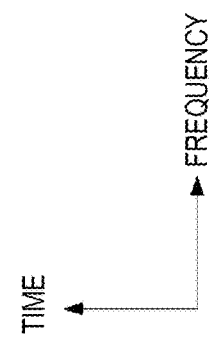

TERMINAL DEVICE, BASE STATION DEVICE, AND COMMUNICATION METHOD

CLAIM OF BENEFIT TO PRIOR APPLICATION(S)

The present application is a National Stage filing of International Patent Application No. PCT/JP2016/064343, filed on May 13, 2016, entitled "Terminal Device, Base Station Device, and Communication Method," which claims the benefit of, and priority to, Japanese Patent Application No. 2015-099553, filed on May 15, 2015. The International Patent Application No. PCT/JP2016/064343 and the Japanese Patent Application No. 2015-099553 are hereby incorporated fully by reference into the present application.

TECHNICAL FIELD

Embodiments of the present invention relate to a technique of a terminal device, a base station device, and a communication method that achieve efficient communication.

BACKGROUND ART

The 3rd Generation Partnership Project (3GPP), which is a standardization project, standardized the Evolved Universal Terrestrial Radio Access (hereinafter referred to as the "E-UTRA"), in which high-speed communication is realized by adopting an Orthogonal Frequency-Division Multiplexing (OFDM) communication scheme and flexible scheduling using a unit of prescribed frequency and time called resource block.

Moreover, the 3GPP discusses the Advanced E-UTRA, which realizes higher-speed data transmission and has upper compatibility with the E-UTRA. The E-UTRA relates to a communication system based on a network in which base station devices have substantially the same cell configuration (cell size); however, regarding the Advanced E-UTRA, discussion is made on a communication system based on a network (different-type radio network, Heterogeneous Network) in which base station devices (cells) having different configurations coexist in the same area. The E-UTRA is also referred to as the "Long Term Evolution (LTE)", and the Advanced E-UTRA is also referred to as the "LTE-Advanced". The LTE may be a general term including the LTE-Advanced.

A carrier aggregation (CA) technique and a dual connectivity (DC) technique are defined, in which, in a communication system where cells (macro cells) having large cell radii and cells (small cells) having smaller cell radii than those of the macro cells coexist as in a heterogeneous network, a terminal device performs communication by connecting to a macro cell and a small cell at the same time (NPL 1).

On the other hand, discussion is made on Licensed-Assisted Access (LAA) in NPL 2. In the LAA, an Unlicensed spectrum used in a wireless Local Area Network (LAN) is used as the LTE, for example. Specifically, the Unlicensed spectrum is configured as a Secondary cell (secondary component carrier). The Secondary cell used as the LAA is assisted regarding connection, communication, and/or configuration by a Primary cell (primary component carrier) configured in a Licensed spectrum. The LAA extends a spectrum available to the LTE, allowing broadband transmission. The LAA is also used in a shared spectrum which is shared between predetermined operators.

Moreover, latency in radio communication is one of critical factors in a system aiming at ensuring security and reliability. For the LTEs including the LTE using the LAA and the LTE of the related art using a Licensed spectrum, it is important to further reduce latency.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 12), 3GPP TS 36.213 V12.4.0 (2014-12).

NPL 2: RP-141664, Ericsson, Qualcomm, Huawei, Alcatel-Lucent, "Study on Licensed-Assisted Access using LTE", 3GPP TSG RAN Meeting #65, September 2014.

SUMMARY OF INVENTION

Technical Problem

In the LAA, in a case that an Unlicensed spectrum or a shared spectrum is used, the spectrum is shared with another system and/or another operator. However, the LTE is designed on the assumption of being used in a Licensed spectrum or a non-shared spectrum. Therefore, the LTE of the related art cannot be used in the Unlicensed spectrum or the shared spectrum. In addition, reduction in latency in radio communication is desired for the LTEs including the LTE using the LAA and the LTE of the related art using a Licensed spectrum.

The present invention has been made in light of the foregoing, and an object of the present invention is to provide a terminal device, a base station device, and a communication method that enable efficient control of a cell that uses a Licensed spectrum, an Unlicensed spectrum, or a shared spectrum.

Solution to Problem

A terminal device according to an aspect of the present invention is a terminal device (UE) including a reception unit configured to monitor multiple enhanced physical downlink control channels (EPDCCHs) on a Secondary cell. In a case that the Secondary cell is a licensed assisted access Secondary cell and a higher layer parameter of the Secondary cell indicates that a starting position of downlink transmission is either a Subframe boundary or a slot boundary, the terminal device is configured to monitor both a first set of UE-specific search space candidates in a first EPDCCH and a second set of UE-specific search space candidates in a second EPDCCH, in a subframe. A starting symbol for the first EPDCCH is specified by an index in a first slot in the subframe. A starting symbol for the second EPDCCH is specified by the index in a second slot in the subframe.

A base station device according to an aspect of the present invention is a base station device configured to communicate with a terminal device (UE). The base station device includes a transmission unit configured to transmit multiple enhanced physical downlink control channels (EPDCCHs) on a Secondary cell. In a case that the Secondary cell is a licensed assisted access Secondary cell and a higher layer parameter of the Secondary cell indicates that a starting position of downlink transmission is either a Subframe boundary or a slot boundary, the terminal device is configured to monitor both a first set of UE-specific search space candidates in a first EPDCCH and a second set of the UE-specific search space candidates in a second EPDCCH, in a subframe. A starting symbol for the first EPDCCH is specified by an index in a first slot in the subframe. A starting symbol for the second EPDCCH is specified by the index in a second slot in the subframe.

A communication method of a terminal device according to an aspect of the present invention is a communication method of a terminal device (UE). The communication method includes the step of monitoring, by the terminal device, multiple enhanced physical downlink control channels (EPDCCHs) on a Secondary cell. In a case that the Secondary cell is a licensed assisted access Secondary cell and a higher layer parameter of the Secondary cell indicates that a starting position of downlink transmission is either a Subframe boundary or a slot boundary, the terminal device is configured to monitor both a first set of UE-specific search space candidates in a first EPDCCH and a second set of the UE-specific search space candidates in a second EPDCCH, in a subframe. A starting symbol for the first EPDCCH is specified by an index in a first slot in the subframe. A starting symbol for the second EPDCCH is specified by the index in a second slot in the subframe.

A method of a base station device according to an aspect of the present invention is a communication method of a base station device configured to communicate with a terminal device (UE). The communication method includes the step of transmitting, by the base station device, multiple enhanced physical downlink control channels (EPDCCHs) on a Secondary cell. In a case that the Secondary cell is a licensed assisted access Secondary cell and a higher layer parameter of the Secondary cell indicates that a starting position of downlink transmission is either a Subframe boundary or a slot boundary, the terminal device is configured to monitor both a first set of UE-specific search space candidates in a first EPDCCH and a second set of the UE-specific search space candidates in a second EPDCCH, in a subframe. A starting symbol for the first EPDCCH is specified by an index in a first slot in the subframe. A starting symbol for the second EPDCCH is specified by the index in a second slot in the subframe.

Advantageous Effects of Invention

The present invention can provide improved transmission efficiency in a radio communication system in which a base station device and a terminal device communicate.

BRIEF DESCRIPTION OF DRAWINGS

FIGS. 9A to 9E are diagrams illustrating examples of a configuration of DMRSs associated with a second EPDCCH to be used for a first partial subframe.

FIGS. 10A to 10E are diagrams illustrating examples of a configuration of DMRSs associated with a second EPDCCH to be used for a second partial subframe.

DESCRIPTION OF EMBODIMENTS

First Embodiment

A first embodiment of the present invention will be described below. Description will be given by using a communication system (cellular system) in which a base station device (base station, NodeB, or eNodeB (eNB)) and a terminal device (terminal, mobile station, user device, or User equipment (UE)) communicate in a cell.

Note that, in the description of the present embodiment, the description of downlink covers downlink in a normal cell and downlink in a LAA cell. For example, the description of a downlink subframe includes a downlink subframe in a normal cell, a full subframe in a LAA cell, and a partial subframe in a LAA cell.

Main physical channels and physical signals used in EUTRA and Advanced EUTRA will be described. The channel refers to a medium used to transmit a signal, and the physical channel refers to a physical medium used to transmit a signal. In the present embodiment, the physical channel may be used as a synonym of signal. In the future EUTRA and Advanced EUTRA, the physical channel may be added or its constitution and format type may be changed or added; however, the description of the present embodiment will not be affected even in a case where the channel is changed or added.

In EUTRA and Advanced EUTRA, scheduling of a physical channel or a physical signal is managed by using a radio frame. A single radio frame is 10 ms in length, and a single radio frame is constituted of 10 subframes. In addition, a single subframe is constituted of two slots (i.e., one subframe is 1 ms in length, and a single slot is 0.5 ms in length). Moreover, scheduling is managed by using a resource block as a minimum unit of scheduling for allocating a physical channel. The resource block is defined by a certain frequency domain constituted of a set of multiple subcarriers (e.g., 12 subcarriers) on a frequency axis and a domain constituted of a certain transmission time period (a single slot).

Figure 1:
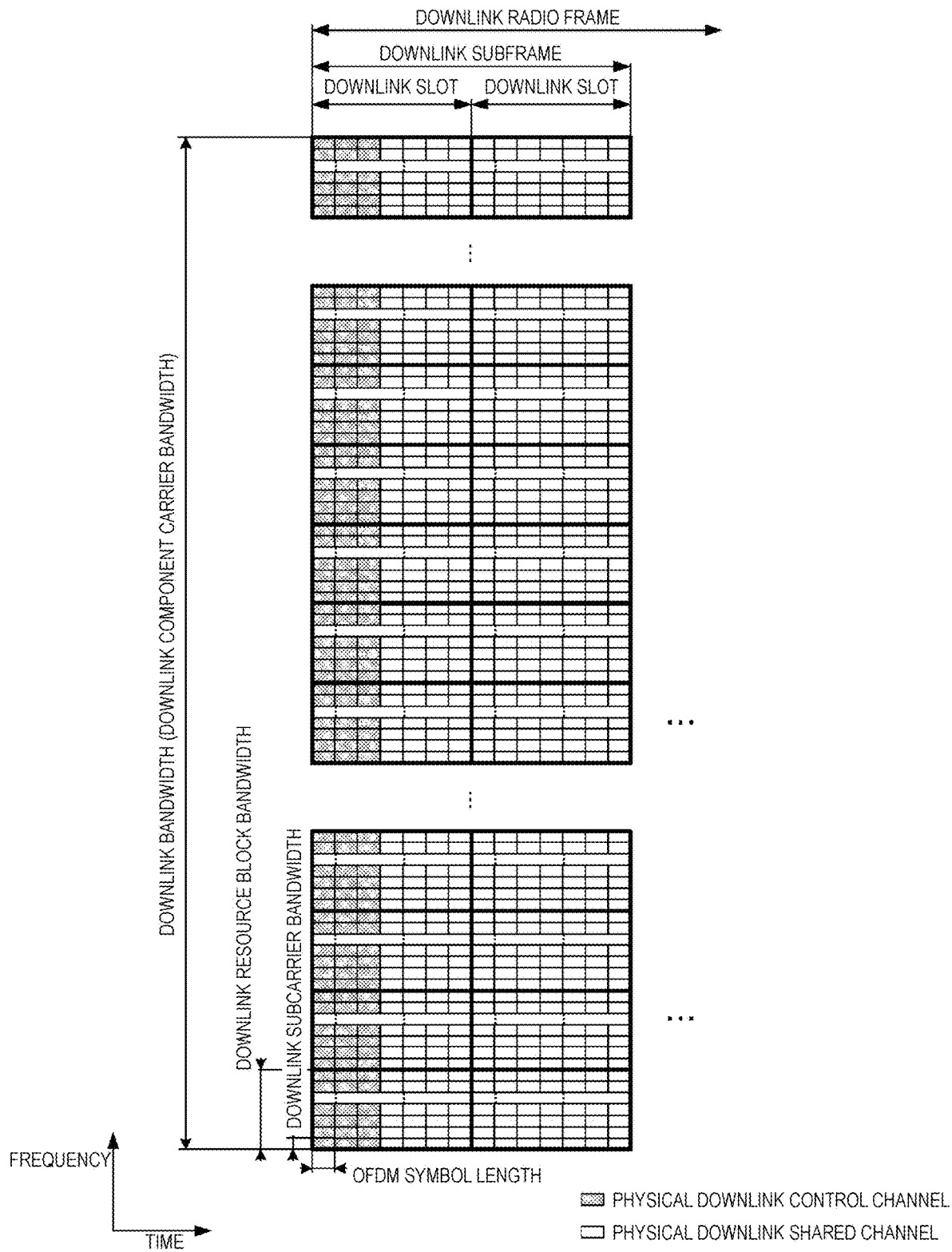
FIG. 1 is a diagram illustrating an example of a downlink radio frame configuration according to the present embodiment.

FIG. 1 is a diagram illustrating an example of a downlink radio frame configuration according to the present embodiment. The downlink uses an OFDM access scheme. In the downlink, a PDCCH, an EPDCCH, a Physical Downlink Shared CHannel (PDSCH), and the like are allocated. A downlink radio frame is constituted by a downlink Resource Block (RB) pair. This downlink RB pair is a unit for allocation of a downlink radio resource and the like and is based on the frequency band of a predefined width (RB bandwidth) and a time duration (two slots=1 subframe). Each of the downlink RB pairs is constituted of two downlink RBs (RB bandwidth×slot) that are contiguous in the time domain. Each of the downlink RBs is constituted of 12 subcarriers in the frequency domain. In the time domain, the downlink RB is constituted of seven OFDM symbols in a case that a normal cyclic prefix is added, while the downlink RB is constituted of six OFDM symbols in a case that a cyclic prefix that is longer than the normal cyclic prefix is added. A domain defined by a single subcarrier in the frequency domain and a single OFDM symbol in the time domain is referred to as a "Resource Element (RE)". A Physical Downlink Control Channel is a physical channel on which downlink control information such as a terminal device identifier, Physical Downlink Shared Channel scheduling information, Physical Uplink Shared Channel scheduling information, and a modulation scheme, coding rate, and retransmission parameter are transmitted. Note that, although a downlink subframe in a single Component Carrier (CC) is described here, a downlink subframe is defined for each CC and downlink subframes are approximately synchronized between the CCs.

Although not illustrated here, Synchronization Signals, a Physical Broadcast Information Channel, and a downlink Reference Signal (RS) may be assigned, to a downlink subframe. Examples of a downlink Reference Signal include a Cell-specific Reference Signal (CRS: Cell-specific RS), which is transmitted through the same transmission port as that for a PDCCH, a Channel State Information Reference Signal (CSI-RS), which is used to measure Channel State Information (CSI), a terminal-specific Reference Signal (URS: UE-specific RS), which is transmitted through the same transmission port as that of one or some PDSCHs, and a Demodulation Reference Signal (DMRS: Demodulation RS), which is transmitted through the same transmission port as that for an EPDCCH. Moreover, carriers on which no CRS is assigned may be used. In this case, a signal (referred to as an "enhanced Synchronization Signal") similar to a signal corresponding to one or some transmission ports (e.g., only transmission port 0) or all the transmission ports for the CRSs can be inserted into one or some subframes (e.g., the first and sixth subframes in the radio frame) as time and/or frequency tracking signals. The terminal-specific Reference Signal transmitted through the same transmission port as that of one or some PDSCHs is also referred to as a "terminal-specific Reference Signal associated with a PDSCH" or a "DMRS". The Demodulation Reference Signal transmitted through the same transmission port as that of the EPDCCH is also referred to as a "DMRS associated with an EPDCCH".

Although not illustrated here, a Discovery Signal (DS) may be assigned to the downlink subframe. For the terminal, a Discovery signals measurement timing configuration (DMTC) is set up (configured) based on a parameter configured via RRC signaling. A DMTC Occasion is 6 ms in length and is constituted of six contiguous subframes. Moreover, the terminal presumes that no DS is transmitted in any subframes outside the DMTC Occasion.

In a cell, the DS (DS Occasion) is constituted of a time period (DS period) of a prescribed number of contiguous subframes. The prescribed number is 1 to 5 in FDD (Frame structure type 1), and 2 to 5 in TDD (Frame structure type 2). The prescribed number is configured by RRC signaling. The DS period or its configuration is also referred to as a "Discovery signals measurement timing configuration (DMTC)". The terminal presumes that the DS is transmitted (mapped, generated) for each subframe configured by a parameter dmtc-Periodicity configured by RRC signaling. The terminal presumes that the DS configured to include the following signals exists in the downlink subframe.

(1) An CRS on an antenna port 0 within a DwPTS of all the downlink subframes and all special subframes in the DS period.

(2) A PSS in the first subframe in the DS period in FDD. A PSS in the second subframe in the DS period in TDD.

(3) An SSS in the first subframe in the DS period.

(4) A non-zero-power CSI-RS in zero or more subframe in the DS period. The non-zero-power CSI-RS is configured by RRS signaling.

The terminal performs measurement based on the configured DS. The measurement is performed by using the CRS in the DS or the non-zero-power CSI-RS in the DS. In the configuration concerning the DS, multiple non-zero-power CSI-RSs can be configured.

The DS and DMTC in the LAA cell can be the same as a DS and DMTC in FDD. For example, in the LAA cell, the DS period is any of 1 to 5 as in FDD, and the PSS exists in the first subframe in the DS period. Note that the DS in the LAA cell may be configured differently from a DS in a normal cell. For example, the DS in the LAA cell does not include any CRS. Moreover, the DS in the LAA cell includes a PSS and SSS that can shift in the frequency direction.

Moreover, in the LAA cell, a control signal and/or a control channel including control information can be transmitted at a subframe in the DS Occasion or a subframe in the DMTC Occasion. The control information can include information on the LAA cell. For example, the control information is information on the frequency, the load, the congestion degree, the interference, the transmit power, the channel occupation time, and/or the buffer state relating to transmission data, in the LAA cell.

Moreover, the control signal and/or the control channel can be demodulated or detected through the DMRS in the DS Occasion. In other words, the control signal and/or the control channel is transmitted via an antenna port used for DMRS transmission in the DS Occasion. Specifically, the DMRS in the DS Occasion is a Demodulation Reference Signal (DMRS) associated with the control signal and/or the control channel and can be configured similarly to the DMRS associated with the PDSCH or the EPDCCH.

Moreover, the scramble sequence used for the DMRS associated with the control signal and/or the control channel may be generated differently from the scramble sequence used for the DMRS associated with the PDSCH or the EPDCCH. Here, the scramble sequence used for the DMRS is generated with a value calculated based on the slot number (subframe number), the first parameter, and the second parameter, which are used as initial values. For example, in the scramble sequence used for the DMRS associated with the PDSCH, the first parameter is a Cell Identifier (Cell ID) or a value configured by a higher layer, and the second parameter is 0 or 1 given by the DCI. In a case that the second parameter is not given by the DCI, the second parameter is fixed at 0. In the scramble sequence used for the DMRS associated with the EPDCCH, the first parameter is a value configured by a higher layer for each EPDCCH set, and the second parameter is fixed at 2.

In the scramble sequence used for the DMRS associated with the control signal and/or the control channel, the first parameter is a value configured by a higher layer, and is the Cell Identifier of the LAA cell or the Cell Identifier corresponding to the non-zero-power CSI-RS in the DS Occasion. In the scramble sequence used for the DMRS associated with the control signal and/or the control channel, the second parameter is a value fixed at a prescribed value or a value configured by a higher layer. In a case that the second parameter is fixed at the prescribed value, the second parameter takes a value of any of 0, 1, and 2 similar to the second parameter used in the scramble sequence used for the DMRS associated with the PDSCH or the EPDCCH, or a value (for example, 3) different from the second parameter used in the scramble sequence used for the DMRS associated with the PDSCH or the EPDCCH. In a case that the second parameter is configured by a higher layer, the second parameter can be configured at any value and can be configured, for example, at an operator-specific value.

Moreover, the control signal and/or the control channel can be demodulated or detected through use of a CRS in the DS Occasion. In other words, the control signal and/or the control channel is transmitted via an antenna port used for CRS transmission in the DS Occasion. Note that a scramble sequence used for the CRS in the DS Occasion can be generated based on the first parameter and/or the second parameter described with respect to the scramble sequence used for the DMRS associated with the control signal and/or the control channel.

Figure 2:
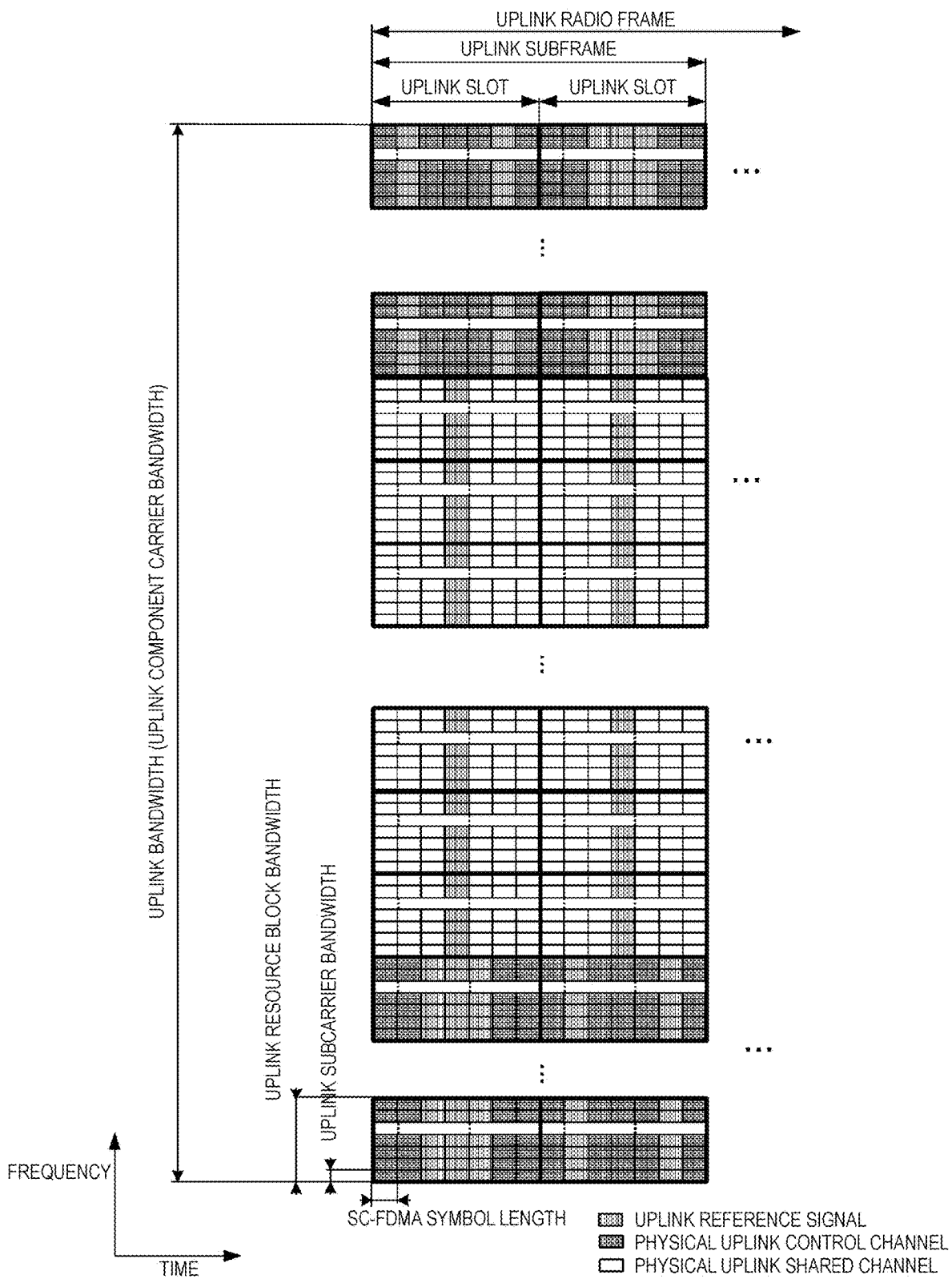
FIG. 2 is a diagram illustrating an example of an uplink radio frame configuration according to the present embodiment.

FIG. 2 is a diagram illustrating an example of an uplink radio frame configuration according to the present embodiment. The uplink uses an SC-FDMA scheme. In the uplink, a Physical Uplink Shared Channel (PUSCH), a PUCCH, and the like are allocated. An uplink Reference Signal is assigned to one or some of PUSCHs and PUCCHs. An uplink radio frame is constituted of uplink RB pairs. This uplink RB pair is a unit for allocation of uplink radio resources and the like and is constituted by the frequency band of a predefined width (RB bandwidth) and a predetermined time duration (two slots=1 subframe). A single uplink RB pair is constituted by two uplink RBs (RB bandwidth× slots) that are contiguous in the time domain. Each of the uplink RBs is constituted of 12 subcarriers in the frequency domain. In the time domain, the uplink RB is constituted of seven SC-FDMA symbols when a normal cyclic prefix is added, while the uplink RB is constituted of six SC-FDMA symbols when a cyclic prefix that is longer than the normal cyclic prefix is added. Note that although an uplink subframe in a single CC is described here, an uplink subframe is defined for each CC.

A Synchronization Signal is constituted by three kinds of primary Synchronization Signals and secondary Synchronization Signals constituted by 31 kinds of codes that are interleaved in the frequency domain. 504 patterns of cell identifiers (Physical Cell Identities; PCIs) for identifying base station devices, and frame timing for radio synchronization are indicated in combinations with the primary Synchronization Signals and the secondary Synchronization Signals. The terminal device identifies the Physical Cell ID of a received Synchronization Signal by cell search.

A Physical Broadcast Channel (PBCH) is transmitted for the purpose of announcing (configuring) a control parameter (broadcast information (System information)) commonly used among the terminal devices within the cell. The radio resource in which broadcast information is transmitted is announced on the Physical Downlink Control Channel to the terminal devices in the cell. Broadcast information not announced on the Physical Broadcast Information Channel is transmitted, as a layer-3 message (System information) for announcing the broadcast information on the Physical Downlink Shared Channel, by the announced radio resource.

As broadcast information, a Cell Global Identifier (CGI), which indicates a cell-specific identifier, a Tracking Area Identifier (TAI) for managing a standby area in paging, random access configuration information (such as a transmission timing timer), shared radio resource configuration information, neighboring cell information, and uplink access control information of the cell, and the like are announced.

A downlink Reference Signal is classified into multiple types according to its use. For example, Cell-specific RSs (Cell-specific reference signals) are pilot signals transmitted with prescribed power from each cell and are downlink Reference Signals periodically repeated in the frequency domain and the time domain under a prescribed rule. The terminal device receives the Cell-specific RS and thereby measures the reception quality of each cell. The terminal device also uses a Cell-specific RS as a Reference Signal for demodulation of a Physical Downlink Control Channel or a Physical Downlink Shared Channel transmitted at the same time as a Cell-specific RS. A sequence used for a Cell-specific RS is a sequence distinguishable among the cells.

The downlink Reference Signal is also used for estimation of downlink channel variation. A downlink Reference Signal used for estimation of channel variations is referred to as a "Channel State Information Reference Signal (CSI-RS)". A downlink Reference Signal individually configured for the terminal device is referred to as a "UE-specific Reference Signals (URS), a Demodulation Reference Signal (DMRS), or a Dedicated RS (DRS)", and is referred to for a channel compensation process for demodulating an Enhanced Physical Downlink Control Channel or a Physical Downlink Shared Channel.

A Physical Downlink Control Channel (PDCCH) is transmitted by using the first several OFDM symbols (e.g., 1 to 4 OFDM symbols) of each subframe. The Enhanced Physical Downlink Control Channel (EPDCCH) is a Physical Downlink Control Channel allocated to the OFDM symbols to which the Physical Downlink Shared Channel (PDSCH) is allocated. The PDCCH or EPDCCH is used for notifying each terminal device of radio resource allocation information according to scheduling determined by the base station device and information indicating an adjustment amount for an increase or decrease in transmit power. In the following, even when the Physical Downlink Control Channel (PDCCH) alone is described, both physical channels that is, the PDCCH and the EPDCCH, are included unless otherwise noted.

The terminal device needs to monitor a Physical Downlink Control Channel addressed to the terminal device itself, and receive the Physical Downlink Control Channel addressed to the terminal device itself, before transmitting and receiving downlink data or a layer-2 message or layer-3 message, which is higher-layer control information (such as a paging or handover command), and thereby acquire, from the Physical Downlink Control Channel, radio resource allocation information called an uplink grant in a case of transmission and a downlink grant (downlink assignment) in a case of reception. Note that it is also possible to constitute the Physical Downlink Control Channel so that the Physical Downlink Control Channel is to be transmitted in the dedicated resource block domain allocated to each terminal device by the base station device, instead of transmission through OFDM symbols described above.

The Physical Uplink Control Channel (PUCCH) is used for an acknowledgment in response to reception of downlink data transmitted on the Physical Downlink Shared Channel (HARQ-ACK; Hybrid Automatic Repeat Request-Acknowledgment or ACK/NACK; Acknowledgment/Negative Acknowledgment), downlink channel (channel state) information (CSI: Channel State Information), and uplink radio resource allocation request (radio resource request, Scheduling Request (SR)).

CSI includes a Channel Quality Indicator (CQI), a Precoding Matrix Indicator (PMI), a Precoding Type Indicator (PTI), and a Rank Indication (RI), which can be used respectively for specifying (representing) a preferable modulation scheme and coding rate, a preferable precoding matrix, a preferable PMI type, and a preferable rank. Indication may be used as a notation for each Indicator. Moreover, the CQI and the PMI are classified into a wideband CQI and PMI assuming transmission using all the resource blocks in a single cell and a subband CQI and PMI assuming transmission using some contiguous resource blocks (subbands) in a single cell. Moreover, the PMI may be a type of PMI that represents a single preferable precoding matrix by using two kinds of PMIs, a first PMI and a second PMI, in addition to a normal type of PMI, which represents a single preferable precoding matrix by using a single PMI.

The Physical Downlink Shared Channel (PDSCH) is also used to notify the terminal device of Broadcast information (System information) that is not notified by paging or on the physical broadcast information channel, in addition to downlink data, as a layer-3 message. The radio resource allocation information on the Physical Downlink Shared Channel is indicated by the Physical Downlink Control Channel. The Physical Downlink Shared Channel is allocated to OFDM symbols other than the OFDM symbols used to transmit a Physical Downlink Control Channel and is transmitted. In other words, the Physical Downlink Shared Channel and the Physical Downlink Control Channel are time division multiplexed in a single subframe.

The Physical Uplink Shared Channel (PUSCH) mainly transmits uplink data and uplink control information and may also transmit information including uplink control information such as CSI and ACK/NACK. Moreover, the Physical Uplink Shared Channel is also used by the terminal device to notify the base station device of the layer-2 message and layer-3 message, which are higher-layer control information, in addition to uplink data. The radio resource allocation information on the Physical Uplink Shared Channel is indicated by the Physical Downlink Control Channel, as in a case of downlink.

The Uplink Reference Signal (also referred to as an "uplink pilot signal" or an "uplink pilot channel") includes a Demodulation Reference Signal (DMRS) to be used by the base station device to demodulate the Physical Uplink Control Channel PUCCH and/or Physical Uplink Shared Channel PUSCH, and a Sounding Reference Signal (SRS) to be mainly used by the base station device to estimate an uplink channel state. Moreover, the Sounding Reference Signals are categorized into a Periodic Sounding Reference Signal (Periodic SRS), which is transmitted periodically, or an Aperiodic Sounding Reference Signal (Aperiodic SRS), which is transmitted when transmission is instructed by the base station device.

A Physical Random Access Channel (PRACH) is a channel used to announce (configure) a preamble sequence with a guard time. The preamble sequence is constituted so that the base station device is notified of the information with multiple sequences. For example, when 64 sequences are available, 6-bit information can be provided to the base station device. The Physical Random Access Channel is used by the terminal device as a means for accessing the base station device.

The terminal device uses the Physical Random Access Channel to request an uplink radio resource when no Physical Uplink Control Channel is configured for an SR or to request the base station device for transmission timing adjustment information (also referred to as a "Timing Advance (TA) command") necessary for matching uplink transmission timing to a reception timing window of the base station device, for example. Moreover, the base station device can request the terminal device to start a random access procedure, by using the Physical Downlink Control Channel.

The layer-3 message is a message exchanged between the RRC (radio resource control) layers of the terminal device and the base station device and handled in a protocol for a Control-plane (C-plane), and may be used as a synonym of RRC signaling or RRC message. A protocol handling user data (uplink data and downlink data) is referred to as a "User-plane (UP (U-plane))" in contrast to the "Control-plane". Here, a transport block which is transmission data in the physical layer, includes C-plane messages and U-plane data in the higher layers. Detailed description of other physical channels is omitted.

A communicable range (communication area) at each frequency controlled by the base station device is assumed to be a cell. Here, the communication area covered by the base station device may be different in size and shape for each frequency. Moreover, the covered area may be different for each frequency. A radio network in which the cells controlled by different types of base station devices and having different cell radii coexist in the area on the same frequency and/or different frequencies to form a single communication system, is referred to as a "heterogeneous network".

The terminal device operates by assuming the inside of a cell as a communication area. When the terminal device moves from a cell to a different cell, the terminal device moves to an appropriate different cell through a cell reselection procedure in a case of having no radio connection (during no communication) and through a handover procedure in a case of having radio connection (during communication). A suitable cell is in general a cell that is determined that access from the terminal device is not prohibited based on information specified by the base station device and that has a downlink reception quality satisfying a prescribed condition.

Moreover, the terminal device and the base station device may employ a technique for aggregating the frequencies (component carriers or frequency band) of multiple different frequency bands through carrier aggregation and treating the resultant as a single frequency (frequency band). A component carrier includes an uplink component carrier corresponding to the uplink and a downlink component carrier corresponding to the downlink. In this specification, "frequency" and "frequency band" may be used as synonyms.

For example, when five component carriers each having a frequency bandwidth of 20 MHz are aggregated through carrier aggregation, a terminal device capable of carrier aggregation performs transmission and reception by assuming that the aggregated carriers have a frequency bandwidth of 100 MHz. Note that component carriers to be aggregated may have contiguous frequencies or frequencies some or all of which are discontiguous. For example, assuming that available frequency bands are a band of 800 MHz, a band of 2 GHz, and a band of 3.5 GHz, a component carrier may be transmitted in a band of 800 MHz, another component carrier may be transmitted in a band of 2 GHz, and yet another component carrier may be transmitted in a band of 3.5 GHz.

It is also possible to aggregate multiple contiguous or discontiguous component carriers of the same frequency band. The frequency bandwidth of each component carrier may be narrower (e.g., 5 MHz or 10 MHz) than the receivable frequency bandwidth (e.g., 20 MHz) of the terminal device, and the frequency bandwidths of component carriers to be aggregated may be different from each other. Each frequency bandwidth is preferably equal to any of the frequency bandwidths of cells of the related art in consideration of backward compatibility but may be a frequency bandwidth different from any of the frequency bands of cells of the related art.

Moreover, component carriers (carrier types) without the backward compatibility may be aggregated. Note that the number of uplink component carriers to be allocated to (configured for or added for) the terminal device by the base station device is preferably the same as or fewer than the number of downlink component carriers.

A cell constituted of an uplink component carrier in which an uplink control channel is configured for a radio resource request and a downlink component carrier having a cell-specific connection with the uplink component carrier is referred to as a "Primary cell (PCell)". A cell constituted of component carriers other than those of the Primary cell is referred to as a "Secondary cell (SCell)". The terminal device receives a paging message, detects update of the broadcast information, carries out an initial access procedure, configures security information, and the like in a Primary cell, and need not perform these operations in Secondary cells.

Although the Primary cell is not a target of Activation and Deactivation controls (in other words, considered as being activated at any time), the Secondary cell has activated and deactivated states, the change of which is explicitly specified by the base station device or is made based on a timer configured for the terminal device for each component carrier. The Primary cell and Secondary cell are collectively referred to as a "Serving cell".

The carrier aggregation is communication using multiple component carriers (frequency bands) by multiple cells and is also referred to as "cell aggregation". The terminal device may have radio connection with the base station device via a relay station device (or repeater) for each frequency. In other words, the base station device of the present embodiment may be replaced with a relay station device.

The base station device manages a cell, which is an area where terminal devices can communicate with the base station device, for each frequency. A single base station device may manage multiple cells. The cells are classified into multiple types of cells depending on the sizes of the areas (cell size) that allow communication with terminal devices. For example, the cells are classified into macro cells and small cells. Moreover, the small cells are classified into femto cells, pico cells, and nano cells depending on the sizes of the areas. When a terminal device can communicate with a certain base station device, the cell configured so as to be used for the communication with the terminal device is referred to as a "Serving cell" while the other cells not used for the communication are referred to as a "Neighboring cell", among the cells of the base station device.

In other words, in carrier-aggregation (also referred to as "carrier aggregation"), multiple Serving cells thus configured include a single Primary cell and one or more Secondary cells.

The Primary cell is a Serving cell in which an initial connection establishment procedure has been carried out, a Serving cell in which a connection re-establishment procedure has been started, or a cell indicated as a Primary cell during a handover procedure. Operation at a primary frequency is performed in the Primary cell. At the point of time when a connection is (re)established, or later, a Secondary cell may be configured. Operation at a secondary frequency is performed in each Secondary cell. The connection may be referred to as an "RRC connection". For the terminal device supporting the CA, a single Primary cell and one or more Secondary cells are aggregated.

In the present embodiment, Licensed Assisted Access (LAA) is used. In the LAA, a Licensed spectrum is configured (used) for the Primary cell, and an Unlicensed spectrum is configured for at least one of the Secondary cells. The Secondary cell for which the Unlicensed spectrum is configured is assisted by the Primary cell or Secondary cell for which the Licensed spectrum is configured. For example, configuration and/or notification of the control information by RRC signaling, MAC signaling, and/or PDCCH signaling is performed from the Primary cell or Secondary cell for which the Licensed spectrum is configured to the Secondary cell for which the Unlicensed spectrum is configured. In the present embodiment, the cell assisted by the Primary cell or Secondary cell is also referred to as an "LAA cell". The LAA cell can be aggregated with (assisted by) the Primary cell and/or the Secondary cell by the carrier aggregation. The Primary cell or Secondary cell assisting the LAA cell is also referred to as an "assist cell". In addition, a cell for which a Licensed spectrum is configured is also referred to as a "normal cell" (cell of the related art), and a subframe in the normal cell is also referred to as a normal subframe (subframe of the related art). The normal subframe includes a downlink subframe, an uplink subframe, and a special subframe. In the present embodiment, description will be given of the normal subframe as distinguished from the subframe used in the LAA cell.

The LAA cell may be aggregated with (assisted by) the Primary cell and/or the Secondary cell through dual connectivity.

A basic configuration (architecture) of the dual connectivity will be described below. A description is given of a case that the terminal device 1 connects to multiple base stations 2 (e.g., a base station device 2-1 and a base station device 2-2) at the same time, for example. Assume that the base station device 2-1 is a base station device constituting a macro cell, and the base station device 2-2 is a base station device constituting a small cell. The terminal device 1 connecting to the base station devices 2 at the same time by using the multiple cells belonging to the multiple base station devices 2 as described above is referred to as "dual connectivity". The cells belonging to the respective base station devices 2 may be operated at the same frequency or different frequencies.

Note that the carrier aggregation is different from the dual connectivity in that a single one of the base station devices 2 manages multiple cells and the frequencies of the respective cells are different from each other. In other words, the carrier aggregation is a technique for connecting the single terminal device 1 and a single one of the base station devices 2 via multiple cells having different frequencies, while the dual connectivity is a technique for connecting the single terminal device 1 and the multiple base station devices 2 via multiple cells having the same frequency or different frequencies.

The terminal device 1 and the base station devices 2 can apply a technique used for the carrier aggregation, to the dual connectivity. For example, the terminal device 1 and the base station devices 2 may apply a technique of allocation of a Primary cell and Secondary cells or Activation/Deactivation, to the cells connected through the dual connectivity.

The base station device 2-1 or the base station device 2-2 is connected to an MME and an SGW via a backbone network. The MME is a host control station device corresponding to a Mobility Management Entity (MME) and has the functions of managing mobility and performing authentication control (security control) for the terminal device 1, and configuring routes for the user data to the base station devices 2. The SGW is a host control station device corresponding to a Serving Gateway (S-GW) and has the functions of transmitting the user data according to the route for the user data to the terminal device 1 configured by the MME.

Moreover, the connection route between the base station device 2-1 or base station device 2-2 and the SGW through the dual connectivity is referred to as an "SGW interface". The connection route between the base station device 2-1 or base station device 2-2 and the MME is referred to as an "MME interface". The connection route between the base station device 2-1 and the base station device 2-2 is referred to as a "base station interface". The SGW interface is also referred to as an "S1-U interface" in the EUTRA. The MME interface is also referred to as an "S1-MME interface" in the EUTRA. The base station interface is also referred to as an "X2 interface" in the EUTRA.

An example of an architecture for enabling the dual connectivity is described. In the dual connectivity, the base station device 2-1 and the MME are connected via the MME interface. Moreover, the base station device 2-1 and the SGW are connected via the SGW interface. The base station device 2-1 provides, to the base station device 2-2, the communication route to the MME and/or SGW via the base station interface. In other words, the base station device 2-2 is connected to the MME and/or the SGW via the base station device 2-1.

Moreover, another example of another architecture for enabling the dual connectivity is described. In the dual connectivity, the base station device 2-1 and the MME are connected via the MME interface. The base station device 2-1 and the SGW are connected via the SGW interface. The base station device 2-1 provides, to the base station device 2-2, the communication route to the MME via the base station interface. In other words, the base station device 2-2 is connected to the MME via the base station device 2-1. The base station device 2-2 is connected to the SGW via the SGW interface.

Note that a constitution in which the base station device 2-2 and the MME are directly connected via the MME interface may be employed.

On the basis of description from a different point of view, the dual connectivity is an operation whereby a prescribed terminal device consumes radio resources provided from at least two different network points (a master base station device (MeNB: Master eNB) and a secondary base station device (SeNB: Secondary eNB)). In other words, in the dual connectivity, the terminal device is configured to establish an RRC connection to at least two network points. In the dual connectivity, the terminal device may be connected via a non-ideal backhaul in an RRC CONNECTED state.

In the dual connectivity, the base station device that is connected to at least the S1-MME and that serves as a mobility anchor of a core network is referred to as a "master base station device". Moreover, the base station device that is not the master base station device and that provides supplemental radio resources to the terminal device is referred to as a "secondary base station device". A group of Serving cells that is associated with the master base station device may be referred to as a "Master Cell Group (MCG)", and a group of Serving cells that is associated with the secondary base station device may be referred to as a "Secondary Cell Group (SCG)". Note that the cell groups may be serving cell groups.

In the dual connectivity, the Primary cell belongs to the MCG. Moreover, in the SCG, the Secondary cell that corresponds to the Primary cell is referred to as a "Primary Secondary Cell" (pSCell). Note that the pSCell may be referred to as a "special cell" or a "Special Secondary Cell (Special SCell)". Some of the functions (e.g., functions for transmitting and receiving a PUCCH) of the PCell (the base station device constituting the PCell) may be supported by the Special SCell (the base station device constituting the Special SCell). Additionally, only some of the functions of the PCell may be supported in the pSCell. For example, the function for transmitting a PDCCH may be supported in the pSCell. Additionally, the function for performing a PDCCH transmission may be supported in the pSCell using a search space different from a CSS or USS. For example, the search space different from the USS is a search space determined based on a value defined in the specification, a search space determined based on an RNTI different from the C-RNTI, a search space determined based on a value configured by the higher layer that is different from the RNTI, or the like. Moreover, the pSCell may constantly be in a starting state. The pSCell is a cell capable of receiving the PUCCH.

In the dual connectivity, a Data Radio Bearer (DRB) may be individually allocated to the MeNB and the SeNB. On the other hand, a Signaling Radio Bearer (SRB) may be allocated only to the MeNB. In the dual connectivity, a duplex mode may be configured individually for the MCG and the SCG or the PCell and the pSCell. In the dual connectivity, the MCG and the SCG or the PCell and the pSCell need not necessarily be synchronized with each other. In the dual connectivity, multiple parameters for timing adjustment (TAG or Timing Advance Group) may be configured for each of the MCG and the SCG. In other words, the terminal device is capable of performing uplink transmission at the multiple different timings in each CG.

In the dual connectivity, the terminal device is allowed to transmit UCI corresponding to the cells in the MCG only to the MeNB (the PCell) and to transmit UCI corresponding to the cells in the SCG only to the SeNB (the pSCell). For example, the UCI is an SR, HARQ-ACK, and/or CSI. Additionally, in each UCI transmission, a transmission method using the PUCCH and/or the PUSCH is applied to each cell group.

All signals can be transmitted and received in the Primary cell, but some signals may not be transmitted and received in the Secondary cell. For example, the Physical Uplink Control Channel (PUCCH) is transmitted only in the Primary cell. Additionally, unless multiple Timing Advance Groups (TAGs) are configured between the cells, a Physical Random Access Channel (PRACH) is transmitted only in the Primary cell. Additionally, a Physical Broadcast Channel (PBCH) is transmitted only in the Primary cell. Additionally, a Master Information Block (MIB) is transmitted only in the Primary cell. Signals that can be transmitted and received in the Primary cell are transmitted and received in the Primary Secondary cell. For example, the PUCCH may be transmitted in the Primary Secondary cell. Additionally, the PRACH may be transmitted in the Primary Secondary cell, regardless of whether the multiple TAGs are configured. Additionally, the PBCH and the MIB may be transmitted in the Primary Secondary cell.

In the Primary cell, a Radio Link Failure (RLF) is detected. In the Secondary cell, even in a case where conditions for the detection of the RLF are in place, the detection of the RLF is not recognized. However, in the Primary Secondary cell, the RLF is detected in a case where the conditions are in place. When the RLF is detected in the Primary Secondary cell, the higher layer of the Primary Secondary cell notifies the higher layer of the Primary cell of that the RLF has been detected. Semi-Persistent Scheduling (SPS) or Discontinuous Reception (DRX) may be performed in the Primary cell. The same DRX as in the Primary cell may be performed in the Secondary cell. Fundamentally, in the Secondary cell, the MAC configuration information/parameters are shared with the Primary cell/Primary Secondary cell of the same cell group. Some of the parameters (e.g., sTAG-Id) may be configured for each Secondary cell. Some of the timers or counters may be applied only to the Primary cell and/or the Primary Secondary cell. A timer or counter to be applied may be configured only in the Secondary cell.

In an example of a case that the dual connectivity is applied to the LAA cell, the MCG (base station device 2-1) is a base station device constituting the Primary cell, and the SCG (base station device 2-2) is a base station device constituting the LAA cell. Specifically, the LAA cell is configured as the pSCell of the SCG.

In another example of a case that the dual connectivity is applied to the LAA cell, the MCG is a base station device constituting the Primary cell, and the SCG is a base station device constituting the pSCell and LAA cell. Specifically, the LAA cell is assisted by the pSCell in the SCG. Note that when a Secondary cell is further configured in the SCG, the LAA cell may be assisted by the Secondary cell.

In another example of the case that the dual connectivity is applied to the LAA cell, the MCG is a base station device constituting the Primary cell and LAA cell, and the SCG is a base station device constituting the pSCell. Specifically, the LAA cell is assisted by the Primary cell in the MCG. Note that when a Secondary cell is further configured in the MCG, the LAA cell may be assisted by the Secondary cell.

Figure 3:
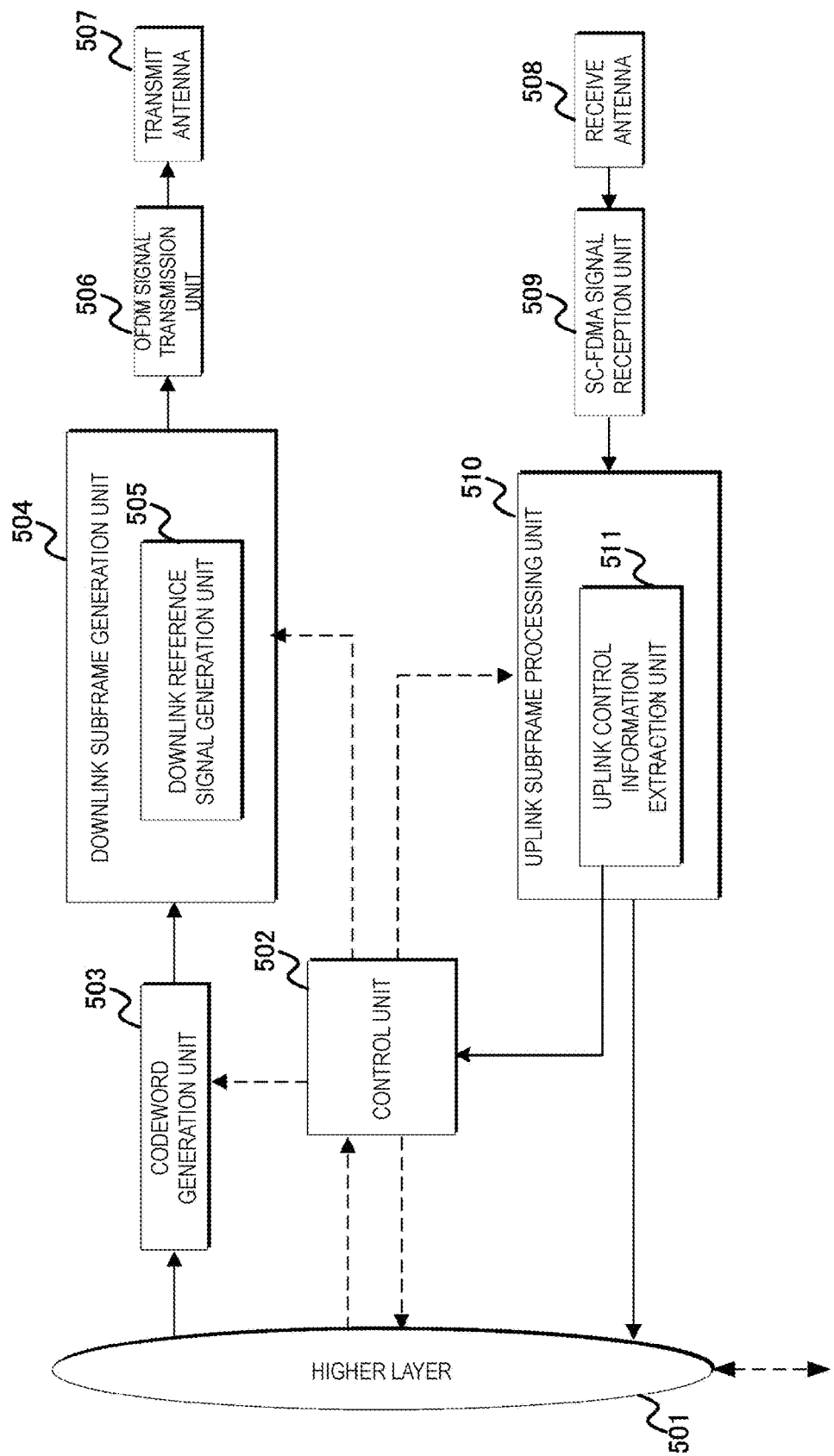
FIG. 3 is a schematic diagram illustrating an example of a block configuration of a base station device 2 according to the present embodiment.

FIG. 3 is a schematic diagram illustrating an example of a block configuration of the base station device 2 according to the present embodiment. The base station device 2 includes a higher layer (higher-layer control information notification unit, higher layer processing unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 includes a downlink Reference Signal generation unit 505. Moreover, the uplink subframe processing unit 510 includes an uplink control information extraction unit (CSI acquisition unit) 511.

Figure 4:
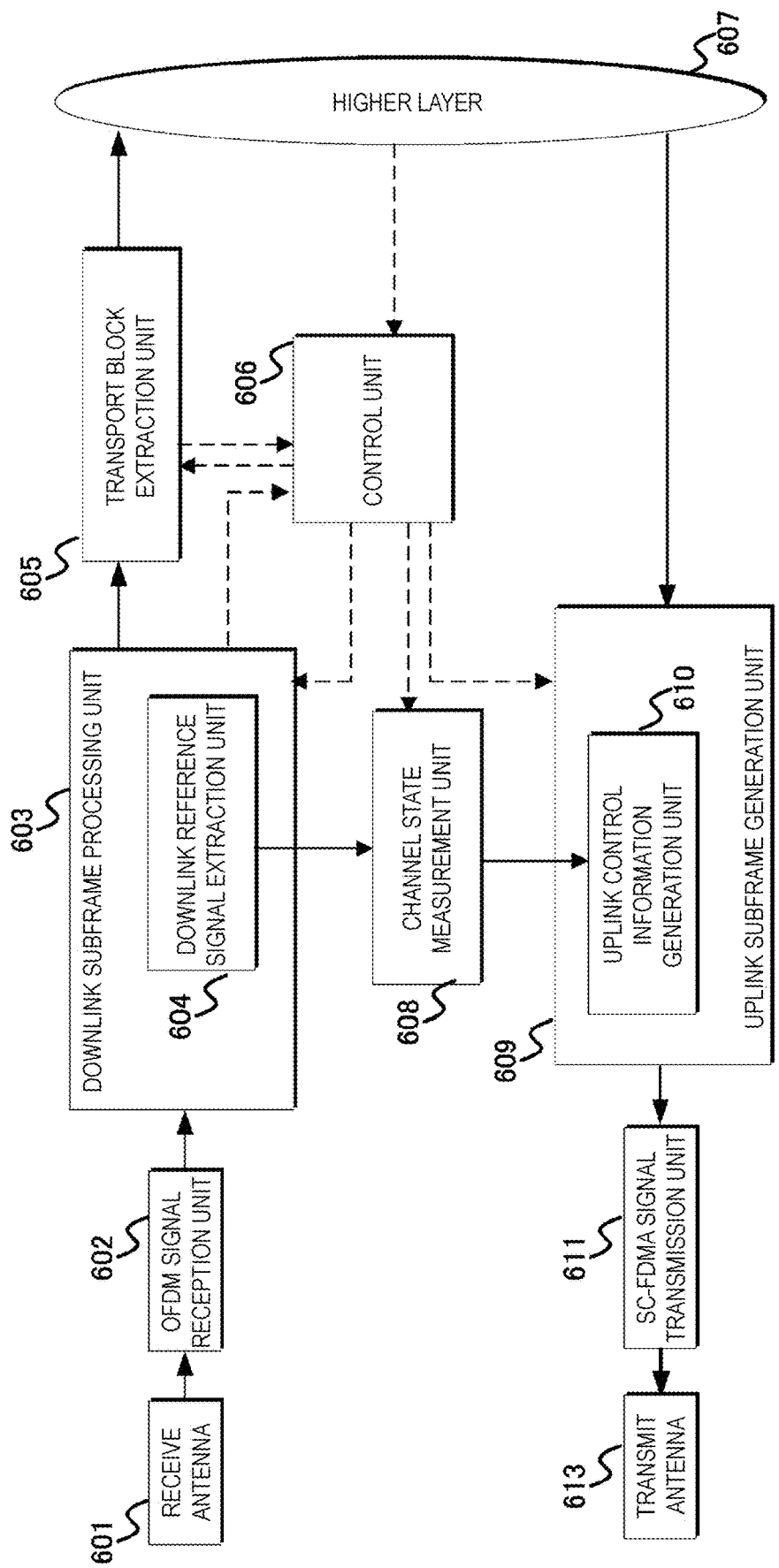
FIG. 4 is a schematic diagram illustrating an example of a block configuration of a terminal device 1 according to the present embodiment.

FIG. 4 is a schematic diagram illustrating an example of a block configuration of the terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit, higher layer processing unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink Reference Signal extraction unit 604. Moreover, the uplink subframe generation unit 609 includes an uplink control information generation unit (UCI generation unit) 610.

First, a flow of downlink data transmission and reception will be described with reference to FIG. 3 and FIG. 4. In the base station device 2, the control unit 502 holds a Modulation and Coding Scheme (MCS) indicating a modulation scheme, a coding rate, and the like in the downlink, downlink resource allocation indicating RBs to be used for data transmission, and information to be used for HARQ control (a Redundancy Version, an HARQ process number, and a new data indicator) and controls the codeword generation unit 503 and downlink subframe generation unit 504 based on these elements. The downlink data (also referred to as a downlink transport block) transmitted from the higher layer 501 is processed through error correction coding, rate matching, and the like in the codeword generation unit 503 under the control of the control unit 502 and then, a codeword is generated. Two codewords at maximum are transmitted at the same time in a single subframe of a single cell. In the downlink subframe generation unit 504, a downlink subframe is generated in accordance with an instruction from the control unit 502. First, a codeword generated in the codeword generation unit 503 is converted into a modulation symbol sequence through a modulation process, such as Phase Shift Keying (PSK) modulation or Quadrature Amplitude Modulation (QAM). Moreover, the modulation symbol sequence is mapped to the REs in some RBs, and a downlink subframe for each antenna port is generated through a precoding process. In this operation, a transmission data sequence transmitted from the higher layer 501 includes higher-layer control information, which is control information on the higher layer (e.g., dedicated (individual) Radio Resource Control (RRC) signaling). Moreover, in the downlink Reference Signal generation unit 505, a downlink Reference Signal is generated. The downlink subframe generation unit 504 maps the downlink Reference Signal to the REs in the downlink subframes in accordance with an instruction from the control unit 502. The downlink subframe generated in the downlink subframe generation unit 504 is modulated to an OFDM signal in the OFDM signal transmission unit 506 and then transmitted via the transmit antenna 507. Although a configuration of including one OFDM signal transmission unit 506 and one transmit antenna 507 is provided as an example here, a configuration of including multiple OFDM signal transmission units 506 and transmit antennas 507 may be employed when downlink subframes are transmitted on multiple antenna ports. Moreover, the downlink subframe generation unit 504 may also have the capability of generating physical-layer downlink control channels, such as a PDCCH and an EPDCCH, to map the channels to the REs in downlink subframes. The multiple base station devices (base station device 2-1 and base station device 2-2) transmit separate downlink subframes.

In the terminal device 1, an OFDM signal is received by the OFDM signal reception unit 602 via the receive antenna 601, and an OFDM demodulation process is performed on the signal. The downlink subframe processing unit 603 first detects physical-layer downlink control channels, such as a PDCCH and an EPDCCH. More specifically, the downlink subframe processing unit 603 decodes the signal by assuming that a PDCCH and an EPDCCH have been transmitted in the regions to which the PDCCH and the EPDCCH can be allocated, and checks Cyclic Redundancy Check (CRC) bits added in advance (blind decoding). In other words, the downlink subframe processing unit 603 monitors a PDCCH and an EPDCCH. When the CRC bits match an ID (a single terminal-specific identifier assigned to a single terminal, such as a Cell-Radio Network Temporary Identifier (C-RNTI) or a Semi-Persistent Scheduling-C-RNTI (SPS-C-RNTI), or a Temporary C-RNTI) assigned by the base station device in advance, the downlink subframe processing unit 603 recognizes that a PDCCH or an EPDCCH has been detected and extracts a PDSCH by using control information included in the detected PDCCH or EPDCCH. The control unit 606 holds an MCS indicating a modulation scheme, a coding rate, and the like in the downlink based on the control information, downlink resource allocation indicating RBs to be used for downlink data transmission, and information to be used for HARQ control, and controls the downlink subframe processing unit 603, the transport block extraction unit 605, and the like based on these elements. More specifically, the control unit 606 performs control so as to carry out an RE mapping process in the downlink subframe generation unit 504, an RE demapping process and demodulation process corresponding to the modulation process, and the like. The PDSCH extracted from the received downlink subframe is transmitted to the transport block extraction unit 605. The downlink Reference Signal extraction unit 604 in the downlink subframe processing unit 603 extracts the downlink Reference Signal from the downlink subframe. In the transport block extraction unit 605, a rate matching process, a rate matching process corresponding to error correction coding, error correction decoding, and the like in the codeword generation unit 503 are carried out, and a transport block is extracted and transmitted to the higher layer 607. The transport block includes the higher-layer control information, and the higher layer 607 notifies the control unit 606 of a necessary physical-layer parameter based on the higher-layer control information. The multiple base station devices 2 (base station device 2-1 and base station device 2-2) transmit separate downlink subframes, and the terminal device 1 receives the downlink subframes. Hence, the above-described processes may be carried out for the downlink subframe of each of the multiple base station devices 2. In this case, the terminal device 1 may recognize that multiple downlink subframes have been transmitted from the multiple base station devices 2, or need not recognize this. In a case that the terminal device 1 does not recognize the above, the terminal device 1 may simply recognize that multiple downlinks subframes have been transmitted from multiple cells. Moreover, the transport block extraction unit 605 determines whether the transport block has been detected correctly and transmits the determination result to the control unit 606.

Next, a flow of uplink signal transmission and reception will be described. In the terminal device 1, a downlink Reference Signal extracted by the downlink Reference Signal extraction unit 604 is transmitted to the channel state measurement unit 608 under the instruction from the control unit 606, the channel state and/or interference is measured in the channel state measurement unit 608, and further CSI is calculated based on the measured channel state and/or interference. The control unit 606 instructs the uplink control information generation unit 610 to generate an HARQ-ACK (DTX (not transmitted yet), ACK (detection succeeded), or NACK (detection failed)) and map the resultant to a downlink subframe based on the determination result of whether the transport block is correctly detected. The terminal device 1 performs these processes on the downlink subframe of each of multiple cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped to the RBs in an uplink subframe to generate an uplink subframe. The uplink subframe is subjected to the SC-FDMA modulation to generate an SC-FDMA signal, and the SC-FDMA signal is transmitted via the transmit antenna 613 by the SC-FDMA signal transmission unit 611.

The LAA cell is described in detail below.

Frequencies used by the LAA cell are shared by other communication systems and/or other LTE operators. In frequency sharing, fairness among the LAA cell and other communication systems and/or other LTE operators is needed. For example, a fair frequency sharing technique (method) is needed in a communication scheme used by the LAA cell. In other words, the LAA cell is a cell in which a communication scheme (communication procedure) to which the fair frequency sharing technique is applicable (or usable for) is performed.

An example of the fair frequency sharing technique is Listen-Before-Talk (LBT). In the LBT, before a base station or terminal transmits a signal using a frequency (component carrier, cell), an interference power of the frequency (interference signal, received power, received signal, noise power, or noise signal) or the like is measured (or detected) to identify (detect, presume, or determine) whether the frequency is in an idle state (available state, congested state, Presence, or Occupied), or a busy state (unavailable state, not-congested state, Absence, or Clear). In a case that the frequency is identified as being in the idle state based on the LBT, the LAA cell can transmit a signal at the frequency at a prescribed timing. In a case that the frequency is identified as being in the busy state based on the LBT, the LAA cell does not transmit a signal at the frequency at a prescribed timing. The LBT makes it possible to control to not interfere the signals transmitted by other base stations and/or terminals including other communication systems and/or other LTE operators.

A procedure of the LBT is defined as a mechanism to which a CCA check is applied before a base station or a terminal uses the frequency (channel). In the CCA, the power or signal is detected for deciding whether other signals are present on the channel in order to identify whether the frequency is in the idle state or the busy state. Note that the definition of CCA may be equivalent to the definition of LBT in the present embodiment.

In the CCA, a method for deciding the presence/absence of other signals may include various methods. For example, in the CCA, the presence/absence of other signals is decided based on whether an interference power at a frequency exceeds a threshold. Moreover, for example, in the CCA, the presence/absence of other signals is decided based on whether a prescribed signal at a frequency or a received power on a channel exceeds a threshold. The threshold may be defined in advance. The threshold may be configured by the base station or other terminals. The threshold may be decided (configured) at least based on other value (parameter) such as a transmit power (maximum transmit power).

Note that the CCA in the LAA cell does not need to be recognized by the terminal connected (configured) to the LAA cell.

The LAA cell may be defined as a cell different from the Secondary cell where the Licensed spectrum is used. For example, the LAA cell is configured differently from the configuration of the Secondary cell where the Licensed spectrum is used. Some parameters configured to the LAA cell are not configured to the Secondary cell where the Licensed spectrum is used. Some parameters configured to the Secondary cell where the Licensed spectrum is used are not configured to the LAA cell. In the present embodiment, the LAA cell is described as a cell different from the Primary cell and Secondary cell, but the LAA cell may be defined as one of the Secondary cells. The Secondary cell of the related art is also referred to as a "first Secondary cell", and the LAA cell is also referred to as a "second Secondary cell". The Primary cell and Secondary cell of the related art are also referred to as a "first Serving cell", and the LAA cell is also referred to as a "second Serving cell".

The LAA cell may be different from the frame structure type of the related art. For example, in the Serving cell of the related art, a first frame structure type (FDD, frame structure type 1) or a second frame structure type (TDD, frame structure type 2) is used (configured), but in the LAA cell, a third frame structure type (frame structure type 3) is used (configured).

Here, the Unlicensed spectrum is a frequency different from the Licensed spectrum allocated as a proprietary frequency to a prescribed operator. For example, the Unlicensed spectrum is a frequency used by a wireless LAN. For example, the Unlicensed spectrum is a frequency not configured in the LTE of the related art, and the Licensed spectrum is a frequency configurable in the LTE of the related art. In the present embodiment, the frequency configured in the LAA cell is described as the Unlicensed spectrum, but is not limited thereto. Specifically, the Unlicensed spectrum may be replaced with the frequency configured in the LAA cell. For example, the Unlicensed spectrum is a frequency not configurable in the Primary cell, but is a frequency configurable only in the Secondary cell. For example, the Unlicensed spectrum includes a frequency shared by multiple operators. For example, the Unlicensed spectrum is a frequency configured only to a cell which is subjected to a configuration, presumption and/or process different from those in the Primary cell or Secondary cell of the related art.

The LAA cell may be a cell where a scheme different from scheme of the related art is used concerning the configuration of a radio frame, a physical signal, and/or physical channel and the like and communication procedure in LTE.

For example, in the LAA cell, a prescribed signal and/or channel configured (transmitted) in the Primary cell and/or Secondary cell is not configured (transmitted). The prescribed signal and/or channel includes the CRS, DS, PDCCH, EPDCCH, PDSCH, PSS, SSS, PBCH, PHICH, PCFICH, CSI-RS and/or SIB, and the like. For example, signals and/or channels not configured in the LAA cell are as below. Note that the signal and/or channel described below may be used in combination. Note that in the present embodiment, the signal and/or channel not configured in the LAA cell may read as the signal and/or channel which the terminal does not expect transmission from the LAA cell.

(1) In the LAA cell, the control information in a physical layer is transmitted not on the PDCCH but only on the EPDCCH.

(2) In the LAA cell, even in a subframe in an activation state (ON), the CRS, DMRS, URS, PDCCH, EPDCCH and/or PDSCH are not transmitted at any of the subframes, and the terminal does not presume the transmission at every subframe.

(3) In the LAA cell, the terminal presumes that the DRS, PSS, and/or SSS is transmitted at the subframe in the activation state (ON).

(4) In the LAA cell, the terminal is notified of information on the mapping of the CRS for each subframe, and presumes the mapping of the CRS based on the information. For example, in the presumed mapping of the CRS, the CRS is not mapped to all the Resource Elements of the subframe. In the presumed mapping of the CRS, the CRS is not mapped to some of the Resource Elements of the subframe (e.g., all Resource Elements of the first 2 OFDM symbols). In the presumed mapping of the CRS, the CRS is mapped to all the Resource Elements of the subframe. For example, the information on the mapping of the CRS is notified from the LAA cell or a cell different from the LAA cell. The information on the mapping of the CRS is included in the DCI, and notified by the PDCCH or EPDCCH.

For example, in the LAA cell, a prescribed signal and/or channel not configured (transmitted) in the Primary cell and/or Secondary cell is configured (transmitted).

For example, in the LAA cell, only the downlink component carrier or subframe is defined to transmit only the downlink signal and/or channel. In other words, in the LAA cell, the uplink component carrier or subframe is not defined and the uplink signal and/or channel is not transmitted.

Moreover, for example, a Downlink Control Information (DCI) format compliant with the LAA cell is different from a DCI format compliant with the Primary cell and/or Secondary cell. The DCI format compliant with only the LAA cell is defined. The DCI format compliant with the LAA cell includes the control information effective only in the LAA cell.

For example, in the LAA cell, presumption of the signal and/or channel is different from those in the Secondary cell of the related art.

First, the presumption of the signal and/or channel in the Secondary cell of the related art is described. The terminal satisfying some or all of conditions below presumes that the PSS, SSS, PBCH, CRS, PCFICH, PDSCH, PDCCH, EPDCCH, PHICH, DMRS and/or CSI-RS may not be transmitted by the Secondary cell except for the DS transmission. The terminal presumes that the DS is always transmitted by the Secondary cell. The presumption is continued until a subframe at which an activation command (a command for activation) is received by the terminal in the Secondary cell at a certain carrier frequency.

(1) The terminal supports the configuration (parameter) concerning the DS.

(2) RRM measurement based on the DS is configured to the terminal in the Secondary cell.

(3) The Secondary cell is in a deactivation state (deactivated state).

(4) The terminal is not configured to receive MBMS by the higher layer in the Secondary cell.

In a case that the Secondary cell is in the activation state (activated state), the terminal presumes that the PSS, SSS, PBCH, CRS, PCFICH, PDSCH, PDCCH, EPDCCH, PHICH, DMRS and/or CSI-RS are transmitted at the configured prescribed subframes or all of the subframes by the Secondary cell.

Next, an example of the presumption of the signal and/or channel in the LAA cell is described. The terminal satisfying some or all of conditions below presumes that transmission of the PSS, SSS, PBCH, CRS, PCFICH, PDSCH, PDCCH, EPDCCH, PHICH, DMRS and/or CSI-RS as well as the DS transmission may not be performed by LAA cell. The presumption is continued until a subframe at which an activation command (a command for activation) is received by the terminal in the Secondary cell at a certain carrier frequency.

(1) The terminal supports the configuration (parameter) concerning the DS.

(2) RRM measurement based on the DS is configured to the terminal in the LAA cell.

(3) The LAA cell is in a deactivation state (deactivated state).

(4) The terminal is not configured to receive MBMS by the higher layer in the LAA cell.

Furthermore, another example of the presumption of the signal and/or channel in the LAA cell is described. In a case that the LAA cell is in the deactivation (deactivated state), the presumption of the signal and/or channel in the LAA cell is the same as the presumption of the signal and/or channel in the Secondary cell of the related art. In a case that the LAA cell is in the activation (activated state), the presumption of the signal and/or channel in the LAA cell is different from the presumption of the signal and/or channel in the Secondary cell of the related art. For example, in the case that the LAA cell is in the activation state (activated state), the terminal presumes that the PSS, SSS, PBCH, CRS, PCFICH, PDSCH, PDCCH, EPDCCH, PHICH, DMRS and/or CSI-RS may not be transmitted by the LAA cell at a subframe other than the prescribed subframes configured by the LAA cell. Details thereof is described later.

Next, a communication procedure in the LAA cell is described in detail. In the LAA cell, channel and/or signal transmission can be started based on the LBT at timing independent of a Subframe boundary. Moreover, in the LAA cell, channel and/or signal transmission can be ended based on the LBT and the maximum burst length for which transmission is possible, at timing independent of the Subframe boundary. In other words, the channel and/or the signal can be transmitted at a partial subframe. The partial subframe can be defined, for example, as follows. Here, in the present embodiment, OFDM symbols, at which transmission is possible, indicated by the partial subframe can be defined as a symbol. At the symbol, it is presumed that the terminal transmits each of or all the channels and/or the signals.

(1) In a subframe, transmission is possible at the area from an OFDM symbol in the middle of the subframe to the last OFDM symbol of the subframe (Subframe boundary). In the present embodiment, the area is also referred to as a first partial subframe.

(2) In a subframe, transmission is possible at the area from the first OFDM symbol of the subframe (Subframe boundary) to an OFDM symbol in the middle of the subframe. In the present embodiment, the area is also referred to as a second partial subframe.

(3) In a subframe, transmission is possible at the area from an OFDM symbol in the middle of the subframe to an OFDM symbol in the middle of the subframe. In the present embodiment, the area is also referred to as a third partial subframe.

Moreover, in the partial subframe, the number of OFDM symbols in the middle of the subframe can be limited to a prescribed number. For example, the prescribed number is 2, 3, and/or 4.

In a case that the prescribed number is 2, the partial subframe can be set to one slot or one subframe (two slots), for example. In other words, the time direction unit of the second EPDCCH is one slot or one subframe. In a case that the time direction unit of the second EPDCCH is one slot, the time direction unit of the PDSCH scheduled by the second EPDCCH can also be one slot. In other words, a communication method (scheme) using one subframe as a unit as in the LTE of the related art and a communication method using one slot, which is half of that in the LTE of the related art, are used while being switched appropriately. Using one slot as a unit can reduce latency in radio communication. This allows a communication method capable of reducing latency in radio communication to be achieved in addition to a communication method similar to the LTE of the related art. This can be applied not only to the LAA cell but also the LTE of the related art used in the Licensed spectrum. Hence, all the methods and constitutions described in the present embodiment can be applied not only to the LAA cell but also the LTE of the related art used for the Licensed spectrum.

Here, in the LAA cell, in a case that the channel and/or signal transmission is enabled, the period in which the LAA cell can perform transmission is defined based on the LBT. The period is also referred to as a maximum burst length, and the channel and/or the signal transmitted in the period is also referred to as burst. For example, the maximum burst length is 4 ms (four subframe length). Hence, in each burst, the first subframe of the burst is a first partial subframe, and the last subframe of the burst is a second partial subframe. Note that each partial subframe is also referred to as a floating subframe. Additionally, each partial subframe may be a subframe including a symbol/subframe at which channel and/or signal described in the present embodiment is not transmitted (cannot be transmitted).

In a subframe, the subframe at which transmission is possible in the area from the first OFDM symbol in the subframe (Subframe boundary) to the last OFDM symbol in the subframe (Subframe boundary), is also referred to as a full subframe. The full subframe is a subframe other than partial subframes. In each burst, the full subframe is a subframe other than the first subframe of the burst or the last subframe of the burst. The full subframe may be a subframe not including any symbol/subframe at which the channel and/or the signal described in the present embodiment is not transmitted (cannot be transmitted). Moreover, the full subframe in the LAA cell may be a subframe having the same configuration and/or a subframe at which the same processing as that of a normal subframe in a normal cell is performed.

Figure 5:
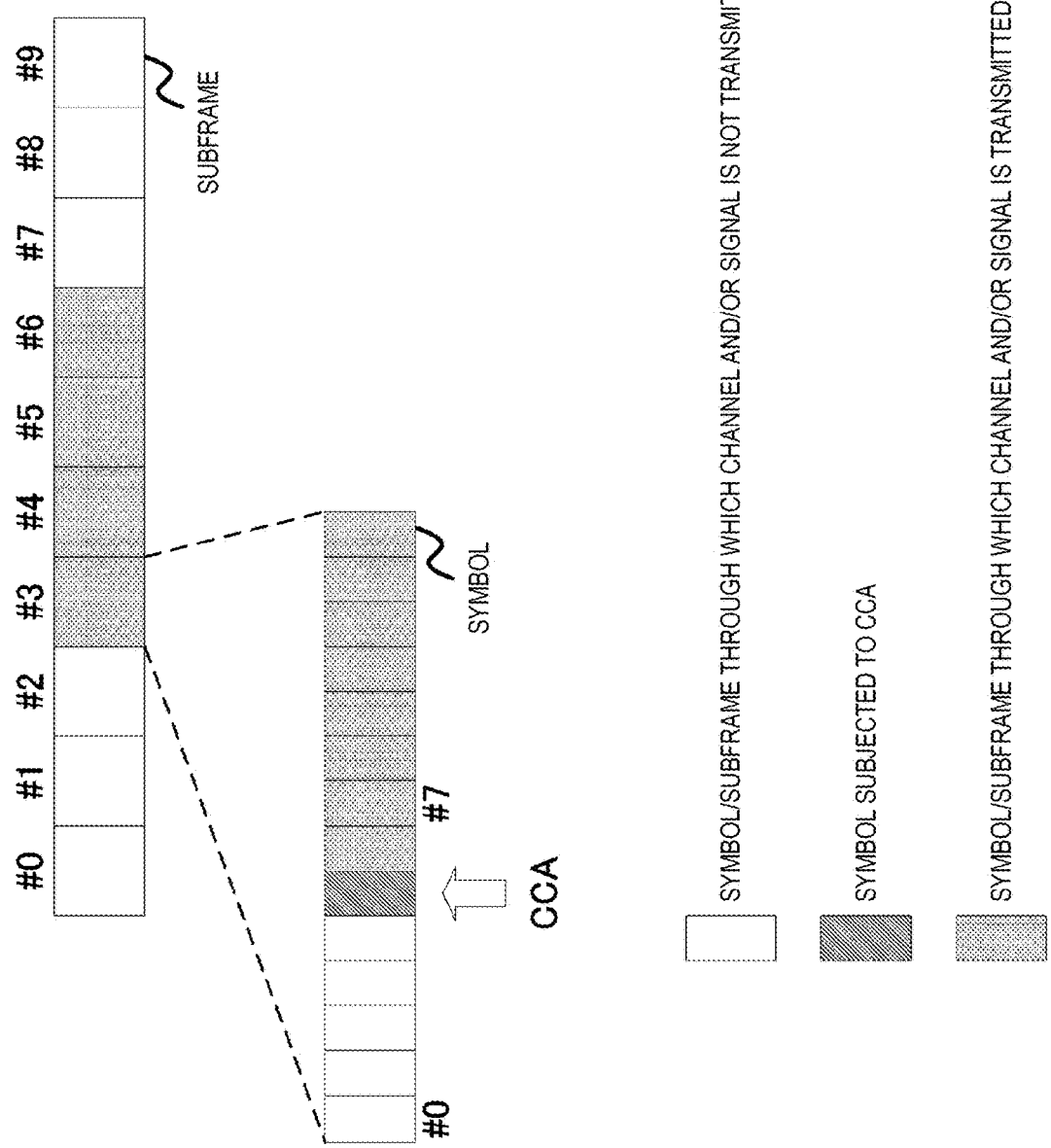
FIG. 5 is a diagram illustrating an example of a communication procedure in a LAA cell according to the present embodiment.

FIG. 5 is a diagram illustrating an example of a communication procedure in an LAA cell. FIG. 5 illustrates 10 subframes designated as subframes #0 to #9, and 14 symbols (OFDM symbols) designated as symbols #0 to #13 in the subframe #3. In this example, the LAA cell can transmit a signal up to 4 ms (corresponding to 4 subframes), and the CCA is performed on the symbol #5 in the subframe #3. Assume that the LAA cell identifies that the frequency is in the idle state through the CCA and a signal can be transmitted at symbols immediately after the identification. In FIG. 5, the LAA cell transmits the signals at the symbols from the symbol #6 in the subframe #3 to a prescribed symbol in the subframe #6.

In FIG. 5, the symbol or subframe represented as the symbol/subframe at which the channel and/or signal is not transmitted (cannot be transmitted) indicates that the LAA transmits nothing. In FIG. 5, the symbol or subframe represented as the symbol/subframe at which the channel and/or signal is transmitted (can be transmitted) indicates that the LAA transmits at least a PDSCH, and a terminal-specific Reference Signal associated with the PDSCH. The PDSCH is mapped (scheduled) to each terminal using a resource block pair as a unit. Information on the mapping (scheduling) is notified via the PDCCH or EPDCCH transmitted at each subframe. The mapping information for a PDSCH at a subframe may be notified at the identical subframe or at another subframe.

In FIG. 5, in a case that the LAA cell transmits a PDSCH using the symbol #6 to #13 in the subframe #3, the terminal receiving the PDSCH needs to recognize that the PDSCH is mapped to the symbol #6 to #13 in the subframe #3.

An example of the recognition uses information for recognizing a symbol at which a channel and/or signal is transmitted in a prescribed subframe (e.g., subframe #3) in the LAA cell. For example, the information is any or a combination of the following information.

(1) The information is information indicating a start symbol in the symbols at which the channel and/or signal is transmitted in the prescribed subframe. The information indicating the start symbol is any of 0 to 13, each value of which indicates a symbol number of a symbol to be the start symbol.

(2) The information is information indicating a start symbol in the symbols at which the channel and/or signal is transmitted in the prescribed subframe. The information indicating the start symbol is index information in which values predefined from values 0 to 13 are indexed.

(3) The information is bitmap information indicating symbols at which the channel and/or signal is transmitted in the prescribed subframe. The bitmap information is constituted by 14 bits. In the bitmap information, in a case that a bit has one state (e.g., "1"), the bit indicates the symbol at which the channel and/or signal is transmitted, and in a case that a bit has the other state (e.g., "0"), the bit indicates the symbol at which the channel and/or signal is not transmitted.

(5) The information is information indicating an end symbol in the symbols at which the channel and/or signal is not transmitted in the prescribed subframe, or information indicating the number of symbols of the symbols at which the channel and/or signal is not transmitted. For example, the end symbol is any of 0 to 13, and each value of which indicates a symbol number of a symbol to be the end symbol. For example, the information indicating the number of symbols is any of 1 to 14, and each value of which indicates the number of the symbols.

(6) The information is information indicating an end symbol in the symbols at which the channel and/or signal is not transmitted in the prescribed subframe, or information indicating the number of symbols of the symbols at which the channel and/or signal is not transmitted. For example, the end symbol is index information in which values predefined from values 0 to 13 are indexed. For example, the information indicating the number of symbols is index information in which values predefined from values 1 to 14 are indexed.

A method for notifying the information for recognizing the symbol at which the channel and/or signal is transmitted employs any of methods described as below, for example.

(1) The information is notified using the parameter configured (notified) to the LAA cell by way of RRC signaling or MAC signaling. In a case that a Serving cell is an LAA cell, the channel and/or signal is not transmitted at a symbol configured in a subframe, and the channel and/or signal is transmitted at other symbols. For example, the symbols at which the channel and/or signal is not transmitted are configured as the symbols #0 and #1 in a subframe. The symbols at which the channel and/or signal is not transmitted are configured as the symbols #2 and #13 in a subframe. This configuration may be different (independent) depending on the channel and/or signal. For example, the terminal is configured such that the EPDCCH is mapped to the symbols #2 to #13 and the PDSCH is mapped to the symbols #1 to #13 in a subframe. Moreover, for example, a range of the start symbol of the PDSCH (possible values) configured to the LAA cell may be different from a range (1 to 4) of the start symbol of the PDSCH configured to the Secondary cell of the related art. The range of the start symbol of the PDSCH and/or EPDCCH configured to the LAA cell is 0 to 13.

(2) The information is notified using a PDCCH or EPDCCH transmitted from the LAA cell or the Serving cell different from the LAA cell (assist cell, Primary cell, or Secondary cell). The DCI carried (transmitted) by the PDCCH or EPDCCH includes the information.

(3) The information is notified using a channel or signal for notifying the information. The channel or signal for notifying the information is transmitted only to the LAA cell. The channel or signal for notifying the information is transmitted from the LAA cell or the Serving cell different from the LAA cell (assist cell, Primary cell, or Secondary cell).

(4) Candidates for the information are configured (notified) to the LAA cell by way of RRC signaling or MAC signaling. Selection is made from among the candidates for the information based on the information included in the DCI carried (transmitted) by the PDCCH or EPDCCH. For example, the information indicating 4 start symbols is configured by way of RRC signaling or MAC signaling, and 2-bit information indicating one of the information pieces is notified by way of PDCCH or EPDCCH signaling.

(5) The information is notified using a channel or signal mapped to prescribed Resource Elements in a subframe. For example, the prescribed Resource Elements are multiple Resource Elements in a prescribed symbol. For example, the prescribed symbol is an end symbol in the subframe. The subframe to which the channel or signal for notifying the information is mapped may be all the subframes in the LAA cell, a predefined subframe, or a subframe configured by way of RRC signaling.

(6) The information is predefined. In a case that a Serving cell is an LAA cell, the channel and/or signal is not transmitted at a prescribed symbol, and the channel and/or signal is transmitted at other symbols in a subframe. For example, the symbols at which the channel and/or signal is not transmitted are the symbols #0 and #1 in a subframe. The symbols at which the channel and/or signal is not transmitted are the symbols #2 and #13 in a subframe. This definition may be different (independent) depending on the channel and/or signal. For example, the terminal presumes that the EPDCCH is mapped to the symbols #2 to #13 and the PDSCH is mapped to the symbols #1 to #13 in a subframe.

In another example of the recognition, the terminal detects a symbol at which a channel and/or signal is transmitted in a prescribed subframe (e.g., subframe #3) in the LAA cell. In the terminal, assist information may be configured for performing the detection. For example, a method of the detection employs any of methods described as below.

(1) The detection is performed based on a prescribed signal mapped to the prescribed subframe. The terminal detects the symbol at which the channel and/or signal is transmitted based on whether the predefined signal or the configured signal is detected in the prescribed subframe. In a case that the predefined signal or configured signal is detected at a symbol in the prescribed subframe, the terminal recognizes subsequent symbols of the symbol in the prescribed subframe as the symbols at which the channel and/or signal is transmitted. For example, the predefined signal or the configured signal is the CRS, DMRS, and/or URS.

(2) The detection is performed based on a prescribed channel mapped to the prescribed subframe. The terminal detects the symbol at which the channel and/or signal is transmitted based on whether the predefined channel or the configured channel is detected in the prescribed subframe. In a case that the predefined channel or the configured channel is detected at a symbol in the prescribed subframe, the terminal recognizes subsequent symbols of the symbol in the prescribed subframe as the symbols at which the channel and/or signal is transmitted. For example, the predefined channel or the configured channel is the EPDCCH. Specifically, the terminal presumes that the EPDCCH is mapped to a symbol and subsequent symbols in the prescribed subframe to perform monitoring of the EPDCCH (detection process, blind detection). Here, the terminal may perform the blind detection on the start symbol where the EPDCCH is presumed to be mapped. The start symbol or candidates of the start symbol where the EPDCCH is presumed to be mapped may be predefined or configured.

In FIG. 5, a method for mapping the PDCCH, EPDCCH and/or PDSCH to the Resource Element in the subframe #3 may be different from a mapping method in other subframes. For example, the mapping method may employ any of methods described below. Note that the mapping methods below (mapping procedure) may be applied also to other signals such as the Reference Signal or the synchronization signal.

(1) In the mapping method, the PDCCH, EPDCCH and/or PDSCH are mapped to from the end symbol in the subframe. In other words, mapping the PDCCH, EPDCCH and/or PDSCH to the Resource Element (k, l) is performed on symbols in order from the OFDM symbol having the maximum OFDM symbol number l (i.e., the end symbol in a slot) in the Resource Element capable of mapping and being an allocated physical resource block. The mapping is performed in order from the end slot in the subframe (the second slot). In each OFDM symbol, those channels are mapped in order from a subcarrier having the minimum subcarrier number k.

(2) In the mapping method, the PDCCH, EPDCCH and/or PDSCH are mapped to the Resource Element in the symbol at which the channel and/or signal is transmitted while the symbol at which the channel and/or signal is not transmitted is skipped. In other words, in mapping of the PDCCH, EPDCCH and/or PDSCH, the Resource Element in the symbol at which the channel and/or signal is not transmitted is subjected to the rate matching.

(3) In the mapping method, the PDCCH, EPDCCH and/or PDSCH are mapped to the Resource Element in the symbol at which the channel and/or signal is transmitted while the symbol at which the channel and/or signal is not transmitted is not skipped. In other words, the PDCCH, EPDCCH and/or PDSCH are mapped without distinguishing the symbol at which the channel and/or signal is transmitted from the symbol at which the channel and/or signal is not transmitted, but the channel is not transmitted that is mapped to the symbol at which the channel and/or signal is not transmitted, and the channel is transmitted that is mapped to the symbol at which the channel and/or signal is transmitted. Specifically, in mapping the PDCCH, EPDCCH and/or PDSCH, the Resource Element in the symbol at which the channel and/or signal is not transmitted is subjected to puncturing.

Figure 6:
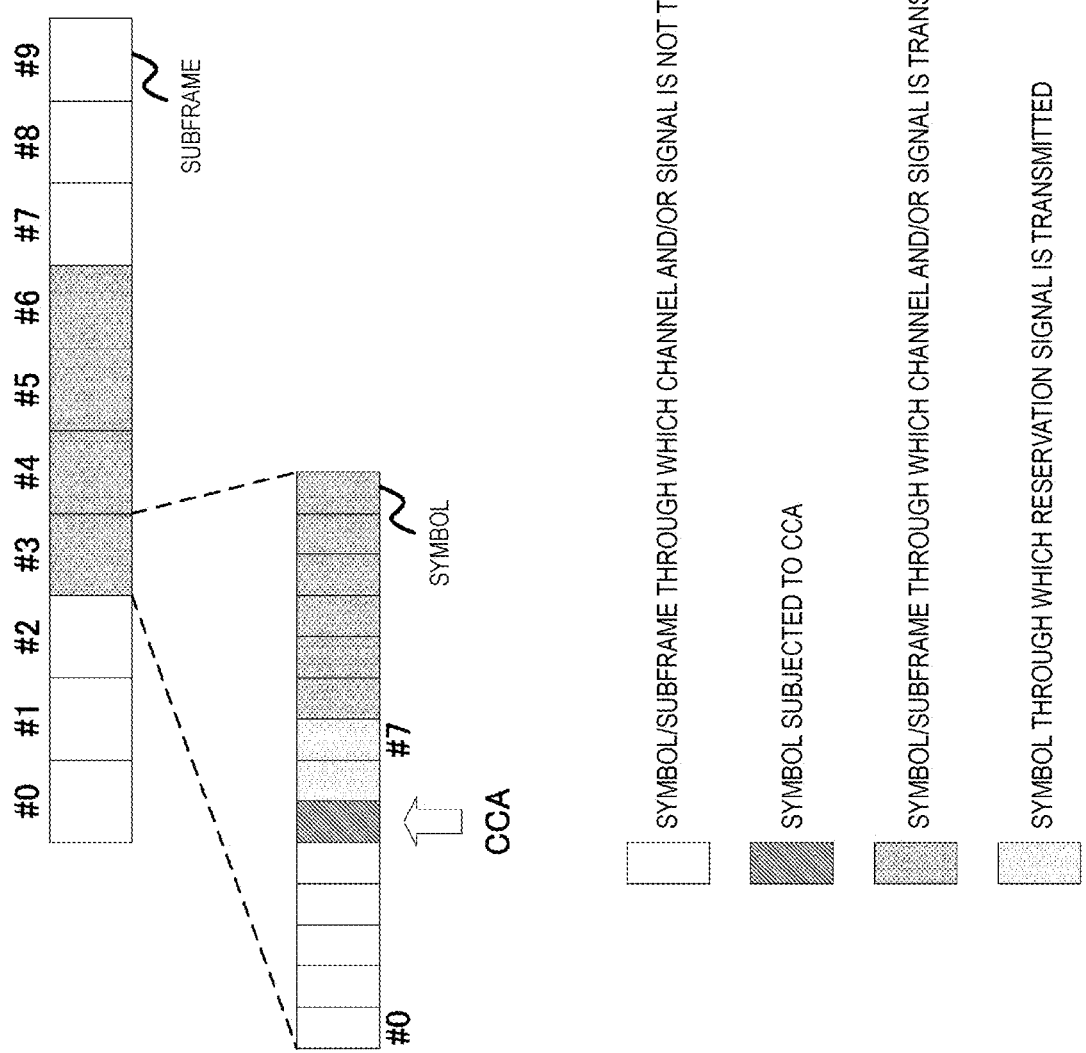
FIG. 6 is a diagram illustrating an example of the communication procedure in the LAA cell according to the present embodiment.

FIG. 6 is a diagram illustrating an example of a communication procedure in an LAA cell. Hereinafter, differences from the contents described with reference to FIG. 5 are described. In this example, the CCA is performed on the symbol #5 in the subframe #3. Assume that the LAA cell identifies that the frequency is in the idle state through the CCA and a signal can be transmitted at symbols immediately after the identification. The LAA cell transmits the signals at the symbols from the symbol #5 in the subframe #3 to a prescribed symbol in the subframe #6.

In the example in FIG. 6, the symbols #6 and #7 in the subframe #3 are symbols at which a reservation signal is transmitted. The reservation signal is transmitted at the symbols from a symbol immediately after the symbol to be subjected to the CCA (i.e., symbol #5) to a symbol immediately before the symbol at which the channel and/or signal is transmitted (i.e., symbol #6). Effects of the reservation signal are as below. As described with reference to FIG. 5, even in the case that the candidates of the symbol at which the channel and/or signal is transmitted are predefined or configured, the LAA cell can flexibly perform the CCA independently from the number of the candidates.

The reservation signal may not be received (recognized) even by the terminal which receives the channel and/or signal transmitted from the LAA cell. In other words, in a case that the channel and/or signal cannot be transmitted after performing the CCA, the reservation signal is transmitted for the LAA cell, which has performed the CCA, to ensure (reserve) the frequency.

To the symbol at which the reservation signal is transmitted, a channel and/or signal may be mapped which is different from the channel and/or signal transmitted at the symbol at which the channel and/or signal is transmitted. In other words, the channel and/or signal mapped to the symbol at which the reservation signal is transmitted is recognized (received) by the terminal. For example, the terminal identifies the symbol at which the channel and/or signal is transmitted, based on the channel and/or signal mapped to the symbol at which the reservation signal is transmitted. Moreover, for example, the terminal uses the channel and/or signal mapped to the symbol at which the reservation signal is transmitted to synchronize with (identify) the LAA cell.

A reservation signal in the present embodiment is also referred to as an initial signal. The initial signal is a signal transmitted at the beginning of a burst and can be distinguished from the PDSCH, the EPDCCH, the PDCCH, and/or a Reference Signal in the burst. In addition, the initial signal can include control information on the burst, control information on a channel and/or a signal in the burst, or control information on the cell transmitting the burst.

Figure 7:
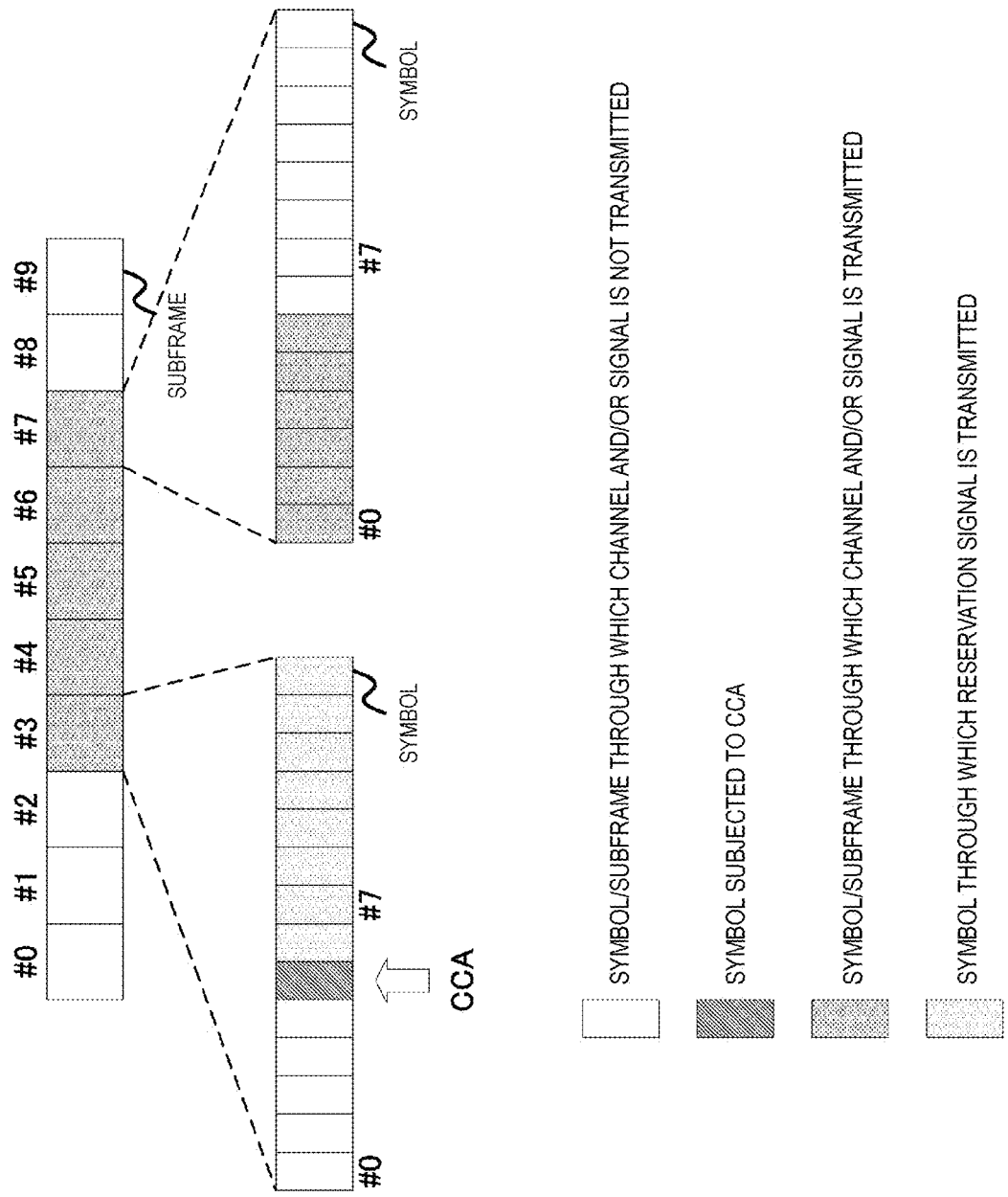
FIG. 7 is a diagram illustrating an example of the communication procedure in the LAA cell according to the present embodiment.

FIG. 7 is a diagram illustrating an example of a communication procedure in an LAA cell. Hereinafter, differences from the contents described with reference to FIG. 5 are described. In this example, the CCA is performed on the symbol #5 in the subframe #3 as is the example in FIG. 5. Assume that the LAA cell identifies that the frequency is in the idle state through the CCA and a signal can be transmitted at symbols immediately after the identification. In FIG. 7, the LAA cell transmits the signals at from the symbol #6 in the subframe #3 to the symbol #5 in the subframe #7 after 4 ms.

In the example in FIG. 7, the LAA cell transmits the reservation signal at the symbols from a symbol immediately after the symbol to be subjected to the CCA to the end symbol in the subframe including the symbol to be subjected to the CCA. The LAA cell transmits the channel and/or signal at subframes subsequent to the subframe including the symbol to be subjected to the CCA. The reservation signal in FIG. 7 includes the reservation signal described with reference to FIG. 6.

For example, in FIG. 7, the terminal can presume that the channel and/or signal is transmitted at the subframe #4 and subsequent subframes. This causes the terminal to presume that the channel and/or signal is transmitted at the symbols started from the first symbol in the subframe. Therefore, the base stations including LAA cell can use the same method as those of the related art for the terminal with respect to the transmission of the channel and/or signal and notification of the control information for the channel and/or signal.

In FIG. 7, the LAA cell can transmit the channel and/or signal at the symbols from the first symbol to the symbol #5 in the subframe #7. For example, the LAA cell can transmit to the terminal the PDSCH and/or EPDCCH mapped to resources from a prescribed symbol to the symbol #5 in subframe #7. The LAA cell can transmit to the terminal the PDCCH mapped to resources from the first symbol to a prescribed symbol in the subframe #7. For example, a prescribed symbol is determined based on information transmitted on the PCFICH and on the number of OFDM symbols used to transmit the PDCCH. Moreover, for example, a prescribed symbol is determined based on information which is the control information configured by way of RRC signaling and indicates an OFDM start symbol which is for the EPDCCH, the PDSCH scheduled by the PDCCH, and the PDSCH scheduled by the EPDCCH.

In FIG. 7, the LAA cell can notify or configure to the terminal the end symbol at which the channel and/or signal is transmitted in the subframe #7. In a subframe in the LAA cell, for the information for the terminal to recognize the end symbol and the method for notifying the information, those described in the example in FIG. 5 can be used. The method described in the example in FIG. 5 relates to the information for recognizing the symbol at which the channel and/or signal is transmitted in FIG. 5 and the method for notifying the information. For example, in the LAA cell, the information on the end symbol is included in the DCI notified by the PDCCH or EPDCCH transmitted at the subframe #7. This allows the LAA cell to efficiently use the resource in the case that the channel and/or signal can be transmitted at the symbols until a symbol in the middle of the subframe as is the subframe #7 in FIG. 7. For example, in the LAA cell, the information on the end symbol is included in information configured by way of RRC signaling or MAC signaling.

In FIG. 7, a method is described to be used as a combination of the transmission method in the subframe #3 and the transmission method in the subframe #7, but is not limited thereto. The transmission method in subframe #3 and the transmission method in the subframe #7 may be used independently from each other. Some or all of the methods described with reference to FIGS. 5 to 7 may be used in combination.

Moreover, in the subframe #7 in FIG. 7, the mapping of the PDCCH, EPDCCH and/or PDSCH to the Resource Element may be different from the mapping in other subframes.

In the LAA cell, a subframe where the channel and/or signal can be transmitted at all the OFDM symbols in the single subframe itself (i.e., the subframes #4 to #6 in FIGS. 5 to 7) may be recognized, configured, or notified as a subframe different from a subframe where the channel and/or signal cannot be transmitted at some OFDM symbols in the single subframe itself (i.e., the subframe #3 in FIGS. 5 to 7, and the subframe #7 in FIG. 7). For example, a subframe where the channel and/or signal can be transmitted at all the OFDM symbols in the single subframe itself is equivalent to a subframe in the Serving cell of the related art.

In the present embodiment, a subframe where the channel and/or signal cannot be transmitted at all the OFDM symbols in the single subframe itself is also referred to as a "first LAA subframe". A subframe where the channel and/or signal cannot be transmitted at some OFDM symbols in the single subframe itself is also referred to as a "second LAA subframe". A subframe where the channel and/or signal can be transmitted at all the OFDM symbols in the single subframe itself is also referred to as a "third LAA subframe". Moreover, the second LAA subframe is also referred to as a partial subframe, and the third LAA subframe is also referred to as a full subframe. Note that the second LAA subframe includes the first partial subframe, the second partial subframe, and/or the third partial subframe.

The method described in the present embodiment can be used for a method for the terminal to recognize the first LAA subframe, the second LAA subframe, and the third LAA subframe. For example, the method for recognizing the subframes uses the information for recognizing the symbol at which the channel and/or signal is transmitted and the method for notifying the information.

The method for the terminal to recognize the first LAA subframe, the second LAA subframe, and the third LAA subframe may be explicitly notified or configured by way of PDCCH or RRC signaling.

The method for the terminal to recognize the first LAA subframe, the second LAA subframe, and the third LAA subframe may be implicitly notified or configured based on the information (parameter) notified or configured by way of PDCCH or RRC signaling. For example, the terminal recognizes the first LAA subframe, the second LAA subframe, and the third LAA subframe based on the information on the mapping of the CRS.

In a case that the terminal recognizes a subframe as the second LAA subframe, the terminal recognizes a prescribed number of subframes subsequent to the subframe as the third LAA subframes. The terminal recognizes, as the first LAA subframes, subframes subsequent to the end of the subframes which are recognized as the third LAA subframes until the terminal recognizes the second LAA subframes. The prescribed number (i.e., the number of subframes recognized as the third LAA subframes) may be predefined. The prescribed number may be configured in the LAA cell. The prescribed number may be notified using the channel and/or signal mapped to the second LAA subframe.

In the second LAA subframe and the third LAA subframe, the start symbol of the PDSCH and/or EPDCCH is independently defined or configured.

FIGS. 5 to 7 illustrate that the CCA is performed on a single subframe, but a time (period) for performing the CCA is not limited thereto. The time for performing the CCA may vary for each LAA cell, for each timing of the CCA, or for each execution of the CCA. For example, the CCA is performed at the time based on a prescribed time slot (time period, time domain). The prescribed time slot may be defined or configured by a time obtained by dividing a single subframe into a prescribed number of sections. The prescribed time slot may be defined or configured by a prescribed number of subframes.

In the present embodiment, a size of a field in the time domain such as the time (time slot) for performing the CCA, or a time when the channel and/or signal is transmitted (can be transmitted) at a subframe can be represented using a prescribed time unit. For example, the size of the field in the time domain is represented as some time units Ts. Ts is $1/(15000*2048)$ sec. For example, a time of a single subframe is $30720*Ts$ (1 ms).

As is the subframe #3 in the FIGS. 5 to 7, whether the LAA cell can transmit the channel and/or signal (including the reservation signal) at the symbols from the middle of symbols in the subframe may be configured to the terminal or LAA cell. For example, in the configuration concerning the LAA cell, information is configured to the terminal, the information indicating whether RRC signaling allows such a transmission. The terminal switches, based on the information, the processes concerning the reception in the LAA cell (monitoring, recognition, decoding).

The subframe capable of the transmission from the middle of symbols (including the subframe capable of the transmission until the middle of the symbols) may be all the subframes in the LAA cell. The subframe capable of the transmission from the middle of symbols may be a subframe predefined or subframe configured to the LAA cell.

The subframe capable of the transmission from the middle of symbols (including the subframe capable of the transmission until the middle of the symbols) can be configured, notified, or decided based on the TDD uplink/downlink configuration (UL/DL configuration). For example, such a subframe is a subframe notified (specified) as the special subframe by the UL/DL configuration. The special subframe in the LAA cell is a subframe including at least one of three fields, a Downlink Pilot Time Slot (DwPTS), a Guard Period (GP), and an Uplink Pilot Time Slot (UpPTS). The configuration concerning the special subframe in the LAA cell may be configured or notified by way of RRC signaling, or PDCCH or EPDCCH signaling. This configuration configures a time length with respect to at least one of the DwPTS, GP, and UpPTS. This configuration is index information indicating candidates of a predefined time length. Further, this configuration can use the same time length as the DwPTS, GP, and UpPTS used for the special subframe configuration configured to the TDD cell of the related art. In other words, the time length capable of transmission at a subframe is determined based on any of the DwPTS, GP, and UpPTS.

In the present embodiment, the reservation signal may be a signal which can be received by a LAA cell different from the LAA cell transmitting the reservation signal. For example, a LAA cell different from the LAA cell transmitting the reservation signal is a LAA cell (adjacent LAA cell) adjacent to the LAA cell transmitting the reservation signal. For example, the reservation signal includes information on a transmission state (usage state) of a prescribed subframe and/or symbol in the LAA cell. In a case that an LAA cell different from the LAA cell transmitting a reservation signal receives the reservation signal, the LAA cell that has received the reservation signal recognizes a transmission state of a prescribed subframe and/or symbol based on the reservation signal to perform scheduling depending on the state.

The LAA cell that has received the reservation signal may perform the LBT before transmitting the channel and/or signal. The LBT is performed based on the received reservation signal. For example, in the LBT, scheduling including the resource allocation or the MCS selection is performed, taking into account the channel and/or signal transmitted (presumed to be transmitted) by the LAA cell that has transmitted the reservation signal.

In a case that the LAA cell that has received the reservation signal performs scheduling of transmitting the channel and/or signal based on the reservation signal, information on the scheduling can be notified to one or more LAA cells including the LAA cell that has transmitted the reservation signal according to a prescribed method. For example, the prescribed method is a method of transmitting a prescribed channel and/or signal including the reservation signal. Moreover, for example, the prescribed method is a method of notifying via a backhaul such as the X2 interface.

In the carrier aggregation and/or dual connectivity, the terminal of the related art can configure up to 5 Serving cells, but the terminal in the present embodiment can extend the maximum number of Serving cells to be configured. In other words, more than 5 Serving cells can be configured to the terminal in the present embodiment. For example, up to 16 or 32 Serving cells can be configured to the terminal in the present embodiment. For example, more than 5 Serving cells configured to the terminal in the present embodiment include the LAA cell. Moreover, all of more than 5 Serving cells configured to the terminal in the present embodiment may be the LAA cells.

In the case that more than 5 Serving cells can be configured, the configuration for some Serving cells may be different from the configuration of the Serving cell of the related art (i.e., the Secondary cell of the related art). For example, the following points are different regarding the configuration. The configurations described below may be used in combination.

(1) Up to 5 Serving cells of the related art and up to 11 or 27 Serving cells different from the Serving cell of the related art are configured to the terminal. In other words, up to 4 Secondary cells of the related art, and 11 or 27 Secondary cells different from the Secondary cell of the related art are configured to the terminal, in addition to the Primary cell of the related art.

(2) The configuration concerning the Serving cell (Secondary cell) different from the Serving cell of the related art includes the configuration concerning the LAA cell. For example, up to 4 Secondary cells excluding the configuration concerning the LAA cell, and up to 11 or 27 Secondary cells different from the Secondary cell of the related art are configured to the terminal, in addition to the Primary cell of the related art.

Further, in the case that more than 5 Serving cells can be configured, the base station (including the LAA cell) and/or terminal can perform the process or presumption different from those in the case that up to 5 Serving cells are configured. For example, the following points are different regarding the process or presumption. The processes or presumptions described below may be used in combination.

(1) Even in the case that more than 5 Serving cells are configured, the terminal presumes that the PDCCH, EPDCCH and/or PDSCH are simultaneously transmitted (received) from 5 Serving cells at most. This allows the terminal to use the method similar to those of the related art regarding the reception of the PDCCH, EPDCCH and/or PDSCH, and the transmission of the HARQ-ACK in response to the PDSCH.

(2) In the case that more than 5 Serving cells are configured, a combination (group) of cells for bundling the HARQ-ACKs in response to the PDSCH in the Serving cells is configured to the terminal. For example, all the Serving cells, all the Secondary cells, all the LAA cells, or all the Secondary cells different from the Secondary cell of the related art include information (configuration) on bundling of the HARQ-ACKs between the Serving cells. For example, the information on bundling of the HARQ-ACKs between the Serving cells is an identifier (index, ID) for the bundling. For example, the HARQ-ACKs are bundled over cells with the same identifier for the bundling. The bundling is performed by an AND operation on the target HARQ-ACKs. The maximum number of identifiers for the bundling may be set to 5. The maximum number of identifiers for the bundling may be set to 5 including the number of cells not performing the bundling. In other words, the number of groups performing bundling across the Serving cells may be set to 5 at most. This allows the terminal to use the method similar to those of the related art regarding the reception of the PDCCH, EPDCCH and/or PDSCH, and the transmission of the HARQ-ACK in response to the PDSCH.

(3) In the case that more than 5 Serving cells are configured, a combination (group) of cells for multiplexing the HARQ-ACKs in response to the PDSCH in the Serving cells is configured to the terminal. In the case that the combination (group) of cells for multiplexing the HARQ-ACKs in response to the PDSCH is configured, the multiplexed HARQ-ACKs are transmitted on the PUCCH or PUSCH based on the group. In each group, the maximum number of multiplexed Serving cells is defined or configured. The maximum number is defined or configured based on the maximum number of Serving cells configured to the terminal. For example, the maximum number is the same as the maximum number of Serving cells configured to the terminal, or half of the maximum number of Serving cells configured to the terminal. The maximum number of PUCCHs simultaneously transmitted is defined or configured based on the maximum number of Serving cells multiplexed in each group, and the maximum number of Serving cells configured to the terminal.

In other words, the number of first Serving cells (i.e., Primary cell and/or Secondary cell) to be configured is equal to or less than a prescribed number (i.e., "5"), and the total number of first Serving cells and the second Serving cells (i.e., LAA cells) to be configured exceeds the prescribed number.

Next, a terminal capability relating to the LAA is described. The terminal notifies the base station of (transmits to the base station) information on a capability of the terminal (terminal capability) by way of RRC signaling based on an instruction from the base station. The terminal capability with respect to a function (feature) is notified (transmitted) in a case that the function (feature) is supported, and is not notified (not transmitted) in a case that the function (feature) is not supported. The terminal capability with respect to a function (feature) may be information indicating whether a test and/or implementation of the function (feature) is completed. For example, the terminal capability in the present embodiment is as below. The terminal capabilities described below may be used in combination.

(1) The terminal capability concerning support of the LAA cell and the terminal capability concerning support of the configuration of more than 5 Serving cells are defined independently from each other. For example, the terminal supporting the LAA cell supports the configuration of more than 5 Serving cells. In other words, the terminal not supporting the configuration of more than 5 Serving cells does not support the LAA cell. In this case, the terminal supporting the configuration of more than 5 Serving cells may or may not support the LAA cell.

(2) The terminal capability concerning the support of the LAA cell and the terminal capability concerning the support of the configuration of more than 5 Serving cells are defined independently from each other. For examples, the terminal supporting the configuration of more than 5 Serving cells supports the LAA cell. In other words, the terminal not supporting the LAA cell does not support the configuration of more than 5 Serving cells. In this case, the terminal supporting the LAA cell may or may not support the configuration of more than 5 Serving cells.

(3) The terminal capability concerning the downlink in the LAA cell and the terminal capability concerning the uplink in the LAA cell are defined independently from each other. For example, the terminal supporting the uplink in the LAA cell supports the downlink in the LAA cell. In other words, the terminal not supporting the downlink in the LAA cell does not support the uplink in the LAA cell. In this case, the terminal supporting the downlink in the LAA cell may or may not support the uplink in the LAA cell.

(4) The terminal capability concerning the support of the LAA cell includes support of the transmission mode configured only to the LAA cell.

(5) The terminal capability concerning the downlink in the configuration of more than 5 Serving cells and the terminal capability concerning the uplink in the configuration of more than 5 Serving cells are defined independently from each other. For example, the terminal supporting the uplink in the configuration of more than 5 Serving cells supports the downlink in the configuration of more than 5 Serving cells. In other words, the terminal not supporting the downlink in the configuration of more than 5 Serving cells does not support the uplink in the configuration of more than 5 Serving cells. In this case, the terminal supporting the downlink in the configuration of more than 5 Serving cells may or may not support the uplink in the configuration of more than 5 Serving cells.

(6) In the terminal capability in the configuration of more than 5 Serving cells, the terminal capability supporting the configuration of up to 16 downlink Serving cells (component carriers) and the terminal capability supporting the configuration of up to 32 downlink Serving cells are defined independently from each other. The terminal supporting the configuration of up to 16 downlink Serving cells supports the configuration of at least one uplink Serving cell. The terminal supporting the configuration of up to 32 downlink Serving cells supports the configuration of at least two uplink Serving cells. In other words, the terminal supporting the configuration of up to 16 downlink Serving cells may not support the configuration of two or more uplink Serving cells.

(7) The terminal capability concerning the support of the LAA cell is notified based on the frequency (band) used in the LAA cell. For example, in notification of a frequency or a combination of frequencies supported by the terminal, in a case that the frequency or the combination of frequencies to be notified includes at least one frequency used in the LAA cell, the terminal implicitly notifies the base station of supporting the LAA cell. In other words, in a cast that the frequency or the combination of frequencies to be notified does not include any frequency used in the LAA cell at all, the terminal implicitly notifies the base station of not supporting the LAA cell.

Next, a terminal capability relating to the second EPDCCH is described. In an example of the terminal capability according to the present embodiment, the field of the terminal capability relating to the second EPDCCH defines whether the terminal is capable of receiving a DCI in the USS and/or the CSS in the second EPDCCH. Specifically, in a case that the terminal is capable of receiving the DCI in the USS and/or the CSS in the second EPDCCH, the terminal makes a notification indicating "Supported" in the field of the terminal capability relating to the second EPDCCH. In contrast, in a case that the terminal is not capable of receiving the DCI in the USS and/or the CSS in the second EPDCCH, the terminal does not make any notification in the field of the terminal capability relating to the second EPDCCH.

In a case that the terminal is capable of receiving the DCI in the USS and/or the CSS in the second EPDCCH, the terminal has the capability of receiving the DCI in the USS in the first EPDCCH. Specifically, in a case that the terminal makes a notification indicating "Supported" in the field of the terminal capability relating to the second EPDCCH, the terminal makes a notification indicating "Supported" in the field of the terminal capability relating to the first EPDCCH. In addition, in a case that the terminal makes a notification indicating "Supported" in the field of the terminal capability relating to the second EPDCCH, the terminal may indicate that the terminal has the capability of receiving the DCI in the USS in the first EPDCCH.

In a case that the terminal is capable of receiving the DCI in the USS and/or the CSS in the second EPDCCH, the terminal also has the capability relating to the LAA (including, for example, those described above). Specifically, in a case that the terminal makes a notification indicating "Supported" in the field of the terminal capability relating to the second EPDCCH, the terminal makes a notification indicating "Supported" in the field of the terminal capability relating to the LAA. In addition, in a case that the terminal makes a notification indicating "Supported" in the field of the terminal capability relating to the second EPDCCH, the terminal may indicate that the terminal has the capability relating to the LAA.

In the present embodiment, a description is given of a case that the LAA cell transmits the PDCCH or EPDCCH notifying the DCI for the PDSCH transmitted by the LAA cell (i.e., a case of self-scheduling), but the present embodiment is not limited thereto. For example, the method described in the present embodiment can be applied also to a case that the Serving cell different from the LAA cell transmits the PDCCH or EPDCCH notifying the DCI for the PDSCH transmitted by the LAA cell (i.e., a case of cross carrier scheduling).

In the present embodiment, information for recognizing the symbol at which the channel and/or signal is transmitted may be based on the symbol at which the channel and/or signal is not transmitted. For example, the information is information indicating the end symbol in the symbols at which the channel and/or signal is not transmitted. Moreover, the information for recognizing the symbol at which the channel and/or signal is transmitted may be determined based on other information or parameters.

In the present embodiment, the symbol at which the channel and/or signal is transmitted may be configured (notified, or defined) independently from the channel and/or signal. In other words, the information for recognizing the symbol at which the channel and/or signal is transmitted and the method for notifying the information can be configured (notified, or defined) independently from the channel and/or signal. For example, the information for recognizing the symbol at which the channel and/or signal is transmitted and the method for notifying the information can be configured (notified, or defined) independently by the PDSCH and the EPDCCH.

In the present embodiment, the symbol/subframe at which the channel and/or signal is not transmitted (cannot be transmitted) may be the symbol/subframe at which the channel and/or signal is not presumed, from the viewpoint of the terminal, to be transmitted (transmittable). In other words, the terminal can assume that the LAA cell is not transmitting the channel and/or signal at the symbol/subframe.

Moreover, in the present embodiment, the symbol/subframe at which the channel and/or signal is transmitted (can be transmitted) may be the symbol/subframe at which the channel and/or signal is presumed, from the viewpoint of the terminal, to be possibly transmitted. In other words, that terminal can assume that the LAA cell may or may not be transmitting the channel and/or signal at the symbol/subframe.

Further, in the present embodiment, the symbol/subframe at which the channel and/or signal is transmitted (can be transmitted) may be the symbol/subframe at which the channel and/or signal is presumed, from the viewpoint of the terminal, to be surely transmitted. In other words, the terminal can assume that the LAA cell is surely transmitting the channel and/or signal at the symbol/subframe.

In the present embodiment, the LAA cell may be a Serving cell using a prescribed frequency band.

Next, an Enhanced Physical Downlink Control Channel (EPDCCH) will be described. Note that the EPDCCH, as other physical channels such as a PDSCH, is transmitted/received using Resource Elements (REs). Each of elements (each element corresponding to one subcarrier and one OFDM symbol) of a resource grid (representing a signal to be transmitted in a grid constituted of subcarriers and OFDM symbols for each slot) for an antenna port P is referred to as an RE and is uniquely identified using k (an index starting from 0 and being numbered in ascending order in the frequency axis direction) and 1 (an index starting from 0 and being numbered in ascending order in the time axis direction) representing a pair of indexes in one slot.

The EPDCCH may be different in terms of configuration and/or processing among the normal subframe in the normal cell, the partial subframe in the LAA cell, and/or the full subframe in the LAA cell. For example, in the partial subframe, an EPDCCH constituted of OFDM symbols, the number of which is smaller than that of an EPDCCH used in the normal subframe and/or the full subframe, is used. In the present embodiment, the EPDCCH used in the normal subframe is also referred to as a first EPDCCH, and the EPDCCH used in the partial subframe is also referred to as a second EPDCCH. Note that, in the full subframe, the first EPDCCH and/or the second EPDCCH may be used.

Figure 8:
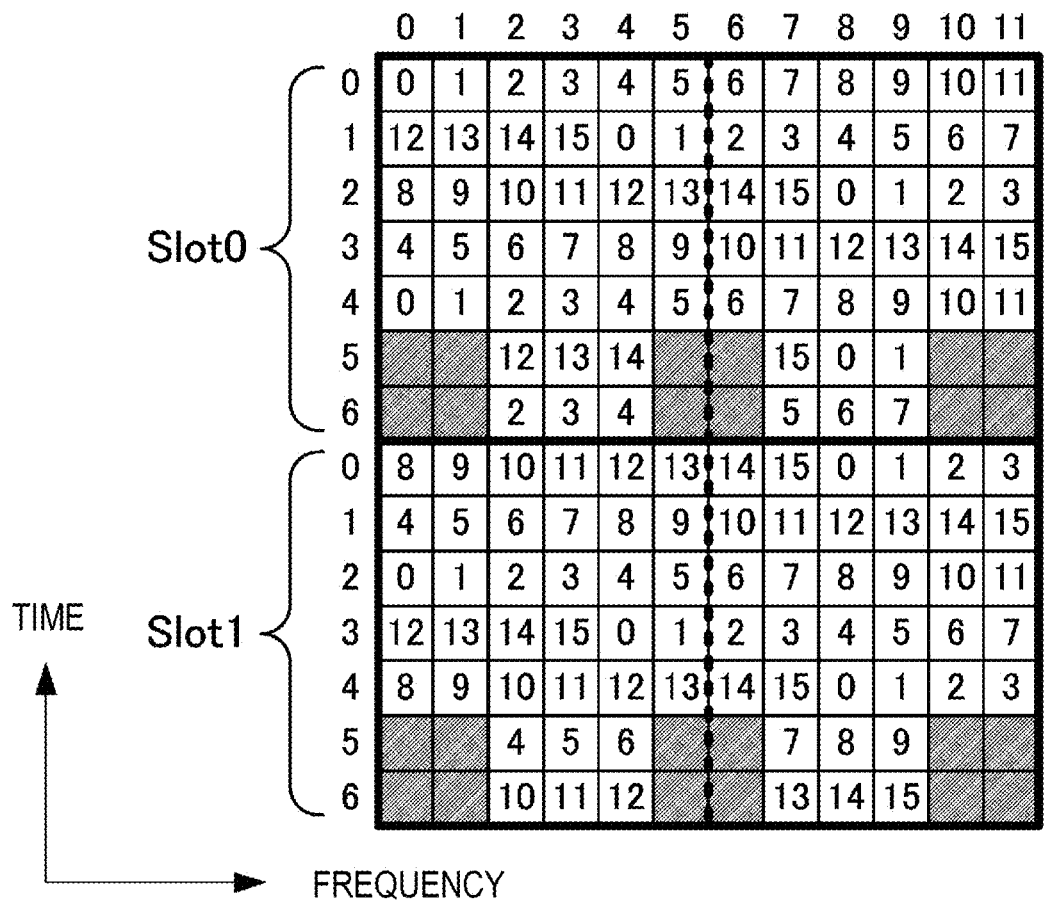
FIG. 8 illustrates an example of an EREG configuration in one RB pair.

FIG. 8 illustrates an example of an EREG configuration in one RB pair. The Enhanced RE Groups (EREGs) are used to specify mapping of an EPDCCH to REs. Each of resource block pairs includes 16 EREGs numbered from 0 to 15. In one PRB pair, all REs excluding REs at which DMRSs for antenna ports 107, 108, 109, and 110 for a normal Cyclic Prefix (CP) and for the antenna ports 107 and 108 for an extended CP are carried, are cyclically numbered from 0 to 15 in ascending order of, first, frequency, then time. In FIG. 8, Resource Elements shaded with oblique lines are used to carry DMRSs. All the REs numbered i in the PRB pair constitute the EREGs numbered i. Here, the CP is a signal attached in front of an effective symbol section of OFDM symbols in the downlink (or SC-FDMA symbols in the case of the uplink), and is a signal including a copy of part (normally the last part) of the effective symbol section. There are two kinds of CP lengths, one is for a normal CP of a normal length (e.g., 160 samples or 144 samples in a case that the effective symbol length is 2048 samples) and the other is for an extended CP, which is longer than the normal CP (e.g., 512 samples or 1024 samples in a case that the effective symbol length is 2048 samples).

Here, the same EREG configuration can be used for the first EPDCCH or the second EPDCCH. Specifically, for each resource block pair, the EREGs in the first EPDCCH or the second EPDCCH are specified for all REs excluding REs at which a DMRS for antenna ports 107, 108, 109, and 110 for a normal Cyclic Prefix (CP) and for the antenna ports 107 and 108 for an extended CP are carried. With this configuration, even in a case where different DMRS configurations are used, the definitions for configuring EREGs are the same although REs for configuring the EREGs are different from each other.

As illustrated in FIG. 8, one RB pair is constituted of two RBs. Each RB is constituted of Resource Elements represented by 7 OFDM symbols in the time direction and 12 subcarriers in the frequency direction. In FIG. 8, DMRSs are mapped to the Resource Elements shaded with oblique lines. Moreover, each DMRS is constituted of two-chip orthogonal code, and up to two DMRSs can be code-division multiplexed. The DMRSs for the antenna ports 107 and 108 are mapped to REs having the OFDM symbol numbers 5 and 6 and the subcarrier numbers 0, 5, and 10 in each slot. The DMRSs for the antenna ports 109 and 110 are mapped to REs having the OFDM symbol numbers 5 and 6 and the subcarrier numbers 1, 6, and 11 in each slot. Here, as a DMRS associated with the first EPDCCH, the DMRSs described in FIG. 8 can be used.

As an example of a DMRS associated with the second EPDCCH, the DMRSs described in FIG. 8 can be used. Specifically, in the DMRS associated with the second EPDCCH, a similar configuration as that of the DMRS associated with the first EPDCCH can be used, but, in a case that the DMRS is included in the OFDM symbols at which the second EPDCCH cannot be transmitted, the DMRS is not transmitted. For example, in the partial subframes with OFDM symbols #0 to #6 in slot 1, the DMRS associated with the second EPDCCH is mapped only to OFDM symbols #5 and #6 in slot 1 and is not mapped only to #5 and #6 in slot 0. In a case that the DMRS cannot be transmitted at any OFDM symbol of the two OFDM symbols to which two-chip orthogonal code is mapped, the DMRS is presumed not to be transmitted.

Another example of the DMRS associated with the second EPDCCH is determined based on OFDM symbols to be used for transmission of the second EPDCCH. Specifically, each of the REs to which the DMRS associated with the second EPDCCH is mapped is specified depending on the configuration of the OFDM symbols to be used for transmission of the second EPDCCH. A prescribed number of patterns of the configuration of the OFDM symbols to be used for transmission of the second EPDCCH can be predefined. Hence, a prescribed number of patterns of the configuration of the DMRS associated with the second EPDCCH can be predefined similarly.

FIGS. 9A to 9E are diagrams illustrating examples of a configuration of DMRSs associated with the second EPDCCH used for the first partial subframe. In FIGS. 9A to 9E, the REs shaded with oblique lines represent REs to which the DMRSs associated with the second EPDCCH are mapped. The REs shaded with dots represent REs (OFDM symbols) not used for transmission of the second EPDCCH. Specifically, in FIG. 9A, OFDM symbol #0 in slot 0 is the starting symbol for the second EPDCCH; in FIG. 9B, OFDM symbol #3 in slot 0 is the starting symbol for the second EPDCCH: in FIG. 9C, OFDM symbol #0 in slot 1 is the starting symbol for the second EPDCCH; in FIG. 9D, OFDM symbol #0 in slot 1 is the starting symbol for the second EPDCCH; in FIG. 9E, OFDM symbol #3 in slot 1 is the starting symbol for the second EPDCCH. As illustrated in FIGS. 9A to 9E, the configuration of the DMRSs associated with the second EPDCCH can be defined depending on the starting symbol for the second EPDCCH.

FIGS. 10A to 10E are diagrams illustrating examples of a configuration of the DMRSs associated with the second EPDCCH used for the second partial subframe. In FIGS. 10A to 10E, the REs shaded with oblique lines represent REs to which the DMRSs associated with the second EPDCCH are mapped. The REs shaded with dots represent REs (OFDM symbols) not used for transmission of the second EPDCCH. Specifically, in FIG. 10A, OFDM symbol #6 in slot 1 is the end symbol of the second EPDCCH; in FIG. 10B, OFDM symbol #3 in slot 1 is the end symbol of the second EPDCCH; in FIG. 10C, OFDM symbol #1 in slot 1 is the end symbol of the second EPDCCH; in FIG. 10D, OFDM symbol #6 in slot 0 is the end symbol of the second EPDCCH; in FIG. 10E, OFDM symbol #4 in slot 0 is the end symbol of the second EPDCCH. As illustrated in FIGS. 10A to 10E, the configuration of the DMRSs associated with the second EPDCCH can be defined depending on the end symbol of the second EPDCCH. Additionally, the configuration of the DMRSs associated with the second EPDCCH used for the second partial subframe can be the same as the configuration of the DMRSs used for the DwPTS.

The EPDCCH carries scheduling assignment. One EPDCCH is transmitted by using an aggregation of one or some contiguous Enhanced Control Channel Elements (ECCEs). Here, each ECCE is constituted of multiple EREGs. The number of ECCEs used for one EPDCCH depends on the format of the EPDCCH and the number of EREGs of each ECCE. Both localized transmission and distributed transmission are supported. One EPDCCH can use any of localized transmission and distributed transmission using different modes of mapping to the EREGs of the ECCEs and the PRB pair.

In the first EPDCCH, either localized transmission or distributed transmission can be configured via RRC signaling for each EPDCCH set. In the second EPDCCH, either localized transmission or distributed transmission can be predefined for each of all the EPDCCH sets. For example, in the second EPDCCH, distributed transmission can be predefined for all the EPDCCH sets.

As described later, the terminal device monitors multiple EPDCCHs. Setting of one or two PRB pairs in which the terminal device monitors EPDCCH transmission is possible. As configured by a higher layer, only localized transmission or only distributed transmission uses all EPDCCH candidates in an EPDCCH set $X_m$. In EPDCCH set $X_m$ in subframe i, ECCEs available for EPDCCH transmission are numbered from 0 to $N_{ECCE,m,i}-1$. Here, $N_{ECCE,m,i}$ represents the number of ECCEs available for EPDCCH transmission in EPDCCH set $X_m$ in subframe i. The ECCE numbered n corresponds to the EREG numbered (n mod $N^{RB}_{ECCE}$)+ $jN^{RB}_{ECCE}$ in the PRB having floor(n/$N^{RB}_{ECCE}$) as an index in the case of localized mapping and corresponds to the EREG numbered floor(n/$N^{Xm}_{RB}$)+$jN^{RB}_{ECCE}$ in the PRB having (n+j max(1, $N^{Xm}_{RB}/N^{ECCE}_{EREG}$)) mod $N^{Xm}_{RB}$ as an index in the case of distributed mapping. Here, j=0, 1, . . . , $N^{ECCE}_{EREG}-1$, and $N^{ECCE}_{EREG}$ represents the number of EREGs per ECCE. Moreover, $N^{RB}_{ECCE}$ is equal to 16/$N^{ECCE}_{EREG}$ and represents the number of ECCEs per PRB pair. Moreover, floor, mod, and max respectively represent floor function, modulo function (mod function), and maximum value function (max function). Note that the PRB pairs constituting EPDCCH set $X_m$ are assumed to be numbered from 0 to $N^{Xm}_{RB}-1$ in ascending order here.

In the first EPDCCH, $N^{ECCE}_{EREG}$ is determined based on the CP and the subframe type. More specifically, in the case of a normal CP and a normal subframe (normal downlink subframe) or the case of a normal CP and a special subframe with special subframe configuration 3, 4, or 8, $N^{ECCE}_{EREG}$ is 4. In the case of a normal CP and a special subframe with special subframe configuration 1, 2, 6, 7, or 9 (in other words, a special subframe in which the DwPTS is constituted of 6 or greater and 10 or less OFDM symbols), the case of an extended CP and a normal subframe, or the case of an extended CP and a special subframe with special subframe configuration 1, 2, 3, 5, or 6 (in other words, a special subframe in which the DwPTS is constituted of 6 or greater and 10 or less OFDM symbols), $N^{ECCE}_{EREG}$ is 8. Note that details of the special subframe configuration will be described later.

In an example of $N^{ECCE}_{EREG}$ in the second EPDCCH, $N^{ECCE}_{EREG}$ is a predefined value. For example, $N^{ECCE}_{EREG}$ in the second EPDCCH is 8 as in the case of a normal CP and a special subframe with special subframe configuration 1, 2, 6, 7, or 9 in the first EPDCCH. Moreover, for example, $N^{ECCE}_{EREG}$ in the second EPDCCH is 16, which is the same number of EREGs constituted of one resource block pair.

In another example of $N^{ECCE}_{EREG}$ in the second EPDCCH, $N^{ECCE}_{EREG}$ is determined depending on $n_{EPDCCH}$ (to be described later) in the detected (presumed or monitored) second EPDCCH. Specifically, in a case that $n_{EPDCCH}$ in the second EPDCCH is a prescribed number or greater, $N^{ECCE}_{EREG}$ is 4 (or 8); and in a case that $n_{EPDCCH}$ in the second EPDCCH is less than the prescribed number, $N^{ECCE}_{EREG}$ is 8 (or 16). The prescribed number may be predefined or may be configured in a cell-specific or UE-specific manner via RRC signaling. For example, the prescribed number is 104, which is the same as the prescribed number used in the first EPDCCH. Alternatively, for example, the prescribed number may be different from the prescribed number used in the first EPDCCH.

Moreover, multiple prescribed numbers may be defined or configured for $n_{EPDCCH}$. Specifically, in a case that $n_{EPDCCH}$ in the second EPDCCH is a first prescribed number or greater, $N^{ECCE}_{EREG}$ is 4; in a case that $n_{EPDCCH}$ in the second EPDCCH is a second prescribed number or greater and less than a first prescribed number, $N^{ECCE}_{EREG}$ is 8; and in a case that $n_{EPDCCH}$ in the second EPDCCH is less than the second prescribed number, $N^{ECCE}_{EREG}$ is 16. For example, the first prescribed number is 104, which is the same as the prescribed number used in the first EPDCCH. The second prescribed number is a value less than the first prescribed number.

In another example of $N^{ECCE}_{EREG}$ in the second EPDCCH, $N^{ECCE}_{EREG}$ is determined depending on the number of OFDM symbols in the detected (presumed or monitored) second EPDCCH. Specifically, in a case that the number of OFDM symbols in the second EPDCCH is a prescribed number or greater, $N^{ECCE}_{EREG}$ is 4 (or 8); and in a case that the number of OFDM symbols in the second EPDCCH is less than the prescribed number, $N^{ECCE}_{EREG}$ is 8 (or 16). The prescribed number may be predefined or may be configured in a cell-specific or UE-specific manner via RRC signaling.

Moreover, multiple prescribed numbers may be defined or configured for the number of OFDM symbols. Specifically, in a case that the number of OFDM symbols in the second EPDCCH is a first prescribed number or greater, $N^{ECCE}_{EREG}$ is 4; in a case that the number of OFDM symbols in the second EPDCCH is a second prescribed number or greater and less than the first prescribed number, $N^{ECCE}_{EREG}$ is 8; and in a case that the number of OFDM symbols in the second EPDCCH is less than the second prescribed number, $N^{ECCE}_{EREG}$ is 16. For example, the second prescribed number is a value less than the first prescribed number.

In another example, $N^{ECCE}_{EREG}$ in the second EPDCCH is determined based on the CP and the subframe type similar to that in the first EPDCCH, but $N^{ECCE}_{EREG}$ is a value twice as large as that of the first EPDCCH. More specifically, in the case of a normal CP and a normal subframe (normal downlink subframe), or the case of a normal CP and a special subframe with special subframe configuration 3, 4, or 8, $N^{ECCE}_{EREG}$ is 8. In the case of a normal CP and a special subframe with special subframe configuration of 1, 2, 6, 7, or 9 (in other words, a special subframe in which the DwPTS is constituted of 6 or greater and 10 or less OFDM symbols), the case of an extended CP and a normal subframe, or the case of an extended CP and a special subframe with special subframe configuration 1, 2, 3, 5, or 6 (in other words, a special subframe in which the DwPTS is constituted of 6 or greater and 10 or less OFDM symbols), $N^{ECCE}_{EREG}$ is 16.

The correspondence between the EPDCCH format and the number of ECCEs per EPDCCH (aggregation level) can be defined. The correspondence may be defined differently for the first EPDCCH and the second EPDCCH.

The correspondence between the EPDCCH format and the number of ECCEs per EPDCCH (aggregation level) can be defined for multiple cases, case A and case B, in the first EPDCCH. Case A is used in a case that a condition for case 1 to be described later is satisfied, and case B is used otherwise. The aggregation levels in case A is 2, 4, 8, and 16 in the case of localized transmission and 2, 4, 8, 16, and 32 in the case of distributed transmission. The aggregation levels in case B is 1, 2, 4, and 8 in the case of localized transmission and 1, 2, 4, 8, and 16 in the case of distributed transmission. Hence, the aggregation levels in case A are higher than the aggregation levels in case B. With this configuration, prescribed reception performance for the EPDCCH can be achieved by using a higher aggregation level even in a case that the number of REs used for each EREG in the EPDCCH is small.

$n_{EPDCCH}$, which represents a quantity for a certain terminal device, is defined as the number of downlink REs satisfying all of or some of criteria (a1) to (a4) below in one PRB pair configured for EPDCCH transmission in EPDCCH set $X_0$ (the first EPDCCH set of up to two EPDCCH sets).

(a1) The RE is part of any one of 16 EREGs in the PRB pair.

(a2) The RE is presumed not to be used for a CRS by the terminal device. Here, as long as no other values are provided for the parameters for the number of CRS antenna ports and frequency shift, the CRS position is given based on these parameters at the Serving cell (the number of antenna ports based on the same antenna port configuration as that of the PBCH and the frequency shift obtained based on a Physical Cell Identifier). In contrast, in a case that the set of these parameters is configured in the terminal device based on re-MappingQCL-ConfigID-r11, which is a higher layer parameter, the CRS position is determined by using the parameters.

(a3) The RE is presumed not to be used for a CSIRS by the terminal device. Here, the CSIRS position is given based on the configuration of zero-power CSIRS in the Serving cell (in a case that no other value is provided for the configuration for zero-power CSIRS) and the configuration of non-zero-power CSIRS. In contrast, in a case that the zero-power CSIRS is configured in the terminal device based on re-MappingQCL-ConfigID-r11, which is a higher layer parameter, the CSIRS position is determined by using the parameter.

(a4) Index l in the first slot in the subframe satisfies $l_{EPDCCHStart}$ or greater. Specifically, mapping is performed to REs having OFDM symbols having indexes of $l_{EPDCCHStart}$ and subsequent to $l_{EPDCCHStart}$ in one subframe. Here, l is an index given to an OFDM symbol in a slot, and numbered from 0 in ascending order in the time direction from the first OFDM symbol in the slot. Description of $l_{EPDCCHStart}$ will be given later.

In an example, the correspondence between the EPDCCH format and the number of ECCEs per EPDCCH (aggregation level) in the second EPDCCH is the same as that of the first EPDCCH.

In another example of the correspondence between the EPDCCH format and the number of ECCEs per EPDCCH (aggregation level) in the second EPDCCH, one case is predefined. For example, case A is predefined for the correspondence between the EPDCCH format and the number of ECCEs per EPDCCH (aggregation level) in the second EPDCCH.

In another example of the correspondence between the EPDCCH format and the number of ECCEs per EPDCCH (aggregation level) in the second EPDCCH, multiple cases, case A, case B, and case C, can be defined. The aggregation levels in case A and the aggregation levels in case B are the same as those of the first EPDCCH. The aggregation levels in case C can be higher than the aggregation levels in case A. For example, the aggregation levels in case C are 4, 8, 16, and 32 in the case of localized transmission and 4, 8, 16, 32 and 64 in the case of distributed transmission.

In an example of $n_{EPDDCH}$, which is a quantity for a specific terminal device, $n_{EPDCCH}$ for the first EPDCCH and $n_{EPDCCH}$ for the second EPDCCH are independent from each other. In the first EPDCCH, $n_{EPDCCH}$ is defined as the number of downlink REs satisfying all criteria (a1) to (a4) above in one PRB pair configured for EPDCCH transmission in EPDCCH set $X_0$ (the first EPDCCH set of up to two EPDCCH sets) in the first EPDCCH. In addition, in the second EPDCCH, $n_{EPDCCH}$ is defined as the number of downlink REs satisfying all or some of criteria (a1) to (a4) above in one PRB pair configured for EPDCCH transmission in EPDCCH set $X_0$ (the first EPDCCH set of one or more EPDCCH sets) in the second EPDCCH.

In an example of $n_{EPDDCH}$, which is a quantity for a specific terminal device, $n_{EPDCCH}$ is common to the first EPDCCH and the second EPDCCH. Specifically, $n_{EPDDCH}$ in the second EPDCCH is the same as $n_{EPDDCH}$ in the first EPDCCH. This means that, in the second EPDCCH, $n_{EPDCCH}$ is defined as the number of downlink REs satisfying all criteria (a1) to (a4) above in one PRB pair configured for EPDCCH transmission in EPDCCH set $X_0$ (the first EPDCCH set of up to two EPDCCH sets) in the first EPDCCH.

$b(0), \ldots, b(M_{bit}-1)$ representing blocks of bits transmitted on one EPDCCH at one subframe are scrambled based on $h(i)=(b(i)+c(i))$ mod 2, which results in $h(0), \ldots, h(M_{bit}-1)$, which are blocks of scrambled bits. Here, $M_{bit}$ represents the number of bits to be transmitted on one EPDCCH, and c(i) represents a UE-specific scrambling sequence initialized with parameter $c_{init}$. This scrambling sequence generator is $c_{init}=\text{floor}(n_s/2)2^9+n^{EPDCCH}_{ID,m}$. m represents an EPDCCH set number. $n_S$ represents a slot number in a radio frame. $n^{EPDCCH}_{ID,m}$ represents a DMRS scrambling initialization parameter that can be configured for each EPDCCH set via higher layer signaling and can take any value of 0 to 503.

$h(0), \ldots, h(M_{bit}-1)$, which are blocks of scrambled bits, are modulated to be $d(0), \ldots, d(M_{symb}-1)$, which are blocks of complex-valued modulation symbols. Here, $M_{symb}$ represents the number of modulation symbols transmitted on one EPDCCH. An EPDCCH modulation scheme is Quadrature Phase Shift Keying (QPSK). A block of complex-valued modulation symbols is mapped to a single layer for precoding based on a relational equation, y(i)=d(i). Here, i=0, ... $M_{symb}-1$, and y represents a precoded modulation symbol.

$y(0), \ldots, y(M_{symb}-1)$, which are blocks of complex-valued symbols, are sequentially mapped to REs that satisfy all criteria (m1) to (m4) below and that are on associated antenna ports (REs at positions defined by k and l), starting from y(0).

(m1) The RE is part of an EREG allocated for EPDCCH transmission.

(m2) The RE is presumed not to be used for a CRS by the terminal device. Here, as long as no other values are provided for the parameters for the number of CRS antenna ports and frequency shift, the CRS position is given based on these parameters at the Serving cell (the number of antenna ports based on the same antenna port configuration as that of the PBCH and the frequency shift obtained based on a Physical Cell Identifier). In contrast, in a case that the set of these parameters is configured in the terminal device based on re-MappingQCL-ConfigID-r11, which is a higher layer parameter, the CRS position is determined by using the parameters.

(m3) The RE is presumed not to be used for a CSIRS by the terminal device. Here, the CSIRS position is given based on the configuration of zero-power CSIRS in the Serving cell (in a case that no other value is provided for the configuration for zero-power CSIRS) and the configuration of non-zero-power CSIRS. In contrast, in a case that the zero-power CSIRS is configured in the terminal device based on re-MappingQCL-ConfigID-r11, which is a higher layer parameter, the CSIRS position is determined by using the parameter.

(m4) Index l in the first slot in the subframe being $l_{EPDCCHStart}$ or greater is satisfied. Specifically, mapping is performed to REs on OFDM symbols having indexes of $l_{EPDCCHStart}$ and subsequent to $l_{EPDCCHStart}$ in one subframe. Here, l is an index given to an OFDM symbol in a slot, and numbered from 0 in ascending order in the time direction from the first OFDM symbol in the slot. Description of $l_{EPDCCHStart}$ will be given later.

Mapping to REs (REs at positions defined by k and l) satisfying the above criteria at antenna port P is performed in ascending order with respect to index K first and then index l (in the direction that k and l increase), which means that the mapping starts from the first slot and ends at the second slot in the subframe.

Here, antenna port P is a logical antenna port. One antenna port may correspond to one physical antenna, or a signal of one antenna port may actually be transmitted via multiple physical antennas. Alternatively, signals of multiple antenna ports may actually be transmitted via the same physical antenna. In a case that the same antenna port is used, the same channel performance can be achieved. Here, antenna ports 0 to 3 are antenna ports associated with (used for) CRS transmission, antenna port 4 is an antenna port associated with (used for) transmission of Multimedia Broadcast multicast service Single Frequency Network (MBSFN) Reference Signal, antenna ports 5 and 7 to 14 are antenna ports associated with (used for) transmission of a UE-specific Reference Signal associated with a PDSCH, antenna ports 107 to 110 are antenna ports associated with (used for) transmission of a Demodulation Reference Signal associated with an EPDCCH, antenna port 6 is an antenna port associated with (used for) transmission of a positioning Reference Signal, and antenna ports 15 to 22 are antenna ports associated with (used for) transmission of CSIRS.

In localized transmission, single antenna port P to be used is given by n', which is calculated based on $n' = n_{ECCE,low}$ mod $N^{RB}_{ECCE} + n_{RNTI}$ mod $\min(N^{EPDCCH}_{ECCE}, N^{RB}_{ECCE})$ and (n1) to (n4) below. Here, $n_{ECCE,low}$ represents the smallest ECCE index used for this EPDCCH transmission in the EPDCCH set, and $n_{RNTI}$ is equal to a Cell-RNTI (C-RNTI), which is one of Radio Network Temporary Identifiers (RNTIs). Moreover, $N^{EPDCCH}_{ECCE}$ represents the number of ECCEs used for this EPDCCH. Moreover, min represents the maximum value function (max function).

(n1) In the case of a normal CP, and a normal subframe or a special subframe with special subframe configuration 3, 4, or 8, n'=0 corresponds to P=107. In the case of a normal CP and a special subframe with special subframe configuration 1, 2, 6, 7, or 9, n'=0 corresponds to P=107. In the case of an extended CP, n'=0 corresponds to P=107 for any subframe type.

(n2) In the case of a normal CP, and a normal subframe or a special subframe with special subframe configuration 3, 4, or 8, n'=1 corresponds to P=108. In the case of a normal CP and a special subframe with special subframe configuration 1, 2, 6, 7, or 9, n'=1 corresponds to P=109. In the case of an extended CP, n'=1 corresponds to P=108 for any subframe type.

(n3) In the case of a normal CP, and a normal subframe or a special subframe with special subframe configuration 3, 4, or 8, n'=2 corresponds to P=109.

(n4) In the case of a normal CP, and a normal subframe or a special subframe with special subframe configuration 3, 4, or 8, n'=3 corresponds to P=110.

In distributed transmission, each of the REs in one EREG starts from antenna port 107 and is associated with one of two antenna ports according to a rule indicating alternate use. Here, in a normal CP, the two antenna ports are antenna port 107 and an antenna port 109; in an extended CP, the two antenna ports are antenna port 107 and an antenna port 108.

For each Serving cell, a base station device can configure, for each UE, one or two EPDCCH-PRB sets (also referred to as groups of PRB pairs to which an EPDCCH may be mapped or EPDCCH sets) for monitoring the EPDCCH via higher layer signaling. Here, multiple PRB pairs corresponding to one EPDCCH-PRB set (the number of PRB pairs corresponding to one EPDCCH-PRB set and the correspondence between the EPDCCH-PRB set and any of PRB pairs) is also indicated via higher layer signaling. Each EPDCCH-PRB set is configured of a set of ECCEs numbered from 0 to $N_{ECCE,p,k}-1$. Here, $N_{ECCE,p,k}-1$ represents the number of ECCEs in EPDCCH-PRB set p (p+1-th EPDCCH-PRB set, p=0 or 1) in subframe k. Any of localized EPDCCH transmission and distributed EPDCCH transmission can be configured for each EPDCCH-PRB set. Specifically, one EPDCCH is mapped in the frequency direction relatively locally to the EPDCCH-PRB set for which localized EPDCCH transmission is configured, and one EPDCCH is mapped in the frequency direction in a relatively distributed manner to the EPDCCH-PRB set for which distributed EPDCCH transmission is configured.

EPDCCH sets may be configured independently for the first EPDCCH and the second EPDCCH. For example, the EPDCCH set for the first EPDCCH and the EPDCCH set for the second EPDCCH may be configured by using different parameters.

Moreover, the terminal may be configured so that the EPDCCH set for the first EPDCCH and the EPDCCH set for the second EPDCCH are not configured at the same time in a Serving cell. For example, the EPDCCH set for the first EPDCCH is configured for a Serving cell using the LTE of the related art, while the EPDCCH set for the second EPDCCH is configured for a LAA cell. Moreover, for example, in a case that a method (mode) using one subframe as a time direction unit as the LTE of the related art is configured for the terminal in the Serving cell, the EPDCCH set for the first EPDCCH is configured; and in a case that a method (mode) using one slot as a time direction unit is configured, the EPDCCH set for the second EPDCCH is configured.

Moreover, the terminal may be configured so that the EPDCCH set for the first EPDCCH and the EPDCCH set for the second EPDCCH are configured at the same time in a Serving cell. For example, in a LAA cell, the first EPDCCH is monitored based on the EPDCCH set for the first EPDCCH at a partial subframe, and the second EPDCCH is monitored based on the EPDCCH set for the second EPDCCH at a full subframe.

An example of different parameters with which the EPDCCH set for the first EPDCCH and the EPDCCH set for the second EPDCCH are configured is the number of PRB pairs that can be configured for one EPDCCH set. For example, the number of PRB pairs that can be configured for corresponding one EPDCCH set is 2, 4, or 8 in the EPDCCH set for the first EPDCCH. The number of PRB pairs that can be configured for corresponding one EPDCCH set is 4, 8, or 16 in the EPDCCH set for the second EPDCCH, which is twice as large as that for the EPDCCH set for the first EPDCCH. Alternatively, with respect to the EPDCCH set for the second EPDCCH, it may be defined so that the number of PRB pairs corresponding to one EPDCCH set may be defined according to the presumed starting symbol or end symbol of the second EPDCCH. For example, it is defined so that the number of PRB pairs corresponding to one EPDCCH set increases as the number of OFDM symbols used for transmission of the second EPDCCH decreases.

An example of different parameters with which the EPDCCH set for the first EPDCCH and the EPDCCH set for the second EPDCCH are configured is a parameter relating to a partial subframe. For example, the parameter includes a parameter indicating the starting symbol and/or the end symbol of the second EPDCCH or a candidate therefor.

Moreover, as an example, the starting symbol for the second EPDCCH is configured independently or commonly for the individual EPDCCH sets via RRC signaling. For example, as the starting symbol for the second EPDCCH, one of OFDM symbols #0 to #6 in slot 0 and OFDM symbols #0 to #6 in slot 1 is configured. Alternatively, for example, as the starting symbol for the second EPDCCH, a prescribed number of candidates are predefined from among OFDM symbols #0 to #6 in slot 0 and OFDM symbols #0 to #6 in slot 1, and any one of the candidates is configured. Alternatively, for example, as the starting symbol for the second EPDCCH, any of OFDM symbol #0 in slot 0 and OFDM symbol #0 in slot 1 is configured. Alternatively, for example, the starting symbol for the second EPDCCH is determined based on an OFDM symbol at which an initial signal has been detected. Specifically, the starting symbol for the second EPDCCH is the OFDM symbol at which an initial signal has been detected or that is the OFDM symbol prescribed number of OFDM symbols after the OFDM symbol at which the initial signal has been detected. Alternatively, for example, the starting symbol for the second EPDCCH is the OFDM symbol for which multiple candidates are defined or configured and is the OFDM symbol at which the initial signal has been detected and the OFDM symbols subsequent to the OFDM symbol at which the initial signal has been detected and closest thereto.

Moreover, as an example, the end symbol of the second EPDCCH is configured independently or commonly for the individual EPDCCH sets via RRC signaling. For example, as the end symbol of the second EPDCCH, one of OFDM symbols #0 to #6 in slot 0 and OFDM symbols #0 to #6 in slot 1 is configured. Moreover, for example, as the end symbol of the second EPDCCH, a prescribed number of candidates are predefined from among OFDM symbols #0 to #6 in slot 0 and OFDM symbols #0 to #6 in slot 1, and any one of the candidates is configured. Alternatively, for example, as the end symbol of the second EPDCCH, any of OFDM symbol #6 in slot 0 and OFDM symbol #6 in slot 1 is configured. Alternatively, for example, the end symbol of the second EPDCCH is determined based on the starting symbol for the second EPDCCH in the burst. Alternatively, for example, the end symbol of the second EPDCCH is determined based on the starting symbol for the second EPDCCH in the burst and the maximum length of the burst. Alternatively, for example, the end symbol of the second EPDCCH is determined based on control information included in the initial signal in the burst. Specifically, the control information includes information indicating the end symbol of the second EPDCCH. Alternatively, for example, the end symbol of the second EPDCCH is determined based on control information included in a prescribed channel and/or signal transmitted at the partial subframe.

The terminal device monitors a set of EPDCCH candidates in one or more effective Serving cells for configuration of the control information via higher layer signaling. Here, monitoring (to monitor) implicitly indicates that decode of each of the EPDCCHs in each of the sets of EPDCCH candidates is attempted according to DCI format for monitoring. Sets of EPDCCH candidates to be monitored are defined in UE-specific Search Space (USS) of the EPDCCH. Here, the USS is a logical area configured in a UE-specific manner and is an area that can be used for transmitting downlink control information. Monitoring is also referred to as blind detection.

Moreover, the starting symbol for the second EPDCCH and/or the end symbol of the second EPDCCH may be blind-detected (monitored) among multiple OFDM symbol candidates by a terminal. For example, multiple candidates are defined or configured for the starting symbol for the second EPDCCH and/or the end symbol of the second EPDCCH, and the terminal monitors the second EPDCCH presumed to be transmitted based on the OFDM symbols defined or configured as the candidates. In other words, the presumed starting symbols and/or end symbols may be independent (different) from each other among the individual second EPDCCHs in the set of the second EPDCCH candidates.

A subframe at which the UE monitors the EPDCCH USS is configured for each Serving cell by a higher layer. More specifically, in a subframe that is not a subframe at which uplink transmission for an FDD half duplex terminal device is requested and that is not part of a measurement gap in an active time (a period that is not a non-active timer operating period in discontinuous reception, a period that is not a non-reception period, and the total period in which the terminal device is operating), the higher layer configures monitoring of the EPDCCH. Here, discontinuous reception is an operation in which the terminal device need not be activated (active state) (may be non-active) for optimization of buttery consumption of the terminal device except for part of the period. The Frequency Division Duplex (FDD) half duplex terminal device is a terminal device that does not have the function of performing uplink transmission and downlink reception simultaneously (in the same subframe) in an FDD band. Moreover, the measurement gap is a period in which transmission/reception is stopped in the Serving cell to perform measurement for mobility (handover) (received power measurement for a cell other than the Serving cell), and a measurement gap pattern is configured by the RRC.

The terminal device does not monitor the EPDCCH in (e1) to (e4) below.

(e1) In the case of a special subframe with special subframe configuration 0 and 5 in the TDD and a normal downlink CP (a special subframe having fewer than six OFDM symbols in the DwPTS).

(e2) In the case of a special subframe with special subframe configuration 0, 4, and 7 in the TDD and an extended downlink CP (a special subframe having fewer than six OFDM symbols in the DwPTS).

(e3) In the case of a subframe at which decode of a Physical Multicast Channel (PMCH) is indicated by a higher layer.

(e4) In the case where different UL/DL configurations are configured for the TDD and a Primary cell and for a Secondary cell, the case of a downlink subframe in the Secondary cell, where the same subframe in the Primary cell is a special subframe, and the case where the terminal device does not have the capability of performing simultaneous transmission and reception in the Primary cell and the Secondary cell.

Here, the special subframe is a subframe including three sections, a section in which downlink transmission is performed (DwPTS), a guard period (GP), and a section in which uplink transmission is performed (UpPTS) in this order in one subframe, and the lengths of the DwPTS, the GP, and the UpPTS are uniquely determined based on the special subframe configuration and the CP length. The PMCH is a channel for providing Multimedia Broadcast/Multicast Service (MBMS) service and is mapped only to MBSFN subframes.

Note that any of the following 10 configurations is configured for the special subframe configuration.

In special subframe configuration 0, the DwPTS is 6592 samples in a normal downlink CP, and the UpPTS is 2192 samples in a normal uplink CP and 2560 samples in an extended uplink CP. In contrast, the DwPTS is 7680 samples in an extended downlink CP, and the UpPTS is 2192 samples in a normal uplink CP and 2560 samples in an extended uplink CP. The DwPTS is constituted of three OFDM symbols, and the UpPTS is constituted of one SC-FDMA symbol.

In special subframe configuration 1, the DwPTS is 19760 samples in a normal downlink CP, and the UpPTS is 2192 samples in a normal uplink CP and 2560 samples in an extended uplink CP. In contrast, the DwPTS is 20480 samples in an extended downlink CP, and the UpPTS is 2192 samples in a normal uplink CP and 2560 samples in an extended uplink CP. The DwPTS is constituted of nine OFDM symbols in the case of a normal downlink CP and eight OFDM symbols in the case of an extended downlink CP, and the UpPTS is constituted of one SC-FDMA symbol.

In special subframe configuration 2, the DwPTS is 21952 samples in a normal downlink CP, and the UpPTS is 2192 samples in a normal uplink CP and 2560 samples in an extended uplink CP. In contrast, the DwPTS is 23040 samples in an extended downlink CP, and the UpPTS is 2192 samples in a normal uplink CP and 2560 samples in an extended uplink CP. The DwPTS is constituted of 10 OFDM symbols in the case of a normal downlink CP and nine OFDM symbols in the case of an extended downlink CP, and the UpPTS is constituted of one SC-FDMA symbol.

In special subframe configuration 3, the DwPTS is 24144 samples in a normal downlink CP, and the UpPTS is 2192 samples in a normal uplink CP and 2560 samples in an extended uplink CP. In contrast, the DwPTS is 25600 samples in an extended downlink CP, and the UpPTS is 2192 samples in a normal uplink CP and 2560 samples in an extended uplink CP. The DwPTS is constituted of 11 OFDM symbols in the case of a normal downlink CP and 10 OFDM symbols in the case of an extended downlink CP, and the UpPTS is constituted of one SC-FDMA symbol.

In special subframe configuration 4, the DwPTS is 26336 samples in a normal downlink CP, and the UpPTS is 2192 samples in a normal uplink CP and 2560 samples in an extended uplink CP. In contrast, the DwPTS is 7680 samples in an extended downlink CP, and the UpPTS is 4384 samples in a normal uplink CP and 5120 samples in an extended uplink CP. The DwPTS is constituted of 12 OFDM symbols in the case of a normal downlink CP and three OFDM symbols in the case of an extended downlink CP, and the UpPTS is constituted of one SC-FDMA symbol in the case of a normal downlink CP and two SC-FDMA symbols in an extended downlink CP.

In special subframe configuration 5, the DwPTS is 6592 samples in a normal downlink CP, and the UpPTS is 4384 samples in a normal uplink CP and 5120 samples in an extended uplink CP. In contrast, the DwPTS is 20480 samples in an extended downlink CP, and the UpPTS is 4384 samples in a normal uplink CP and 5120 samples in an extended uplink CP. The DwPTS is constituted of three OFDM symbols in the case of a normal downlink CP and eight OFDM symbols in the case of an extended downlink CP, and the UpPTS is constituted of two SC-FDMA symbols.

In special subframe configuration 6, the DwPTS is 19760 samples in a normal downlink CP, and the UpPTS is 4384 samples in a normal uplink CP and 5120 samples in an extended uplink CP. In contrast, the DwPTS is 23040 samples in an extended downlink CP, and the UpPTS is 4384 samples in a normal uplink CP and 5120 samples in an extended uplink CP. The DwPTS is constituted of nine OFDM symbols, and the UpPTS is constituted of two SC-FDMA symbols.

In special subframe configuration 7, the DwPTS is 21952 samples in a normal downlink CP, and the UpPTS is 4384 samples in a normal uplink CP and 5120 samples in an extended uplink CP. In contrast, the DwPTS is 12800 samples in an extended downlink CP, and the UpPTS is 4384 samples in a normal uplink CP and 5120 samples in an extended uplink CP. The DwPTS is constituted of 10 OFDM symbols in the case of a normal downlink CP and five OFDM symbols in the case of an extended downlink CP, and the UpPTS is constituted of two SC-FDMA symbols.

In special subframe configuration 8, the DwPTS is 24144 samples in a normal downlink CP, and the UpPTS is 4384 samples in a normal uplink CP and 5120 samples in an extended uplink CP. The DwPTS is constituted of 11 OFDM symbols in the case of a normal downlink CP, and the UpPTS is constituted of two SC-FDMA symbols.

In special subframe configuration 9, the DwPTS is 13168 samples in a normal downlink CP, and the UpPTS is 4384 samples in a normal uplink CP and 5120 samples in an extended uplink CP. The DwPTS is constituted of six OFDM symbols in the case of a normal downlink CP, and the UpPTS is constituted of two SC-FDMA symbols.

Here, in a case that the UpPTS is constituted of one SC-FDMA symbols, the terminal device can transmit a Sounding Reference Signal (SRS), which is a Reference Signal for uplink sounding, by using the one SC-FDMA symbols in response to a request from a base station device. In a case that the UpPTS is constituted of two SC-FDM symbols, the terminal device can transmit an SRS by using at least one of the two SC-FDMA symbols in response to a request from a base station device.

Here, in a normal CP, a normal downlink subframe is constituted of 14 OFDM symbols, and a normal uplink subframe is constituted of 14 SC-FDMA symbols. Moreover, in an extended CP, a normal downlink subframe is constituted of 12 OFDM symbols, and a normal uplink subframe is constituted of 12 SC-FDMA symbols.

Note that any of the following seven configurations is configured for the UL/DL configuration.

In UL/DL configuration 0, subframe 0 to subframe 9 in one radio frame (10 subframes) are a downlink subframe, a special subframe, an uplink subframe, an uplink subframe, an uplink subframe, a downlink subframe, a special subframe, an uplink subframe, an uplink subframe, and an uplink subframe in this order. The cycle of the point of transition from downlink to uplink corresponds to five subframes (5 ms).

In UL/DL configuration 1, subframe 0 to subframe 9 in one radio frame are a downlink subframe, a special subframe, an uplink subframe, an uplink subframe, a downlink subframe, a downlink subframe, a special subframe, an uplink subframe, an uplink subframe, and a downlink subframe in this order. The cycle of the point of transition from downlink to uplink corresponds to five sub frames.

In UL/DL configuration 2, subframe 0 to subframe 9 in one radio frame are a downlink subframe, a special subframe, an uplink subframe, a downlink subframe, a downlink subframe, a downlink subframe, a special subframe, an uplink subframe, a downlink subframe, and a downlink subframe in this order. The cycle of the point of transition from downlink to uplink corresponds to five subframes.

In UL/DL configuration 3, subframe 0 to subframe 9 in one radio frame are a downlink subframe, a special subframe, an uplink subframe, an uplink subframe, an uplink subframe, a downlink subframe, a downlink subframe, a downlink subframe, a downlink subframe, and a downlink subframe in this order. The cycle of the point of transition from downlink to uplink corresponds to 10 subframes (10 ms).

In UL/DL configuration 4, subframe 0 to subframe 9 in one radio frame are a downlink subframe, a special subframe, an uplink subframe, an uplink subframe, a downlink subframe, a downlink subframe, a downlink subframe, a downlink subframe, a downlink subframe, and a downlink subframe in this order. The cycle of the point of transition from downlink to uplink corresponds to 10 subframes.

In UL/DL configuration 5, subframe 0 to subframe 9 in one radio frame are a downlink subframe, a special subframe, an uplink subframe, a downlink subframe, a downlink subframe, a downlink subframe, a downlink subframe, a downlink subframe, a downlink subframe, and a downlink subframe in this order. The cycle of the point of transition from downlink to uplink corresponds to 10 subframes.

In UL/DL configuration 6, subframe 0 to subframe 9 in one radio frame are a downlink subframe, a special subframe, an uplink subframe, an uplink subframe, an uplink subframe, a downlink subframe, a special subframe, an uplink subframe, an uplink subframe, and a downlink subframe in this order. The cycle of the point of transition from downlink to uplink corresponds to five subframes.

Here, in a case that the UL-DL configuration for at least one Serving cell is UL/DL configuration 5, not more than two Serving cells are configured.

$ES^{(L)}_k$, which is the USS in an EPDCCH in aggregation level L, is defined by a set of EPDCCH candidates. Here, L takes any of 1, 2, 4, 8, 16, and 32. For one EPDCCH-PRB set p, the ECCE corresponding to EPDCCH candidate m in search space $ES^{(L)}_k$ is given based on $L((Y_{p,k}+\text{floor}(mN_{ECCE,p,k}/(LM^{(L)}_p))+b) \mod (\text{floor}(N_{ECCE,p,k}/L)))+i$. Here, i=0, . . . , L−1. Moreover, in a case that a Carrier Indicator Field (CIF) is configured for the Serving cell for which EPDCCHs are monitored, b indicates a CIF value, and otherwise, b=0. Additionally, m=0, 1, . . . , $M^{(L)}_p$−1. In a case that no CIF is configured for the Serving cell for which EPDCCHs are monitored, $M^{(L)}_p$ represents the number of EPDCCHs to be monitored in aggregation level L in the EPDCCH-PRB set p in the Serving cell for which EPDCCHs are monitored. In other cases, $M^{(L)}_p$ represents the number of EPDCCHs to be monitored in aggregation level L in the EPDCCH-PRB set p in the Serving cell indicated by the CIF value. Here, the CIF is a field in a DCI format, and the CIF value is used to determine the Serving cell to which the DCI format corresponds in PDSCH transmission, PUSCH transmission, or a random access procedure of the Serving cell and takes the same value as the Serving cell index corresponding to the Primary cell or the Secondary cell.

In a case that the ECCE corresponding to a certain EPDCCH candidate is mapped to a PRB pair overlapping with transmission of any of the PBCH, a primary synchronization signal, and a secondary synchronization signal on the frequency, in the same subframe, the terminal device does not monitor the EPDCCH candidate.

In a case that $n^{EPDCCH}_{ID,i}$ of the same value is configured for two EPDCCH-PRB sets for a terminal device, and it is configured for the terminal device to receive the EPDCCH candidate that is an EPDCCH candidate of a certain DCI payload size corresponding to one of the EPDCCH-PRB sets and that is mapped to a certain set of REs and for the terminal device to monitor the EPDCCH candidate that is an EPDCCH candidate of the same DCI payload size corresponding to the other EPDCCH-PRB set and that is mapped to the same set of REs, and further in a case that the first ECCE number in the received EPDCCH is used to determine PUCCH resources for HARQ-ACK transmission, the first ECCE number is determined based on the EPDCCH-PRB set corresponding to p=0. Here, $n^{PDCCH}_{ID,i}$ is a parameter used for initialization of pseudo-random sequence generation of a Demodulation Reference Signal (DMRS) associated with the EPDCCH and is configured by a higher layer. Note that i takes a value 0 or 1 to indicate the EPDCCH set to which the EPDCCH associated with the DMRS belongs. In other words, i is substantially synonymous with p.

$Y_{p,k}$ is defined by $Y_{p,k}=(A_p Y_{p,k-1}) \mod D$. Here, $Y_{p,-1}$ represents the value of an RNTI, which is an identifier configured for the terminal device in a physical layer, $A_0$ indicates 39827, $A_1$ indicates 39829, D indicates 65537, and k=floor($n_s$/2). In other words, since each subframe is constituted of two slots, k represents a subframe number in the radio subframe.

Moreover, the correspondence of the number of PRBs included in an EPDCCH-PRB set, an aggregation level, and the number of EPDCCH candidates to be monitored can be defined. The aggregation level defining a search space and the number of EPDCCH candidates to be monitored are given as follows. Here, $N^{Xp}_{RB}$ represents the number of PRB pairs constituting the EPDCCH-PRB set p.

Here, the aggregation level that defines a search space and the number of EPDCCH candidates to be monitored can be independently defined for (1) the case where only one EPDCCH-PRB for distributed transmission is configured for the terminal device, (2) the case where only one EPDCCH-PRB for localized transmission is configured for the terminal device, (3) the case where two EPDCCH-PRBs are configured for distributed transmission for the terminal device, (4) the case where two EPDCCH-PRBs for localized transmission are configured for the terminal device, and (5) the case where one EPDCCH-PRB for distributed transmission and one EPDCCH-PRB for localized transmission are configured for the terminal device.

Note that, in the present embodiment, p1 is a reference sign identifying a localized EPDCCH-PRB set, p1 is a reference sign identifying a localized EPDCCH-PRB set, and p2 is a reference sign identifying a distributed EPDCCH-PRB set. In other words, $N^{Xp1}_{RB}$ represents the number of PRB pairs constituting a localized EPDCCH-PRB set, and $N^{Xp2}_{RB}$ represents the number of PRB pairs constituting a distributed EPDCCH-PRB set. Moreover, $M^{(L)}_{p1}$ represents the number of EPDCCHs in a localized EPDCCH-PRB set to be monitored in aggregation level L, and $M^{(L)}_{p2}$ represents the number of EPDCCHs in a distributed EPDCCH-PRB set to be monitored in aggregation level L.

To the correspondence of the number of PRBs included in an EPDCCH-PRB set, an aggregation level, and the number of EPDCCH candidates to be monitored, case 1 is applied in cases of (c1) to (c4) below, case 2 is applied in cases of (c5) to (c7) below, and case 3 is applied in a case of (c8) below.

(c1) In the case of a normal subframe and a normal downlink CP, where any of DCI formats 2, 2A, 2B, 2C, and 2D is monitored, and where $M^{DL}_{RB}$ is 25 or greater. In other words, this is the case where the number of REs that can be used for EPDCCH transmission in one PRB pair is relatively large and the payload size of the DCI format is significantly large.

(c2) In the case of a special subframe with special subframe configuration 3, 4, or 8 and a normal downlink CP (which means a special subframe in which a DwPTS is constituted of 11 or greater OFDM symbols), where any of DCI formats 2, 2A, 2B, 2C, and 2D is monitored, and where $M^{DL}_{RB}$ is 25 or greater. In other words, this is the case where the number of REs that can be used for EPDCCH transmission in one PRB pair is relatively large and the payload size of the DCI format is significantly large.

(c3) In the case of a normal subframe and a normal downlink CP, where any of DCI formats 1A, 1B, 1D, 1, 2, 2A, 2B, 2C, 2D, 0 and 4 is monitored, and where $n_{EPDCCH}$ is less than 104. In other words, this is the case where the number of REs that can be used for EPDCCH transmission in one PRB pair is significantly small.

(c4) In the case of a special subframe with special subframe configuration 3, 4, or 8 and a normal downlink CP (which means a special subframe in which a DwPTS is constituted of 11 or greater OFDM symbols), where any of DCI formats 1A, 1B, 1D, 1, 2, 2A, 2B, 2C, 2D, 0, and 4 is monitored, and where $n_{EPDCCH}$ is less than 104. In other words, this is the case where the number of REs that can be used for EPDCCH transmission in one PRB pair is significantly small.

(c5) In the case of a normal subframe and an extended downlink CP, and where any of DCI formats 1A, 1B, 1D, 1, 2, 2A, 2B, 2C, 2D, 0, and 4 is monitored. In other words, this is the case where the number of REs that can be used for EPDCCH transmission in one PRB pair is relatively small.

(c6) In the case of a special subframe with special subframe configuration 1, 2, 6, 7, and 9 and a normal downlink CP (which means a special subframe in which a DwPTS is constituted of 6 or greater and 10 or fewer OFDM symbols) and where any of DCI formats 1A, 1B, 1D, 1, 2, 2A, 2B, 2C, 2D, 0, and 4 is monitored. In other words, this is the case where the number of REs that can be used for EPDCCH transmission in one PRB pair is relatively small.

(c7) In the case of a special subframe with special subframe configuration 1, 2, 3, 5, or 6 and an enhanced downlink CP (which means a special subframe in which a DwPTS is constituted of 6 or greater and 10 or fewer OFDM symbols) and where any of DCI formats 1A, 1B, 1D, 1, 2, 2A, 2B, 2C, 2D, 0, and 4 is monitored. In other words, this is the case where the number of REs that can be used for EPDCCH transmission in one PRB pair is relatively small.

(c8) In the case other than any of (c1) to (c7) above. In other words, this is the case where the number of REs that can be used for EPDCCH transmission in one PRB pair is relatively large and the payload size of the DCI format is not so large.

Here, in a case that no CIF is configured for the terminal device for the Serving cell for which EPDCCHs are monitored, $M^{DL}_{RB}$ corresponds to $N^{DL}_{RB}$ of the Serving cell for which EPDCCHs are monitored. In a case that a CIF is configured for the terminal device for the Serving cell for which EPDCCHs are monitored, $M^{DL}_{RB}$ corresponds to $N^{DL}_{RB}$ of the Serving cell indicated by a CIF value. Here, $N^{DL}_{RB}$ represents a downlink bandwidth configuration and is expressed in a unit of a multiple of frequency direction resource block size. In other words, $N^{DL}_{RB}$ represents the total number of resource blocks in the frequency direction in a downlink component carrier in the Serving cell. Moreover, DCI formats 1A, 1B, 2D, and 1 are DCI formats used in a transmission mode in which one transport block can be transmitted using one PDSCH and are used in respective PDSCH transmission methods that are transmission diversity, closed loop spatial multiplexing using a single port, multi-user Multiple Input Multiple Output (MIMO), and single antenna port transmission. Moreover, DCI formats 2, 2A, 2B, 2C, and 2D are DCI formats used in a transmission mode in which up to two transport blocks can be transmitted using one PDSCH and are used in respective PDSCH transmission methods that are closed loop spatial multiplexing, large delay Cyclic Delay Diversity (CDD), 2-layer transmission, 8 or fewer layer transmission, and 8 or fewer layer transmission. In addition, DCI formats 2 and 2A are also used in a PDSCH transmission method based on transmission diversity, and DCI formats 2B, 2C, and 2D are also used in a PDSCH transmission method using a single antenna port. Moreover, DCI formats 0 and 4 are DCI formats used in respective transmission modes in which one and up to two transport blocks can be transmitted using one PUSCH and are used in respective PDSCH transmission methods that are single antenna port transmission and closed loop spatial multiplexing.

The transmission mode is a mode semi-statically configured for the terminal device to receive PDSCH data transmission signaled using a PDCCH or an EPDCCH via higher layer signaling. Any of transmission mode 1 to transmission mode 10 below is configured for the transmission mode.

In transmission mode 1, a PDSCH transmission method based on single antenna port transmission (transmission using antenna port 0) is used, and DCI format 1 or 1A is used.

In transmission mode 2, a PDSCH transmission method based on transmission diversity is used, and DCI format 1 or 1A is used.

In transmission mode 3, a PDSCH transmission method based on large delay CDD or transmission diversity is used, and DCI format 1 or 2A is used.

In transmission mode 4, a PDSCH transmission method based on closed loop spatial multiplexing or transmission diversity is used, and DCI format 1 or 2 is used.

In transmission mode 5, a PDSCH transmission method based on multi-user MIMO or transmission diversity is used, and DCI format 1 or 1D is used.

In transmission mode 6, a PDSCH transmission method based on closed loop spatial multiplexing using a single port or transmission diversity is used, and DCI format 1 or 1B is used.

In transmission mode 7, a PDSCH transmission method based on any of single antenna port transmission (transmission using antenna port 5), transmission diversity, and single antenna port transmission (transmission using antenna port 0) is used, and DCI format 1 or 1 is used.

In transmission mode 8, a PDSCH transmission method based on any of two-layer transmission (transmission using antenna port 7 and antenna port 8), transmission diversity, and single antenna port transmission (transmission using antenna port 0) is used, and DCI format 1 or 2B is used.

In transmission mode 9, a PDSCH transmission method based on any of 8 or fewer layer transmission (transmission using antenna port 7 to antenna port 14), transmission diversity, and single antenna port transmission (transmission using antenna port 0) (here, single antenna port transmission using antenna port 7 in the case of an MBSFN subframe) is used, and DCI format 1 or 2C is used.

In transmission mode 10, a PDSCH transmission method based on any of 8 or fewer layer transmission (transmission using antenna port 7 to antenna port 14), transmission diversity, and single antenna port transmission (transmission using antenna port 0) (here, single antenna port transmission using antenna port 7 in the case of an MBSFN subframe) is used, and DCI format 1 or 2C is used.

Note that transmission modes other than the above (e.g., transmission mode 11 defined similarly to transmission modes 9 and 10, or the like) may be used. For example, in transmission mode 11, a DCI format used in a LAA cell is used. In transmission mode 11, a processing method, a coding method, a transmission method, and/or a reception method in a LAA cell described in the present embodiment is used.

In a case that no CIF is configured for the terminal device, the terminal device monitors the USS of one EPDCCH in each of aggregation levels given based on correspondence tables in FIG. X1 to FIG. X10, in each of activated Serving cells for which monitoring of EPDCCHs is configured. In a case that EPDCCH monitoring is configured for the terminal device, and a CIF is configured for the terminal device, the terminal device monitors the USS of one or more EPDCCHs in each of aggregation levels given based on the correspondence tables in FIG. X1 to FIG. X10, in each of one or more activated Serving cells as configured via higher layer signaling. The terminal device for which a CIF associated with EPDCCH monitoring in Serving cell c is configured, monitors EPDCCHs for which a CIF is configured and to which a CRC scrambled with a C-RNTI is attached, in the USSs in the EPDCCHs in Serving cell c. The terminal device for which a CIF associated with EPDCCH monitoring in the Primary cell is configured, monitors EPDCCHs for which a CIF is configured and to which a CRC scrambled with a Semi Persistent Scheduling-RNTI (SPS-RNTI) is attached, in the USS in the EPDCCH in the Primary cell. Here, the C-RNTI is an RNTI used for dynamic PDSCH transmission or EPDCCH transmission associated with PUSCH transmission, and the SPS-RNTI is an RNTI used for semi-stationary PDSCH transmission or EPDCCH transmission associated with PUSCH transmission.

In the Serving cell for which EPDCCHs are monitored, in a case that no CIF is configured for the terminal device, the terminal device monitors the USSs in the EPDCCHs for the EPDCCHs including no CIF, and in a case that a CIF is configured for the terminal device, the terminal device monitors the USSs in the EPDCCHs for the EPDCCHs including the CIF. In other words, whether to decode an EPDCCH as an EPDCCH including a CIF or decode the EPDCCH as an EPDCCH including no CIF, is determined depending on whether a CIF is configured. In a case that the terminal device is configured to monitor EPDCCHs including the CIF corresponding to the Secondary cell, in a different Serving cell, the terminal difference does not monitor EPDCCHs in the Secondary cell. In the Serving cell for which EPDCCHs are monitored, the terminal device monitors EPDCCH candidates at least for the same Serving cell.

The terminal device configured to monitor EPDCCH candidates to which a CRC scrambled with a C-RNTI in a DCI format size including a CIF, on a certain Serving cell, is attached, presumes that the EPDCCH candidates in the DCI format size may be transmitted in USSs in various EPDCCHs corresponding to various values that the CIF can take in the DCI format size, in the Serving cell.

In a case that an opportunity for transmission of a positioning Reference Signal is configured only at an MBSFN subframe for the Serving cell for which EPDCCHs are monitored, and the CP length used in subframe 0 is of a normal CP, the terminal device is not requested to monitor EPDCCHs at a subframe configured by a higher layer as being part of the opportunity for the transmission of the positioning Reference Signal.

The terminal device presumes that the same $C_{init}$ value is used for antenna ports 107 and 108 during the monitoring of EPDCCH candidates associated with any of antenna ports 107 and 108. The terminal device presumes that the same $C_{init}$ value is used for antenna ports 109 and 110 during the monitoring of EPDCCH candidates associated with any of antenna ports 109 and 110.

In a case that the terminal device is configured to receive PDSCH data transmission according to transmission modes 1 to 9 via higher layer signaling for a certain Serving cell, the terminal device follows (s1) and (s2) below.

(s1) In a case that epdcch-StartSymbol-r11, which is a higher layer parameter, is configured for the terminal device, the start ODFM symbol for an EPDCCH given by $1_{EPDCCHStart}$, which is an index in the first slot in one subframe, (the first OFDM symbol to which an EPDCCH is mapped in one subframe, also referred to as an EPDCCH start position) is determined based on the higher layer parameter. Here, the higher layer parameter epdcch-StartSymbol-r11 is a parameter that can be individually configured for each of the EPDCCH sets and a parameter for specifying the start OFDM symbol in the EPDCCH (information indicating the start OFDM symbol). The higher layer parameter epdcch-StartSymbol-r11 is configured by using an RRC message.

(s2) In other cases, the start OFDM symbol for an EPDCCH given by $1_{EPDCCHStart}$, which is an index in the first slot in one subframe, is given by a Control Format Indicator (CFI) value in the subframe in the Serving cell in a case that $N^{DL}_{RB}$ is greater than 10, and is given by adding one to the CFI value of the subframe in the Serving cell in a case that $N^{DL}_{RB}$ is 10 or less. Here, the CFI is a parameter taking any of 1, 2, and 3 as a value and is control information transmitted/received via a Physical CFI Channel (PCFICH). The CFI is information on the number of OFDM symbols to be used for PDCCH transmission in one subframe.

In a case that the terminal device is configured to receive data transmission on a PDSCH in transmission mode 10 via higher layer signaling for a Serving cell, the start OFDM symbol for EPDCCH monitoring in subframe k follows the higher layer parameter pdsch-Start-r11 for each EPDCCH^PRB set as in (s3) to (s6) below. Here, the higher layer parameter pdsch-Start-r11 is a parameter that can be configured for each of four kinds of parameter sets for a PDSCH and is a parameter for specifying the start OFDM symbol of a PDSCH (information indicating the start OFDM symbol). The higher layer parameter epdcch-Start-r11 is configured by using an RRC message.

(s3) In a case that the pdsch-Start-r11 value belongs to the set of 1, 2, 3, and 4 (the value is any of 1, 2, 3, and 4), $1'_{EPDCCHStart}$ is given by pdsch-Start-r11.

(s4) In other cases (in a case that the pdsch-Start-r11 value does not belong to the set of 1, 2, 3, and 4), $1'_{EPDCCHStart}$ is given by the CFI value in subframe k in the Serving cell in a case that $N^{DL}_{RB}$ is greater than 10, and is given by adding one to the CFI value in subframe k in the Serving cell in a case that $N^{DL}_{RB}$ is 10 or less.

(s5) In a case that subframe k is the subframe specified by the higher layer parameter mbsfn-SubframeConfigList-r11, or in a case that subframe k is subframe 1 or 6 in the TDD subframe configuration, $1_{EPDCCHStart}$ is given by $1_{EPDCCHStart} = \min(2, 1'_{EPDCCHStart})$.

(s6) In other cases (in a case that subframe k is not the subframe specified by the higher layer parameter mbsfn-SubframeConfigList-r11, and in a case that subframe k is not subframe 1 or 6 in the TDD subframe configuration), $1_{EPDCCHStart}$ is given by $1_{EPDCCHStart} = 1'_{EPDCCHStart}$.

In a case that the terminal device is configured to receive PDSCH data transmission according to transmission modes 1 to 9 via higher layer signaling and to monitor EPDCCHs, for a certain Serving cell, the terminal device presumes that antenna ports 0 to 3 and 107 to 110 in the Serving cell are quasi co-located for Doppler shift, Doppler spread, average delay, and delay spread (receives transmissions as being transmitted from the same transmission point, or receives transmissions as being transmitted from different transmission points).

In a case that the terminal device is configured to receive PDSCH data transmission according to transmission mode 10 via higher layer signaling, for a certain Serving cell and to monitor EPDCCHs, (q1) and (q1) below are applied to each EPDCCH-PRB set.

(q1) In a case that the terminal device is configured by a higher layer to decode PDSCHs based on quasi co-location type A, the terminal device presumes that antenna ports 0 to 3 and 107 to 110 in the Serving cell are quasi co-located for Doppler shift, Doppler spread, average delay, and delay spread.

(q2) In a case that the terminal device is configured by a higher layer to decode PDSCHs based on quasi co-location type B, the terminal device presumes that antenna ports 15 to 22 and 107 to 110 corresponding to the higher layer parameter qcl-CSI-RS-ConfigNZPId-r11 are quasi co-located for Doppler shift, Doppler spread, average delay, and delay spread. Here, the higher layer parameter qcl-CSI-RS-ConfigNZPId-r11 is a parameter that can be configured for each of four kinds of PDSCH parameter sets and is a parameter for specifying quasi co-location of a PDSCH (information indicating the CSIRS with which a UE-specific Reference Signal associated with a PDSCH is quasi co-located). The higher layer parameter qcl-CSI-RS-ConfigNZPId-r11 is configured by using an RRC message.

Here, quasi co-location type A and quasi co-location type B are parameters, one of which is configured for each Serving cell for the terminal device configured in transmission mode 10. Type A indicates that antenna ports 7 to 14 are quasi co-located with CRS antenna ports 0 to 3 of the Serving cell, and type B indicates that antenna ports 7 to 14 are quasi co-located with any of CSIRS antenna ports 15 to 22. In other words, in a case that type B is configured, a CSIRS is not necessarily transmitted from the base station device corresponding to the Serving cell and may be transmitted from another base station device. In this case, an EPDCCH and a PDSCH quasi co-located with the CSIRS are normally transmitted from the same transmission point as the CSIRS (for example, an overhang antenna device in a remote site connected to a base station device via backhaul, or another base station device).

In a case that the terminal device is configured to receive PDSCH data transmission according to transmission mode 10 via higher layer signaling and to monitor EPDCCHs for a certain Serving cell, the terminal device uses, for each EPDCCH-PRB set, a parameter specified by the higher layer parameter MappingQCL-ConfigId-r11, for RE mapping of the EPDCCH and determination of antenna port quasi co-location. The parameter set includes parameters (Q1) to (Q6) below for RE mapping of an EPDCCH and determination for antenna port quasi co-location.

(Q1) crs-PortsCount-r11. crs-PortsCount-r11 is a parameter indicating the number of CRS ports to be used for mapping a PDSCH and an EPDCCH to REs.

(Q2) crs-FreqShift-r11. crs-FreqShift-r11 is a parameter indicating CRS frequency shift to be used for mapping a PDSCH and an EPDCCH to REs.

(Q3) mbsdn-SubframeConfigList-r11. mbsdn-SubframeConfigList-r11 is a parameter indicating the position of an MBSFN subframe to be used for mapping a PDSCH and an EPDCCH to REs. In a subframe configured as an MBSFN subframe based on the parameter, a PDSCH and an EPDCCH are mapped as a CRS existing only in OFDM symbols to which a PDCCH can be mapped (as no CRS existing in OFDM symbols to which a PDCCH is not to be mapped).

(Q4) csi-RS-ConfigZPId-r11. csi-RS-ConfigZPId-r11 is a parameter indicating the position of zero-power CSIRS to be used for mapping a PDSCH and an EPDCCH to REs.

(Q5) pdsch-Start-r11. pdsch-Start-r11 is a parameter indicating a start OFDM symbol to be used for mapping a PDSCH and an EPDCCH to REs.

(Q6) qcl-CSI-RS-ConfigNZPId-r11. qcl-CSI-RS-ConfigNZPId-r11 is a parameter indicating the CSIRS with which a Reference Signal for demodulation of a PDSCH and an EPDCCH is co-located. This parameter can specify the ID of any of one or more configured CSIRSs. The Reference Signal for demodulation of a PDSCH and an EPDCCH is assumed to be quasi co-located with the CSIRS which ID is specified.

Next, a PDSCH to be scheduled by a second EPDCCH will be described. An example of the PDSCH to be scheduled by the second EPDCCH includes only a PDSCH mapped to a subframe at which the second EPDCCH has been detected (mapped).

Another example of the PDSCH to be scheduled by the second EPDCCH includes a PDSCH mapped to any of the subframes in the burst including the subframe at which the second EPDCCH has been detected (mapped). Information (configuration) on the subframe to which the PDSCH is mapped may be configured using RRC or may be notified using DCI transmitted on the second EPDCCH. Moreover, the PDSCH scheduled by the second EPDCCH may be mapped to one subframe or multiple subframes.

Next, description will be given of the starting symbol and/or an end symbol of a PDSCH in a case that the PDSCH scheduled by the second EPDCCH is mapped to a partial subframe. For example, the starting symbol and/or the end symbol of the PDSCH is determined based on the control information included in the DCI in the second EPDCCH for scheduling. Alternatively, for example, the starting symbol and/or the end symbol of the PDSCH is determined based on the starting symbol and/or the end symbol of the second EPDCCH for scheduling. Alternatively, for example, the starting symbol and/or the end symbol of the PDSCH is the same as the starting symbol and/or the end symbol of the second EPDCCH for scheduling. Alternatively, for example, the starting symbol and/or the end symbol of the PDSCH is an OFDM symbol calculated based on the starting symbol and/or the end symbol of the second EPDCCH for scheduling. Alternatively, for example, the starting symbol and/or the end symbol of the PDSCH is configured independently of the starting symbol and/or the end symbol of the second EPDCCH for scheduling via RRC signaling. Alternatively, for example, the starting symbol and/or the end symbol of the PDSCH is determined based on the control information included in a physical channel or a physical signal mapped to the subframe. Moreover, different determination methods or different notification methods may be used for the starting symbol and the end symbol of the PDSCH.

Moreover, the configuration for a subframe at which the first EPDCCH in the first EPDCCH set is monitored and the configuration for a subframe at which the second EPDCCH in the second EPDCCH set is monitored may be different from each other. For example, the subframe at which the first EPDCCH is monitored is configured commonly for the entire first EPDCCH set, and whether to perform monitoring is configured for each subframe by using bitmap-format information. As an example, the configuration for the subframe at which the second EPDCCH is monitored is the same as but is configured independently of the configuration for the subframe at which the first EPDCCH is monitored. Another example of the configuration for the subframe at which the second EPDCCH is monitored is to monitor the second EPDCCH at a subframe at which the terminal has detected burst in a LAA cell (downlink burst transmission).

Part of the above-described embodiment can be stated differently as follows.

The terminal device according to the present embodiment includes: a higher layer processing unit configured to configure a first EPDCCH set for monitoring a first EPDCCH in a first Serving cell and a second EPDCCH set for monitoring a second EPDCCH in a second Serving cell; and a reception unit configured to monitor the first EPDCCH and the second EPDCCH. In a certain subframe, a starting symbol for the first EPDCCH and a starting symbol for the second EPDCCH are determined independently.

The base station device according to the present embodiment includes: a higher layer processing unit configured to configure, for a terminal device, a first EPDCCH set for monitoring a first EPDCCH in a first Serving cell and a second EPDCCH set for monitoring a second EPDCCH in a second Serving cell; and a transmission unit configured to transmit the first EPDCCH and the second EPDCCH. In a certain subframe, a starting symbol for the first EPDCCH and a starting symbol for the second EPDCCH are determined independently.

The maximum value that can be configured for the starting symbol for the second EPDCCH is greater than the maximum value that can be configured for the starting symbol for the first EPDCCH. For example, a value that can be configured for the first EPDCCH starting symbol is 1, 2, 3, or 4. The values that can be configured for the starting symbol for the second EPDCCH include a different value from the values that can be configured for the starting symbol for the first EPDCCH.

The starting symbol for the first EPDCCH is configured based on a higher layer parameter. The starting symbol for the second EPDCCH is determined based on a symbol at which an initial signal has been detected. For example, the starting symbol for the second EPDCCH is the same as the symbol at which the initial signal has been detected.

An end symbol of the first EPDCCH is the last symbol in a certain subframe. An end symbol of the second EPDCCH is configured based on a higher layer parameter.

The starting symbol and/or the end symbol of the PDSCH to be scheduled by the second EPDCCH is determined based on the starting symbol and/or the end symbol of the second EPDCCH.

The starting symbol and/or the end symbol of the PDSCH to be scheduled by the second EPDCCH is determined based on the DCI in the second EPDCCH.

The terminal device according to the present embodiment includes: a higher layer processing unit configured to configure a first EPDCCH set for monitoring a first EPDCCH in a first Serving cell and a second EPDCCH set for monitoring a second EPDCCH in a second Serving cell; and a reception unit configured to monitor the first EPDCCH and the second EPDCCH. In each physical resource block pair, the EREGs used to define mapping of the first EPDCCH and the second EPDCCH to Resource Elements are common to the first EPDCCH and the second EPDCCH. The number of EREGs constituting each of the ECCEs used for transmission of the first EPDCCH and the number of EREGs constituting each of the ECCEs for transmission of the first EPDCCH are determined independently.

The base station device according to the present embodiment includes: a higher layer processing unit configured to configure, for a terminal device, a first EPDCCH set for monitoring a first EPDCCH in a first Serving cell and a second EPDCCH set for monitoring a second EPDCCH in a second Serving cell; and a transmission unit configured to transmit the first EPDCCH and the second EPDCCH. In each physical resource block pair, the EREGs used to define mapping of the first EPDCCH and the second EPDCCH to Resource Elements are common to the first EPDCCH and the second EPDCCH. The number of EREGs constituting each of the ECCEs used for transmission of the first EPDCCH and the number of EREGs constituting each of the ECCEs for transmission of the first EPDCCH are determined independently.

The maximum value of the numbers of EREGs constituting each of the ECCEs used for transmission of the second EPDCCH is greater than the maximum value of the numbers of EREGs constituting each of the ECCEs for transmission of the first EPDCCH. For example, the numbers of EREGs constituting each of the ECCEs used for transmission of the first EPDCCH include 4 or 8. The numbers of EREGs constituting each of the ECCEs used for transmission of the second EPDCCH include a different number from the number of EREGs constituting each of the ECCEs for transmission of the first EPDCCH. The numbers of EREGs constituting each of the ECCEs used for transmission of the second EPDCCH include 4, 8 or 16.

Resource Elements to which a Demodulation Reference Signal associated with the second EPDCCH is to be mapped are determined based on the starting symbol and/or the end symbol of the second EPDCCH.

The maximum value of the numbers of the physical resource block pairs used for the second EPDCCH set is greater than the maximum value of the numbers of the physical resource block pairs used for the first EPDCCH set. For example, the numbers of physical resource block pairs used for the first EPDCCH set include 2, 4, or 8. The numbers of the physical resource block pairs used for the second EPDCCH set include a different number from the numbers of the physical resource block pairs used for the first EPDCCH set. The numbers include 2, 4, 8, or 16.

Moreover, although the description has been given in each of the above-described embodiments by using the terms "Primary cell" and "PS cell", these terms need not always be used. For example, "Primary cell" in each of the above-described embodiments may be referred to as a "master cell", and a "PS cell" in each of the above-described embodiments may be referred to as a "Primary cell".

A program running on each of the base station device 2 and the terminal device 1 according to the present invention may be a program (a program for causing a computer to operate) that controls a Central Processing Unit (CPU) and the like in such a manner as to realize the functions according to the above-described embodiments of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Note that the terminal device 1 and the base station device 2-1 or the base station device 2-2 according to the above-described embodiments may be partially realized by the computer. In this case, this configuration may be realized by recording a program for realizing such control functions on a computer-readable recording medium and causing a computer system to read the program recorded on the recording medium for execution.

Note that the "computer system" here is defined as a computer system built into the terminal device 1 or the base station device 2-1 or the base station device 2-2, and the computer system includes an OS and hardware components such as peripheral devices. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 2-1 or base station device 2-2 according to the above-described embodiments can be realized as an aggregation (a device group) constituted of multiple devices. Devices constituting the device group may be each equipped with some or all portions of each function or each functional block of the base station device 2-1 or base station device 2-2 according to the above-described embodiments. It is only required that the device group itself include general functions or general functional blocks of the base station device 2-1 or base station device 2-2. Furthermore, the terminal device 1 according to the above-described embodiments can also communicate with the base station device as the aggregation.

Furthermore, the base station device 2-1 or base station device 2-2 according to the above-described embodiments may be an Evolved Universal Terrestrial Radio Access Network (E-UTRAN). Furthermore, the base station device 2-1 or base station device 2-2 according to the above-described embodiments may have some or all portions of a function of a higher node for an eNodeB.

Furthermore, some or all portions of each of the terminal device 1 and the base station device 2-1 or base station device 2-2 according to the above-described embodiments may be typically realized as a large-scale integration (LSI) that is an integrated circuit or may be realized as a chip set. The functional blocks of each of the terminal device 1 and the base station device 2-1 or base station device 2-2 may be individually realized as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiments, the cellular mobile station device is described as one example of a terminal device or a communication device, but the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

(1) A terminal device according to an aspect of the present embodiment is a terminal device configured to communicate with a base station device and includes: a higher layer processing unit configured to configure a first EPDCCH set for monitoring a first EPDCCH in a first Serving cell and a second EPDCCH set for monitoring a second EPDCCH in a second Serving cell; and a reception unit configured to monitor the first EPDCCH and the second EPDCCH. In a certain subframe, a starting symbol for the first EPDCCH and a starting symbol for the second EPDCCH are determined independently.

(2) A terminal device according to an aspect of the present invention is the above-described terminal device, in which the maximum value that can be configured for the starting symbol for the second EPDCCH is greater than the maximum value that can be configured for the starting symbol for the first EPDCCH.

(3) A terminal device according to an aspect of the present invention is the above-described terminal device, in which the starting symbol for the first EPDCCH is configured based on a higher layer parameter while the starting symbol for the second EPDCCH is determined based on a symbol at which an initial signal has been detected.

(4) A terminal device according to an aspect of the present invention is the above-described terminal device, in which an end symbol of the first EPDCCH is a last symbol in a certain subframe while an end symbol of the second EPDCCH is configured based on a higher layer parameter.

(5) A terminal device according to an aspect of the present invention is the above-described terminal device, in which a starting symbol and/or an end symbol of a PDSCH to be scheduled by the second EPDCCH is determined based on the starting symbol and/or the end symbol of the second EPDCCH.

(6) A terminal device according to an aspect of the present invention is the above-described terminal device, in which the starting symbol and/or the end symbol of the PDSCH to be scheduled by the second EPDCCH is determined based on DCI in the second EPDCCH.

(7) A base station device according to an aspect of the present embodiment is a base station device configured to communicate with a terminal device and includes: a higher layer processing unit configured to configure a first EPDCCH set for monitoring a first EPDCCH in a first Serving cell and a second EPDCCH set for monitoring a second EPDCCH in a second Serving cell, for the terminal device; and a transmission unit configured to transmit the first EPDCCH and the second EPDCCH. In a certain subframe, a starting symbol for the first EPDCCH and a starting symbol for the second EPDCCH are determined independently.

(8) A base station device according to an aspect of the present invention is the above-described base station device, in which the maximum value that can be configured for the starting symbol for the second EPDCCH is greater than the maximum value that can be configured for the starting symbol for the first EPDCCH.

(9) A base station device according to an aspect of the present invention is the above-described base station device, in which the starting symbol for the first EPDCCH is configured based on a higher layer parameter while the starting symbol for the second EPDCCH is determined based on a symbol at which an initial signal has been detected.

(10) A base station device according to an aspect of the present invention is the above-described base station device, in which an end symbol of the first EPDCCH is a last symbol in a certain subframe while an end symbol of the second EPDCCH is configured based on a higher layer parameter.

(11) A base station device according to an aspect of the present invention is the above-described base station device, in which a starting symbol and/or an end symbol of a PDSCH to be scheduled by the second EPDCCH is determined based on the starting symbol and/or the end symbol of the second EPDCCH.

(12) A base station device according to an aspect of the present invention is the above-described base station device, in which the starting symbol and/or the end symbol of the PDSCH to be scheduled by the second EPDCCH is determined based on DCI in the second EPDCCH.

(13) A communication method according to an aspect of the present embodiment is a communication method used by a terminal device configured to communicate with a base station device and includes the steps of: configuring a first EPDCCH set for monitoring a first EPDCCH in a first Serving cell and a second EPDCCH set for monitoring a second EPDCCH in a second Serving cell; and monitoring the first EPDCCH and the second EPDCCH. In a certain subframe, a starting symbol for the first EPDCCH and a starting symbol for the second EPDCCH are determined independently.

(14) A communication method according to an aspect of the present embodiment is a communication method used by a base station device configured to communicate with a terminal device and includes the steps of: configuring a first EPDCCH set for monitoring a first EPDCCH in a first Serving cell and a second EPDCCH set for monitoring a second EPDCCH in a second Serving cell, for the terminal device; and transmitting the first EPDCCH and the second EPDCCH. In a certain subframe, a starting symbol for the first EPDCCH and a starting symbol for the second EPDCCH are determined independently.

REFERENCE SIGNS LIST

501 Higher layer
502 Control unit
503 Codeword generation unit
504 Downlink subframe generation unit
505 Downlink Reference Signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink Reference Signal extraction unit
605 Transport block extraction unit
606, 1006 Control unit
607, 1007 Higher layer
608 Channel state measurement unit
609, 1009 Uplink subframe generation unit
610 Uplink control information generation unit
611, 612, 1011 SC-FDMA signal transmission unit
613, 614, 1013 Transmit antenna

The invention claimed is:
1. A terminal device (UE) comprising:
reception circuitry configured to monitor multiple enhanced physical downlink control channels (EPD-CCHs) on a Secondary cell,
wherein when the Secondary cell is a licensed assisted access Secondary cell and a higher layer parameter of the Secondary cell indicates two possible starting positions of downlink transmission, the two possible starting positions being a Subframe boundary and a slot boundary, respectively, the terminal device is configured to monitor both a first set of UE-specific search space candidates in a first EPDCCH and a second set of UE-specific search space candidates in a second EPD-CCH, in a subframe,
a starting symbol for the first EPDCCH is specified by an index in a first slot in the subframe,
a starting symbol for the second EPDCCH is specified by the index in a second slot in the subframe,
a second set of numbers of enhanced control channel elements (ECCEs) is used for the first EPDCCH,
only a first set of the numbers of ECCEs is used for the second EPDCCH,
the first set of the numbers of ECCEs includes 2, 4, 8, 16, and 32, and
the second set of the numbers of ECCEs includes 1, 2, 4, 8, and 16.

2. The terminal device according to claim 1, wherein
a demodulation reference signal (DMRS) associated with the first EPDCCH is transmitted in both the first slot and the second slot, and
a DMRS associated with the second EPDCCH is transmitted only in the second slot.

3. The terminal device according to claim 1, wherein, when the terminal device detects the first EPDCCH, a physical downlink shared channel (PDSCH) scheduled by the first EPDCCH starts in the first slot, and when the terminal device detects the second EPDCCH, a physical downlink shared channel (PDSCH) scheduled by the second EPDCCH starts in the second slot.

4. A base station device configured to communicate with a terminal device (UE), the base station device comprising:
transmission circuitry configured to transmit multiple enhanced physical downlink control channels (EPD-CCHs) on a Secondary cell,
wherein, when the Secondary cell is a licensed assisted access Secondary cell and a higher layer parameter of the Secondary cell indicates two possible starting positions of downlink transmission, the two possible starting positions being a Subframe boundary and a slot boundary, respectively, the terminal device is configured to monitor both a first set of UE-specific search space candidates in a first EPDCCH and a second set of the UE-specific search space candidates in a second EPDCCH, in a subframe,
a starting symbol for the first EPDCCH is given by an index in a first slot in the subframe,
a starting symbol for the second EPDCCH is given by the index in a second slot in the subframe,
a second set of numbers of enhanced control channel elements (ECCEs) is used for the first EPDCCH,
only a first set of the numbers of ECCEs is used for the second EPDCCH,
the first set of the numbers of ECCEs includes 2, 4, 8, 16, and 32, and
the second set of the numbers of ECCEs includes 1, 2, 4, 8, and 16.

5. The base station device according to claim 4, wherein
a demodulation reference signal (DMRS) associated with the first EPDCCH is transmitted in both the first slot and the second slot, and a DMRS associated with the second EPDCCH is transmitted only in the second slot.

6. The base station device according to claim 4, wherein when the terminal device detects the first EPDCCH, a physical downlink shared channel (PDSCH) scheduled by the first EPDCCH starts in the first slot, and when the terminal device detects the second EPDCCH, a physical downlink shared channel (PDSCH) scheduled by the second EPDCCH starts in the second slot.

7. A communication method of a terminal device (UE), the communication method comprising the step of:
monitoring, by the terminal device, multiple enhanced physical downlink control channels (EPDCCHs) on a Secondary cell,
wherein, when the Secondary cell is a licensed assisted access Secondary cell and a higher layer parameter of the Secondary cell indicates two possible starting positions of downlink transmission, the two possible starting positions being a Subframe boundary and a slot boundary, respectively, the terminal device is configured to monitor both a first set of UE-specific search space candidates in a first EPDCCH and a second set of the UE-specific search space candidates in a second EPDCCH, in a subframe,
a starting symbol for the first EPDCCH is specified by an index in a first slot in the subframe,
a starting symbol for the second EPDCCH is specified by the index in a second slot in the subframe,
a second set of numbers of enhanced control channel elements (ECCEs) is used for the first EPDCCH, only a first set of the numbers of ECCEs is used for the second EPDCCH,
the first set of the numbers of ECCEs includes 2, 4, 8, 16, and 32, and
the second set of the numbers of ECCEs includes 1, 2, 4, 8, and 16.

8. A communication method of a base station device configured to communicate with a terminal device (UE), the communication method comprising the step of:
transmitting, by the base station device, multiple enhanced physical downlink control channels (EPDCCHs) on a Secondary cell,
wherein, when the Secondary cell is a licensed assisted access Secondary cell and a higher layer parameter of the Secondary cell indicates two possible starting positions of downlink transmission, the two possible starting positions being a Subframe boundary and a slot boundary, respectively, the terminal device is configured to monitor both a first set of UE-specific search space candidates in a first EPDCCH and a second set of the UE-specific search space candidates in a second EPDCCH, in a subframe,
a starting symbol for the first EPDCCH is specified by an index in a first slot in the subframe,
a starting symbol for the second EPDCCH is specified by the index in a second slot in the subframe,
or a second set of numbers of enhanced control channel elements (ECCEs) is used for the first EPDCCH,
only a first set of the numbers of ECCEs is used for the second EPDCCH,
the first set of the numbers of ECCEs includes 2, 4, 8, 16, and 32, and
the second set of the numbers of ECCEs includes 1, 2, 4, 8, and 16.

* * * * *